(12) United States Patent
Eaton et al.

(10) Patent No.: US 10,294,091 B2
(45) Date of Patent: May 21, 2019

(54) CONTAINER FILLING SYSTEM AND VALVE FOR SAME

(71) Applicant: PepsiCo, Inc., Purchase, NY (US)

(72) Inventors: John A. Eaton, Purchase, NY (US); David William Martin, Londonberry, NH (US); David Jay Warburton, Lexington, MA (US); Nathan John Coleman, Murrieta, CA (US); Samuel Frank Feller, Somerville, MA (US); Thomas John Evans, Brighton, MA (US); Jason Karl Sorge, Geneseo, NY (US); Randy A. Straub, Palmyra, NY (US)

(73) Assignee: PepsiCo, Inc., Purchase, NY (US)

( * ) Notice: Subject to any disclaimer, the term of this patent is extended or adjusted under 35 U.S.C. 154(b) by 648 days.

(21) Appl. No.: 14/778,720

(22) PCT Filed: Mar. 21, 2014

(86) PCT No.: PCT/US2014/031469
§ 371 (c)(1),
(2) Date: Sep. 21, 2015

(87) PCT Pub. No.: WO2014/153520
PCT Pub. Date: Sep. 25, 2014

(65) Prior Publication Data
US 2016/0052767 A1    Feb. 25, 2016

Related U.S. Application Data

(60) Provisional application No. 61/804,452, filed on Mar. 22, 2013.

(51) Int. Cl.
B67C 3/04    (2006.01)
B67C 3/28    (2006.01)
(Continued)

(52) U.S. Cl.
CPC ............ B67C 3/286 (2013.01); B65B 55/027 (2013.01); B65B 59/00 (2013.01); B67C 3/045 (2013.01);
(Continued)

(58) Field of Classification Search
CPC ......... B67C 3/286; B67C 3/06; B67C 3/2634; B67C 3/16; B67C 3/045; B67C 3/28;
(Continued)

(56) References Cited

U.S. PATENT DOCUMENTS 1,535,788 A    4/1925  Rauchfuss
2,059,455 A   11/1936  Hoar
(Continued)

FOREIGN PATENT DOCUMENTS

CN    1070624 A    4/1993
CN    1118690 C    8/2003
(Continued)

OTHER PUBLICATIONS

International Search Report for PCT/US2014/031469 dated Oct. 31 2014, 4 pages.
(Continued)

*Primary Examiner* — Jason K Niesz
(74) *Attorney, Agent, or Firm* — Sterne, Kessler, Goldstein & Fox P.L.L.C.

(57) ABSTRACT

A container filling valve may include a shuttle and a drive sleeve that are magnetically coupled. Movement of the drive sleeve may move the shuttle from a position in which the filling valve is closed to a position in which the filling valve is open. A container handling arm may include a distal end configured to hold a container and a proximal end that includes a load cell. A low flow setpoint system may be configured to arrest closing of a filling valve when that filling valve is partially closed. A pressure control system (Continued)

may be configured to maintain a desired pressure in a reservoir or in a flow path from that reservoir. A product recirculation system may be configured to adjust flow rate in the product recirculation system.

14 Claims, 50 Drawing Sheets

(51) Int. Cl.
| | |
|---|---|
| *B67C 3/20* | (2006.01) |
| *F16K 31/08* | (2006.01) |
| *G01G 17/04* | (2006.01) |
| *B67C 3/06* | (2006.01) |
| *B67C 3/16* | (2006.01) |
| *B67C 3/26* | (2006.01) |
| *B65B 55/02* | (2006.01) |
| *B65B 59/00* | (2006.01) |

(52) U.S. Cl.
CPC ............. *B67C 3/06* (2013.01); *B67C 3/16* (2013.01); *B67C 3/202* (2013.01); *B67C 3/2634* (2013.01); *B67C 3/28* (2013.01); *F16K 31/086* (2013.01); *G01G 17/04* (2013.01); *B65B 2220/14* (2013.01)

(58) Field of Classification Search
CPC ....... B67C 3/202; B65B 55/027; B65B 59/00; B65B 2220/14; G01G 17/04; F16K 31/086
See application file for complete search history.

(56) References Cited

U.S. PATENT DOCUMENTS

| | | | |
|---|---|---|---|
| 3,163,248 | A | 12/1964 | Farquhar |
| 4,637,438 | A | 1/1987 | Weiss |
| 5,524,683 | A | 6/1996 | Mueller |
| 6,073,667 | A | 6/2000 | Graffin |
| 6,774,368 | B2 | 8/2004 | Busch et al. |
| 7,647,950 | B2 | 1/2010 | Clusserath |
| 2005/0069631 | A1 | 3/2005 | Kim |
| 2007/0006939 | A1 | 1/2007 | Clusserath |
| 2008/0265189 | A1 | 10/2008 | Bravo |
| 2010/0071803 | A1 | 3/2010 | Clusserath et al. |
| 2010/0300580 | A1 | 12/2010 | MacQuet et al. |
| 2011/0088813 | A1 | 4/2011 | Graffin |
| 2012/0241044 | A1 | 9/2012 | Krulitsch et al. |
| 2012/0318405 | A1 | 12/2012 | Spasov et al. |
| 2015/0284234 | A1 | 10/2015 | Meinzinger |

FOREIGN PATENT DOCUMENTS

| | | | |
|---|---|---|---|
| CN | 201052964 | Y | 4/2008 |
| CN | 100457600 | C | 2/2009 |
| CN | 101367501 | A | 2/2009 |
| CN | 102196988 | A | 9/2011 |
| CN | 102317197 | A | 1/2012 |
| CN | 102548890 | A | 7/2012 |
| CN | 102803122 | A | 11/2012 |
| CN | 202766269 | U | 3/2013 |
| DE | 8308618 | U1 | 7/1983 |
| DE | 20105716 | U1 | 5/2002 |
| DE | 102010047883 | A1 | 4/2012 |
| EP | 0 436 214 | A1 | 7/1991 |
| EP | 1072511 | A1 | 1/2001 |
| EP | 1598308 | A1 | 11/2005 |
| GB | 1233356 | A | 5/1971 |
| GB | 2098588 | A | 11/1982 |
| GB | 2160182 | A | 12/1985 |
| JP | 502969 | A | 1/1975 |
| JP | S 50143690 | A | 11/1975 |
| JP | 58-170982 | A | 10/1983 |
| JP | S 61115881 | A | 6/1986 |
| JP | H02-142982 | A | 6/1990 |
| JP | H04-021401 | U | 2/1992 |
| JP | 2000043991 | A | 2/2000 |
| JP | 2000062704 | A | 2/2000 |
| JP | 2001012644 | A | 1/2001 |
| JP | 2001097489 | A | 4/2001 |
| JP | 2001521166 | A | 11/2001 |
| JP | 2002061612 | A | 2/2002 |
| JP | 2002527313 | A | 8/2002 |
| JP | 2003312783 | A | 11/2003 |
| JP | 2003321093 | A | 11/2003 |
| JP | 2004059072 | A | 2/2004 |
| JP | 2005126077 | A | 5/2005 |
| JP | 2005-263293 | A | 9/2005 |
| JP | 3881662 | B2 | 2/2007 |
| JP | 2007069928 | A | 3/2007 |
| JP | 2009083882 | A | 4/2009 |
| JP | 2009286497 | A | 12/2009 |
| JP | 4531372 | B2 | 8/2010 |
| JP | 2010527850 | A | 8/2010 |
| JP | 2010247879 | A | 11/2010 |
| JP | 4668744 | B2 | 4/2011 |
| JP | 2012517945 | A | 8/2012 |
| SU | 309899 | A2 | 7/1971 |
| WO | WO 1992/014125 | A1 | 8/1992 |
| WO | WO 2011045023 | A1 | 4/2011 |
| WO | WO 2011/106852 | A1 | 9/2011 |
| WO | WO 2012048791 | A1 | 4/2012 |

OTHER PUBLICATIONS

Written Opinion of the International Searching Authority for PCT/US2014/031469 dated Oct. 31, 2014, 31 pages.

Time = T2
(filling valve starting to open)

Time = T3
(filling valve fully open)

FIG. 8C

Time = T3
(filling valve fully open)

Time = T7
("full"; filling valve closing resumes)

CONTAINER FILLING SYSTEM AND VALVE FOR SAME

CROSS-REFERENCE TO RELATED APPLICATIONS

This application claims the benefit of U.S. provisional patent application Ser. No. 61/804,452, filed Mar. 22, 2013, and titled "Universal Filling System and Valve for Same." Application 61/804,452, in its entirety, is incorporated by reference herein.

BACKGROUND

Beverage products are a category of products intended for human consumption, typically by drinking. Beverage products are commonly placed into some type of primary packaging for distribution and sale. Primary packaging can include any of various container types. Examples include bottles formed from PET (polyethylene terephthalate), HDPE (high density polyethylene) or other plastics, glass bottles, aluminum bottles, cans, etc. Primary packaging may have a wide range of sizes and shapes, even for a single type of product.

Systems for filling primary packaging containers with a beverage product generally include a filling valve that starts and stops a flow of the product into a container that is being filled. The filling valve is usually connected to a tank or other type of reservoir that holds a larger quantity of the beverage product in question. The manner of filling a container varies for different types of beverage products. For some types of beverage products, a container may be cold filled. In a cold fill process, product is dispensed into a container while that product is in a chilled or room temperature state. For some types of beverage products, containers are warm filled or hot filled. In these types of filling processes, product is dispensed into a container while that product is in a heated state. Still other types of beverage products must be placed into a sterile container under sterile conditions, a process known as aseptic filling.

Current systems for filling primary packaging containers with beverage products are designed to handle a narrow range of product types and filling scenarios. For example, most filling systems are designed for only one of cold filling, warm/hot filling, extended shelf life filling, high acid aseptic filling or low acid aseptic filling. As another example, available filling systems are designed to fill containers with products that are in a fairly narrow range of viscosities. Conventional systems are also limited with regard to the type, size and concentration of inclusions that may be present in a product. When filling containers with product that is not of low viscosity (e.g., if product viscosity is above approximately 20 centipoise) or that contains inclusions, many such conventional systems must also operate at substantially reduced speeds.

These limitations severely restrict the product space that can be successfully packaged with a single filling system. This in turn limits flexibility and usefulness of expensive production facilities. If product volumes drop significantly or if a product type is no longer required, it can be expensive and time consuming to convert to equipment usable for filling containers with a different type of beverage product. Manufacturers of beverage filling systems prefer to offer several filling systems to a plant in order to fill a wide range of products (i.e., provide multiple beverage filling platforms) instead of offering a single filler that can handle a wide range of products.

SUMMARY

This Summary is provided to introduce a selection of concepts in a simplified form that are further described below in the Detailed Description. This Summary is not intended to identify key features or essential features of the invention.

Embodiments include a container filling valve. The filling valve may include a shuttle and a drive sleeve that are magnetically coupled. Movement of the drive sleeve may move the shuttle from a position in which the filling valve is closed to a position in which the filling valve is open.

Embodiments also include a container handling arm. The arm may include a distal end configured to hold a container and a proximal end that includes a load cell. The arm may be adjustable to alter a ratio between load imposed by a container and a load imposed on the load cell. The arm adjustments may be performed automatically in some embodiments.

Embodiments further include a low flow setpoint system. That system may be configured to arrest closing of a filling valve when that filling valve is partially closed. That system may be adjustable and may include a fluid actuator configured for arresting valve shuttle movement.

Embodiments also include a pressure control system. That system may be configured to maintain a desired pressure in a reservoir or in a flow path from that reservoir. The system may be configured to maintain a desired pressure that is a vacuum.

Embodiments additionally include a product recirculation system that may be used, e.g., during hot filling operations. That system may be configured to adjust flow rate in the product recirculation system. In some embodiments, the flow rate may be adjusted by adjusting a flow rate of a variable speed pump. In other embodiments, the flow rate may be adjusted in other ways.

Embodiments include a filling system configurable to fill a wide variety of container types with a wide variety of products under a multiple types of filling conditions. The products may range in viscosity from 1 centipoise (cps) to 400 cps. The products may also contain inclusions. The inclusions may take the form of chunks or particles that have a size as large as a 10 millimeter square cube and/or have a volume as large as 1000 cubic millimeters. Such inclusions may be as small as 1 millimeter, e.g., inclusions that fit within a 1 millimeter×1 millimeter×1 millimeter cube. Inclusions could also take the form of pulp sacs having lengths as long as 10 millimeters and fibers having lengths as long as 20 millimeters. A product may contain inclusions of multiple types (particles, chunks, pulp and/or fibers). The volumetric percentage of inclusions in a product may be as high as 50%.

Embodiments include methods for using the devices and systems described herein.

Additional embodiments are described herein.

BRIEF DESCRIPTION OF THE DRAWINGS

Some embodiments are illustrated by way of example, and not by way of limitation, in the figures of the accompanying drawings and in which like reference numerals refer to similar elements.

FIGS. 8A through 8H are partially schematic drawings of a rear view of the filler unit of FIG. 1A and that further explain the operation of a low flow setpoint system according to some embodiments.

FIGS. 8I through 8P are partially schematic rear views of a filler unit incorporating a low flow setpoint system according to another embodiment.

DETAILED DESCRIPTION

Figure 1A:
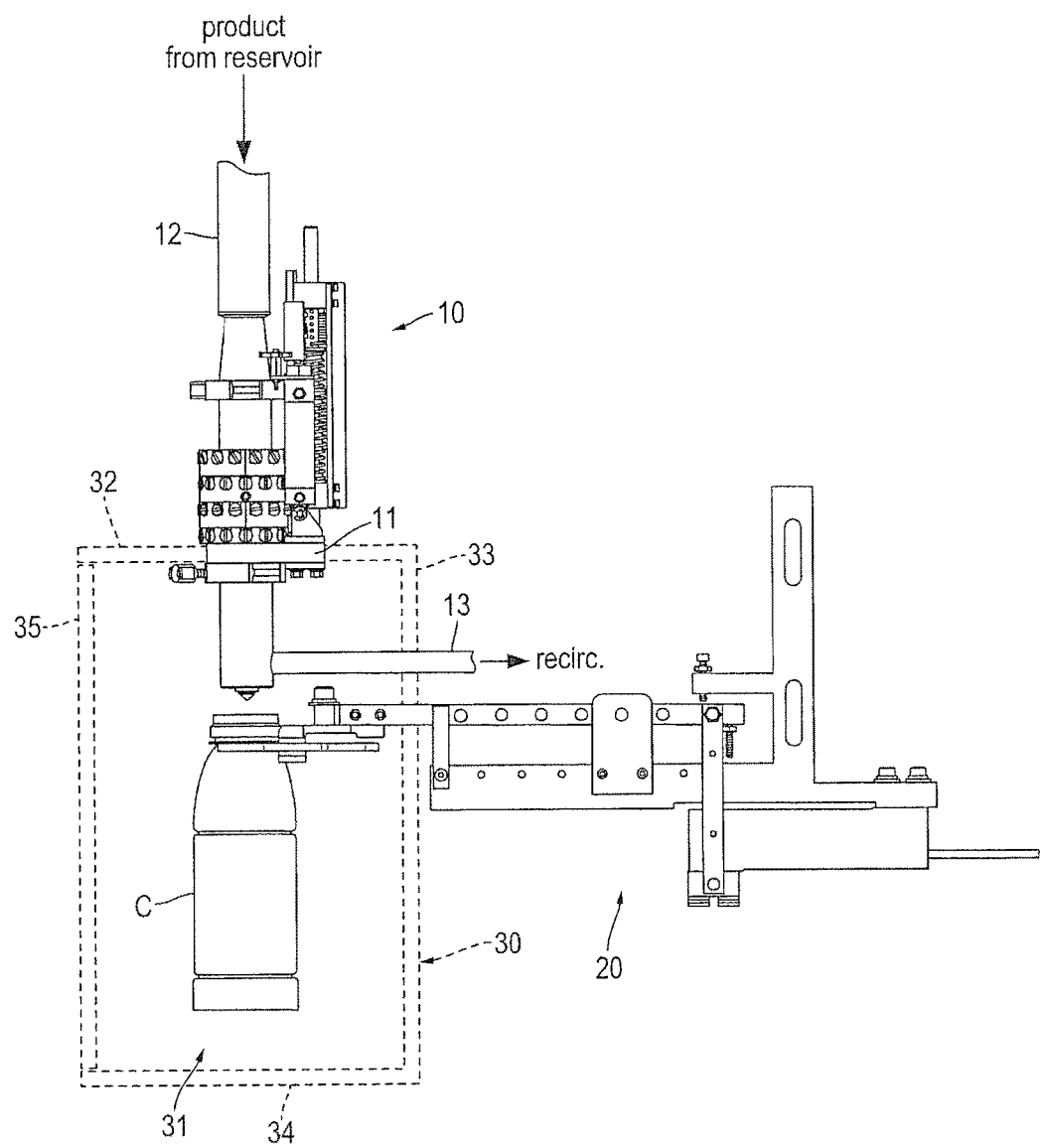
FIG. 1A is a left side view of a filler unit and a corresponding container handling arm.

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

As used in this application, including the claims, the following terms have meanings apply. "Configured for <function or operation>," when used in connection with a particular component, device, or system, indicates that the component, device or system in question includes structure that places the component, device or system in a state in which it is ready to perform the identified operation or function. A "fluid," unless indicated otherwise, may be a liquid, a gas or a mixture of liquid and gas. "Including" is synonymous with "comprising." For example, stating that "X includes element Y" does not preclude X from also including other elements.

Beverage container filling systems according to at least some embodiments may include filling valves and/or other equipment as described herein. As explained in further detail below, these filling systems can fill different types containers with a wide variety of beverage products and under a multiple different filling scenarios. For example, during one time period a filling system may be operated as a cold fill (CF) system and fill containers with a chilled or room temperature beverage product. During another time period, that same filling system may operate as a hot fill (HF) system and fill containers with a heated beverage product. During yet another time period, that filling system may operate as an extended shelf life (ESL) fill system. During other time periods, that filling system may operate as a high acid aseptic (HAA) or as a low acid aseptic (LAA) filling system.

Filling systems according to some embodiments may also accommodate a wide range of beverage product types. At least some such systems can fill containers with beverage products having viscosities in a range of about 1 centipoise (cps) to about 400 cps. Non-limiting examples of beverage products in this viscosity range include water (1 cps), milk (3 cps), fruit juices (55 to 75 cps), tomato juice (180 cps) and drinkable yogurt (50 to 400 cps).

Systems according to some embodiments also fill containers with multi-phase beverage products that comprise a liquid with hard or soft inclusions. Inclusions may take the form of chunks, particles, pulp and/or fibers. Examples of soft inclusions include fruit chunks, vegetable chunks, gum pieces, tapioca pieces, other types of soft food products, intact fruit pulp sacs and fruit fibers. Examples of hard inclusions include seeds, nut pieces and grains. In at least some embodiments, a system can fill containers with beverage products having particulate or chunk type inclusions (hard or soft) with sizes as large as, or able to fit within, a cube approximately 10 millimeters (mm)×approximately 10 mm×approximately 10 mm, pulp sac inclusions as long as 10 mm, and fiber inclusions as long as 20 mm. A product may contain inclusions of multiple types (particles, chunks, pulp and/or fibers). The percentage (by volume) of inclusions in such a product may be as high as 50%, as low as 1% (or even 0%), or any percentage value in between. As but some examples, in various embodiments a system can fill containers with beverage products having inclusions at a volumetric concentration of less than 1%, of about 1%, from 1% to 5%, from 5% to 10%, from 10% to 15%, from 15% to 20%, at least 20%, at least 25%, at least 30%, at least 35%, at least 40%, or at least 45%. In embodiments corresponding to each of those volumetric inclusion concentrations, each of at least a portion of the inclusions may have a volume of 1 cubic millimeter or less (e.g., each of the inclusions fit within a 1 mm×1 mm×1 mm cube), a volume of at least 125 cubic millimeters (e.g., a 5 mm×5 mm×5 mm cube), a volume of at least 216 cubic millimeters (e.g., a 6 mm×6 mm×6 mm cube), a volume of at least 343 cubic millimeters (e.g., a 7 mm×7 mm×7 mm cube), a volume of at least 400 cubic millimeters (e.g., a 7.37 mm×7.37 mm×7.37 mm cube), a volume of at least 512 cubic millimeters (e.g., a 8 mm×8 mm×8 mm cube), or a volume of at least 729 cubic millimeters (e.g., a 9 mm×9 mm×9 mm cube). Inclusions may be spherical or any have any other shape.

Figure 1B:
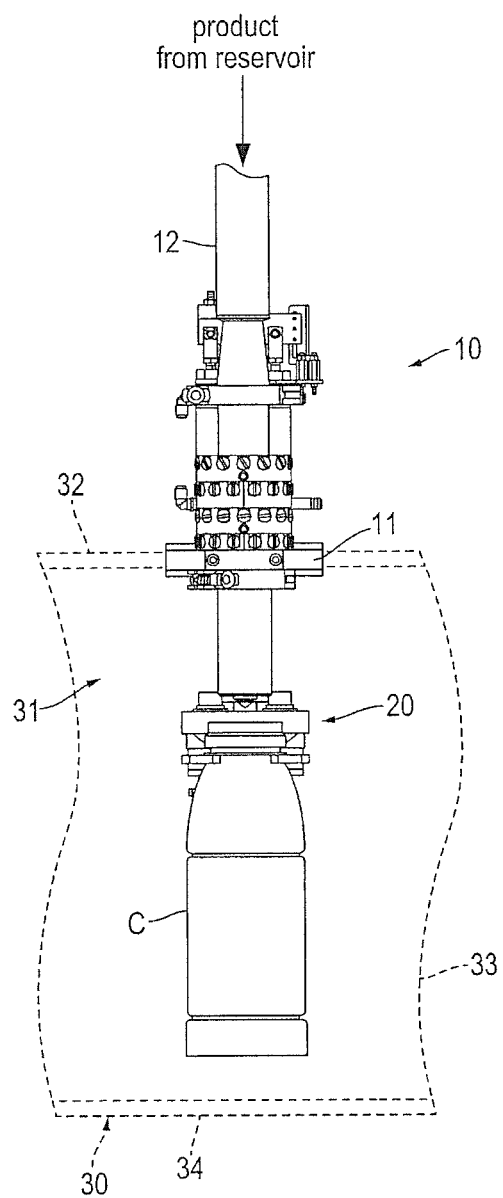
FIG. 1B is a front view of the filler unit and container handling arm of FIG. 1A.

FIG. 1A is a left side view of a filler unit 10 and an associated container handling arm 20 according to at least some embodiments. FIG. 1B is a front view of filler unit 10 and handling arm 20. FIGS. 1A and 1B show handling arm 20 holding a beverage container C in a filling position under filler unit 10. While container C is in that filling position, a filling valve of filler unit 10 may controllably allow beverage product to flow into an opening in the neck of container C. Additional components of filler unit 10 and container handling arm 20, as well their operation, are described below. As also explained below, a complete filling system in some embodiments may include multiple additional filler units identical to filler unit 10 and multiple container handling arms similar to arm 20.

Filler unit 10 is mounted to a support shelf 11. As explained in more detail below in connection with FIG. 2, support shelf 11 may hold additional filler units that are arranged to lie in a circular pattern. An inlet tube of filler unit 10 is connected to a product reservoir (not shown in FIGS. 1A and 1B) through a feed tube 12. A recirculation pipe 13 is part of a system that may be used to recirculate product, as described in more detail herein.

Broken lines in FIG. 1A schematically show a portion of a barrier 30. The space within barrier 30 forms an aseptic zone 31 under filler unit 10 and under other filler units in the same filling system. Barrier 30, which may be similar to aseptic zone barriers found in conventional filling systems, may include upper, inner, lower and outer partitions 32, 33, 34 and 35, respectively. Sterilized air may be pumped into aseptic zone 31. That sterilized air then flows out of openings in or between partitions 32 through 35 to prevent contaminants from entering aseptic zone 31. Handling arm 20, recirculation pipe 13 and other equipment (not shown) may extend into aseptic zone 31 through such openings. Upper partition 32, inner partition 33 and lower partition 34 are shown in FIG. 1B, with outer partition 35 omitted. As indicated by the curved lines on the right and left sides of FIG. 1B, barrier 30 may continue beyond both sides of filler unit 10 so as to extend aseptic zone 31 under other filler units. Although FIGS. 1A and 1B show barrier 30 incorporating shelf 11, this need not be the case. In some embodiments, for example, an upper partition of an aseptic zone barrier may be located below a clamp that connects a cup of a filling valve to other portions of that valve (e.g., the clamp shown directly under shelf 11 in FIGS. 1A and 1B).

Figure 2:
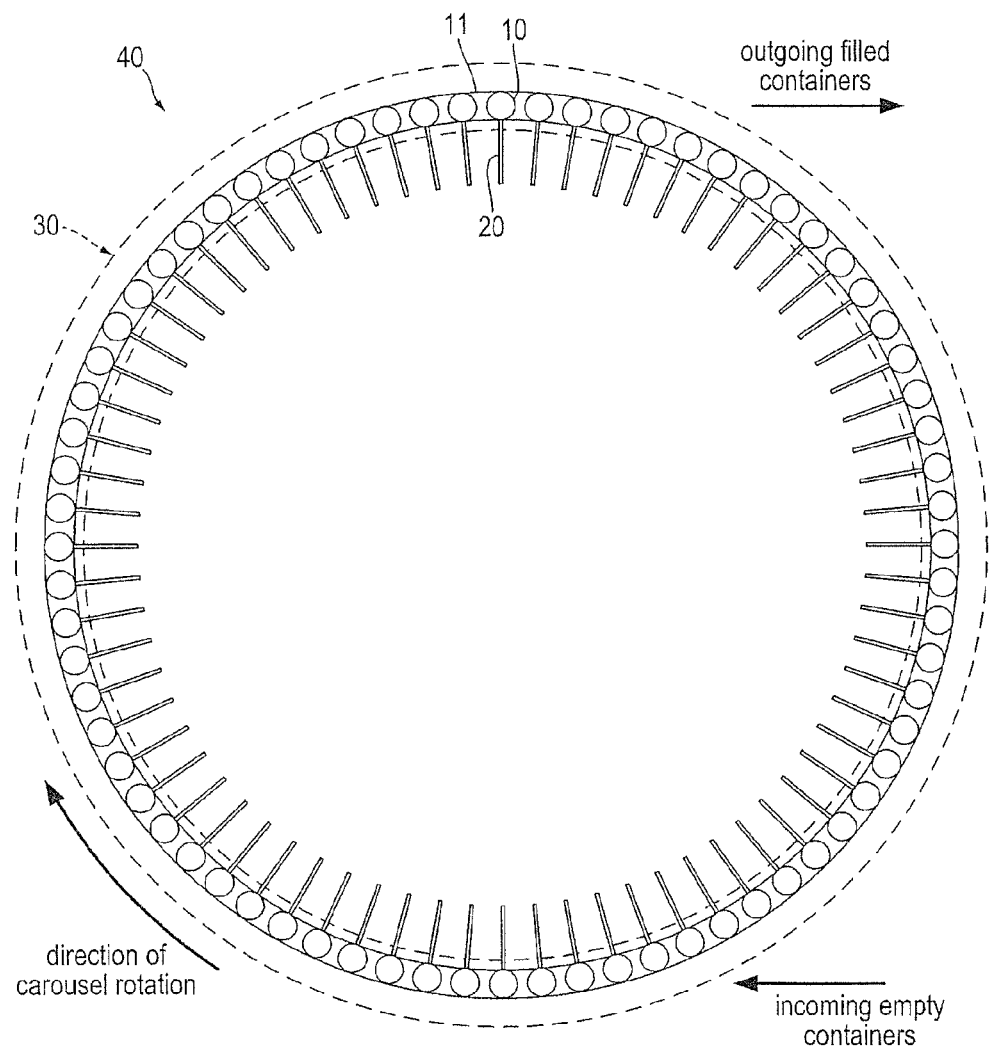
FIG. 2 is a partially schematic top view of a carousel-type beverage product container filling system that includes the filler unit and handling arm of FIG. 1A.

FIG. 2 is a partially schematic top view of a carousel-type beverage product container filling system 40 that includes filler unit 10 (shown symbolically as a circle) and handling arm 20 (shown symbolically as a rectangle). Filling system 40 includes seventy-one additional filler units 10 and seventy-one additional handling arms 20. For convenience, symbols for only one filler unit 10 and one handling arm 20 are labeled. The locations of other filler units 10 and handling arms 20 are apparent from the positions of other symbols similar to the labeled symbols. Filling system 40 rotates in the clockwise direction as indicated. The filler units 10 are arranged near an outer perimeter of the system 40 carousel. The handling arms 20 associated with each of those filler units 10 extend radially inward toward the center of the system 40 carousel. As indicated above, shelf 11 may be in the shape of a ring (or may be multiple brackets joined to form a ring) so as to hold the filler units in a circular arrangement. Additional brackets (not shown) may support the handling arms and other components of filling system 40. Also indicated in FIG. 2 are the boundaries of barrier 30. Upper partition 32, inner partition 33 and lower partition 34 may be attached to the rotating carousel portion of filling system 40, with outer partition 35 remaining stationary. Outer partition 35 may include openings for a conveyor to feed empty containers into the carousel and for another conveyor to carry filled containers from the carousel. Approximate locations for these conveyors are indicated in FIG. 2 with arrows showing the direction in which empty containers travel to the carousel and the direction in which filled containers travel from the carousel.

Although not shown in FIG. 2, other components of filling system 40 may be located in the central carousel region surrounded by filler units 10 and their corresponding handling arms 20. Those components can include, without limitation, a product reservoir, a product recirculation system, a pressure control system, and other components described herein. FIG. 2 merely indicates one arrangement of filler units and handling arms according to some embodiments. Other embodiments may include fewer or more filler unit and handling arm pairs. A filling system need not be rotatable. In some embodiments, for example, filler units and/or container handling arms such as those described herein may be arranged linearly.

Figure 3A:
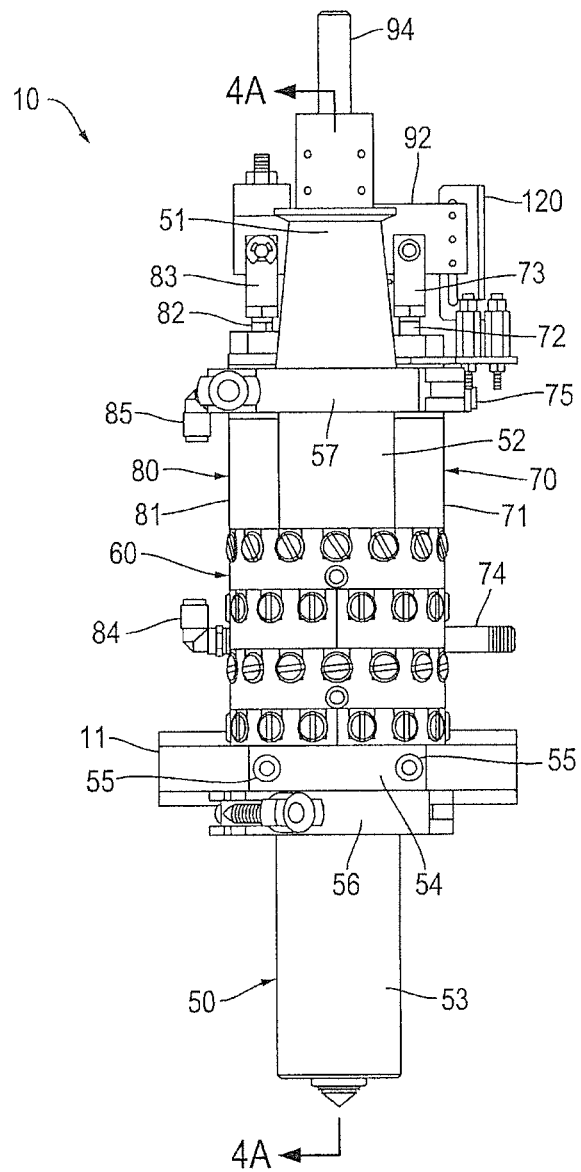
FIGS. 3A through 3F are, respectively, enlarged front, left side, right side, rear, left perspective and right perspective views of the filler unit of FIG. 1A.
Figure 3B:
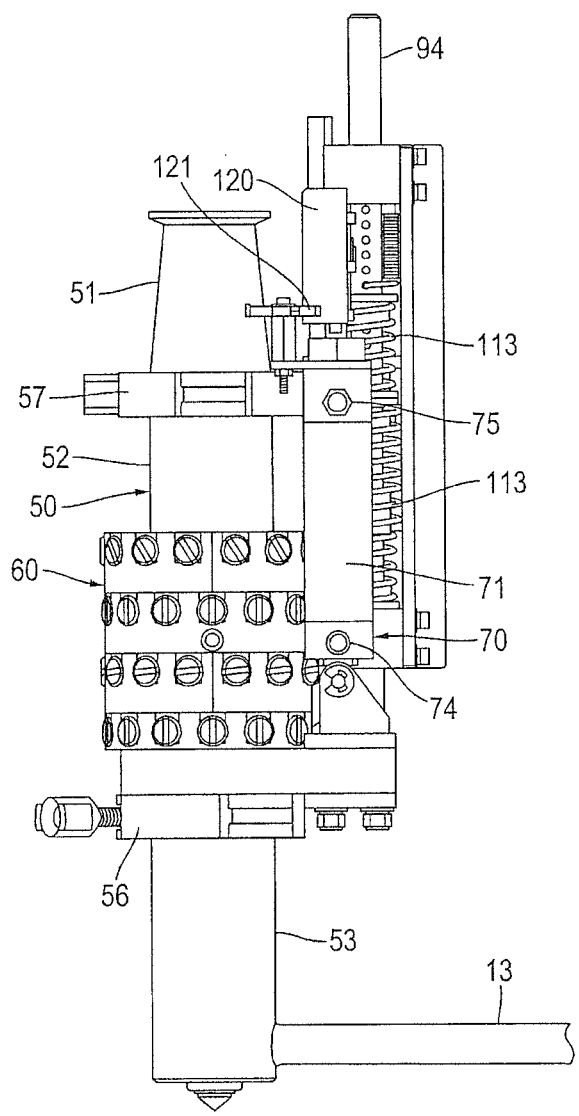
Figure 3C:
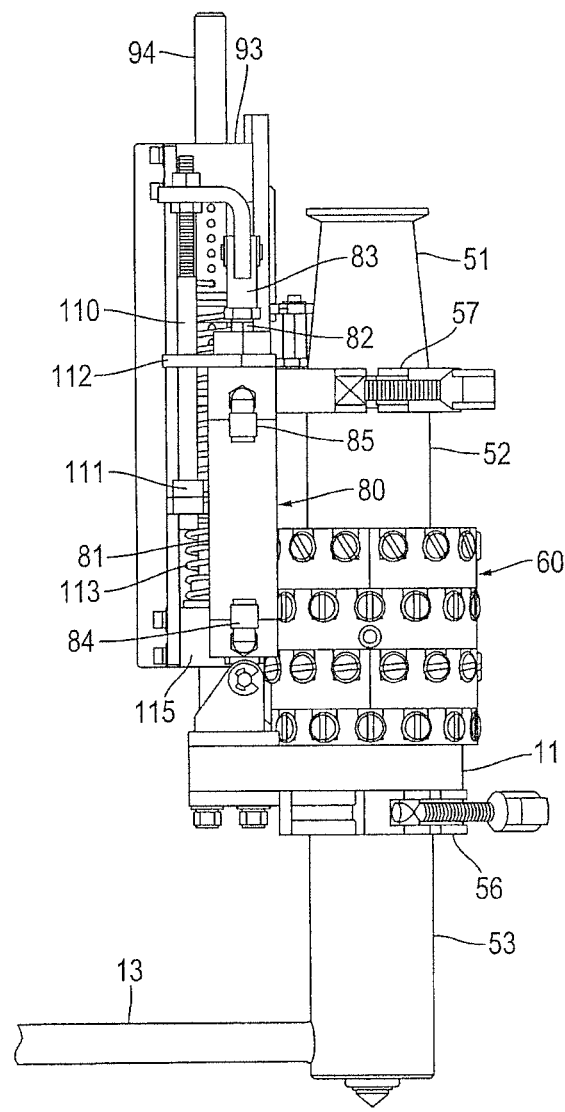
Figure 3D:
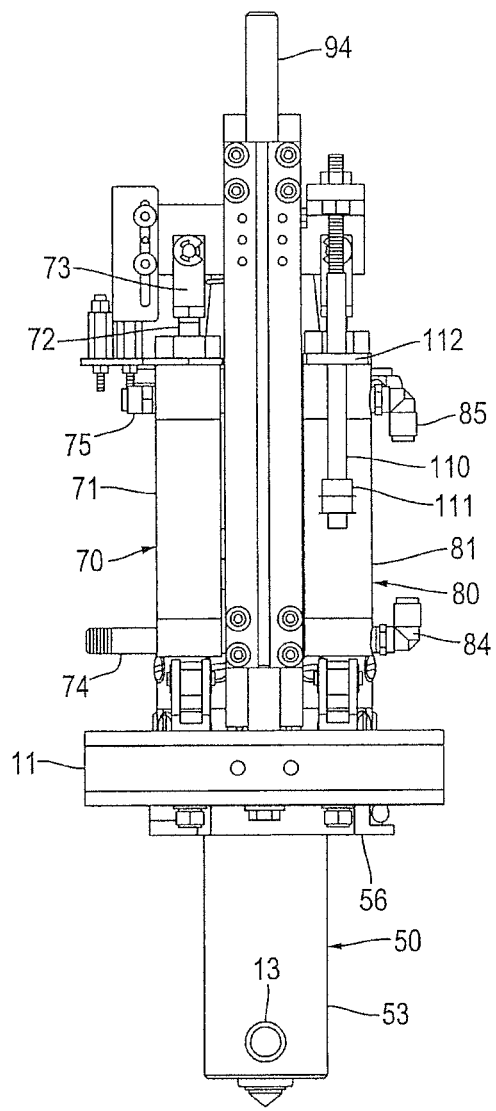
Figure 3E:
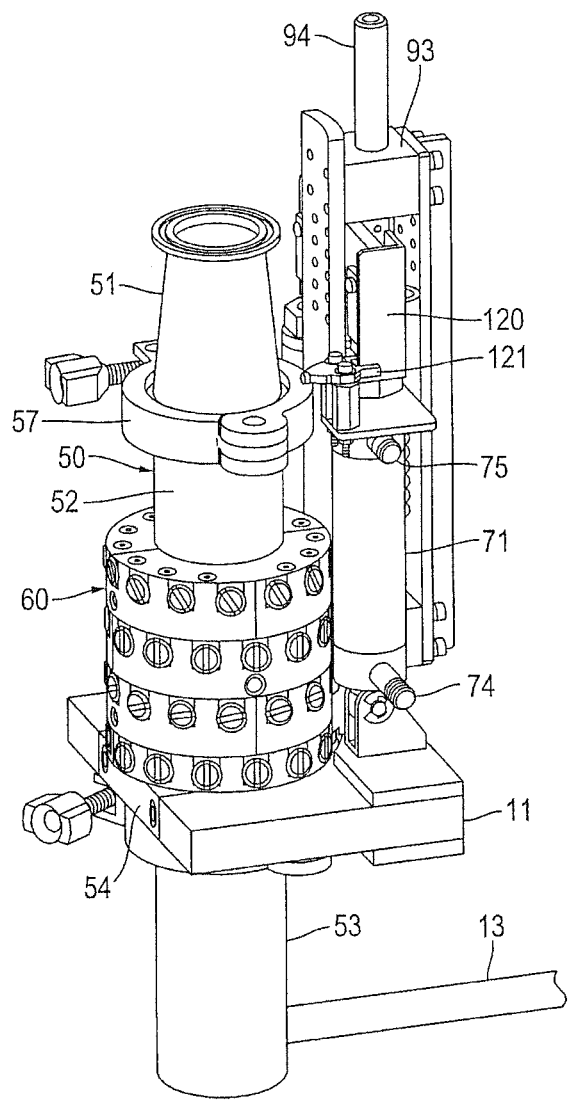
Figure 3F:
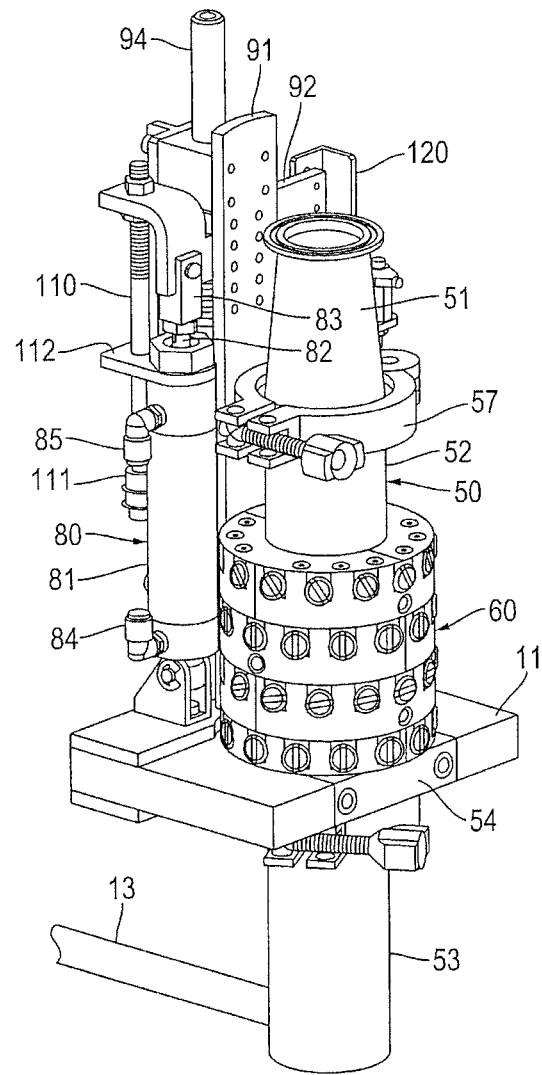

FIG. 3A is an enlarged front view of filler unit 10. FIG. 3B is an enlarged left side view of filler unit 10. FIG. 3C is an enlarged right side view of filler unit 10. FIG. 3D is an enlarged rear view of filler unit 10. FIG. 3E is a left front perspective view of filler unit 10. FIG. 3F is a right front perspective view of filler unit 10.

Filler unit 10 includes a filling valve 50 that is closed in FIGS. 3A-3F. Filling valve 50 includes a housing formed by an inlet tube 51, a main tube 52 and a cup 53. A lower portion of main tube 52 extends through an opening in support shelf 11 and is held in place by a retaining bar 54 and screws 55. Main tube 52 may be attached to cup 53 and to inlet tube 51 by conventional clamps 56 and 57, respectively. Each of clamps 56 and 57 may be of the type commonly known in the art as a "Tri-Clamp." Conventional sanitary gaskets (e.g., of the type commonly used with Tri-Clamp clamps) may be situated between inlet tube 51 and main tube 52 and between main tube 52 and cup 53 to seal form connections. Product recirculation pipe 13 extends from the bottom of cup 53 to a product recirculation system.

Components and operation of that product recirculation system are described below in conjunction with FIG. 9B.

Filling valve 50 also includes a magnetic drive sleeve 60 that surrounds main tube 52. Drive sleeve 60 is movable along main tube 52. As explained in more detail below, a shuttle located inside of the filling valve 50 housing is magnetically coupled to drive sleeve 60. When filling valve 50 is closed, a stopper on a bottom end of that shuttle is positioned to close a dispensing outlet in the bottom of cup 53. Movement of drive sleeve 60 toward inlet tube 51 moves the shuttle upward, thereby moving the shuttle stopper out of the outlet and allowing product to flow out of the outlet and into a container located in a filling position below cup 53.

In addition to valve 50, filling unit 10 includes two fluid actuators 70 and 80. Fluid actuator 70 includes a main housing 71. A rod 72 of actuator 70 extends and retracts from housing 71 and is coupled to a movable piston inside of housing 71. Similarly, fluid actuator 80 includes a main housing 81 and a rod 82 that extends and retracts from housing 81 and that is coupled to a piston inside housing 81. Lower ends of actuators 70 and 80 are pivotally attached to support shelf 11. Upper ends 73 and 83 of rods 72 and 82 are coupled to drive sleeve 60 via additional components, as described below. Actuator 70 is configured to open and close filling valve 50. To open filling valve 50, pressurized air is introduced into a lower piston chamber of housing 70 through a fitting 74 while air is allowed to escape from an upper piston chamber of housing 71 through a fitting 75. To close filling valve 50, air is allowed to escape from the lower chamber through fitting 74 while pressurized air is introduced into the upper chamber through fitting 75. Flow of air into and out of the chambers of actuator 70 may be controlled using conventional solenoid-actuated air valves, not shown.

Actuator 80 is configured to stop movement of drive sleeve 60. In particular, and as described in more detail below in connection with FIGS. 8A through 8H, actuator 80 is part of an adjustable low flow setpoint system. Fluid enters and leaves a lower piston chamber of housing 81 through fitting 84. Fluid enters and leaves an upper piston chamber of housing 81 through fitting 85.

Figure 3G:
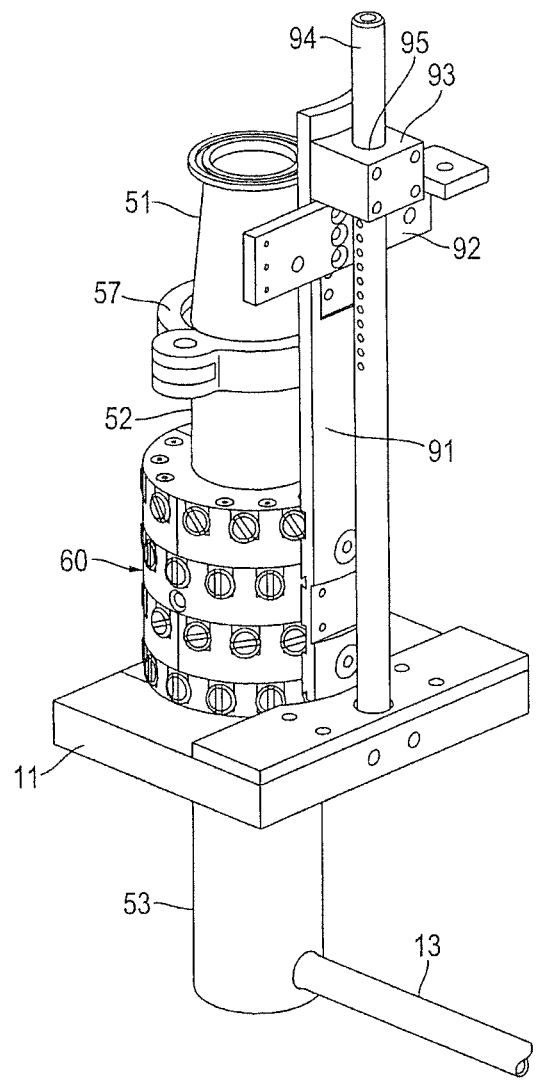
FIG. 3G is an enlarged left rear perspective view of the filler unit of FIG. 1A, but with certain components removed.

FIG. 3G is an enlarged left rear perspective view of filler unit 10, but with actuators 70 and 80 and various other components removed to better show certain underlying structure of filler unit 10. As in FIGS. 3A-3F, filling valve 50 is closed in FIG. 3G. A lower end of a riser bracket 91 is attached to drive sleeve 60. A crossbar 92 is attached to riser bracket 91 near an upper end. A guide block 93 is also attached to riser bracket 91 near the upper end. A guide rod 94 extends upward through a hole 95 in guide block 93, with a bottom end of guide rod 94 attached to support shelf 11. Hole 95 is sized so that guide block 93 can slide up and down along rod 94. Upper ends 73 and 83 of rods 72 and 82 of actuators 70 and 80 are attached to crossbar 92.

An adjustable rod 110 (FIG. 3C) limits the upward movement of drive sleeve 60. A stop 111 on the bottom of rod 110 abuts the underside of plate 112 when drive sleeve 60 is at the top of its upward stroke. One or more coil springs 113 are positioned over guide rod 94 and constrained by a pin through guide rod 94. Another guide block 115 (visible in FIG. 3C) is attached to a lower end of riser bracket 91 and also slides on guide rod 94 as drive sleeve 60 is raised or lowered. Springs 113 are compressed by guide block 115 and the pin when drive sleeve 60 is raised. Springs 113 thus bias filling valve 50 to a closed position. This provides a fail-safe closed feature that will automatically close valve 50 in the event of a power outage. An optical flag 120 may be attached to crossbar 92 (FIG. 3E) and move into and out of a slot in an optical sensor 121. Sensor 121 is discussed in more detail below in connection with FIGS. 8A through 8H.

Figure 4A:
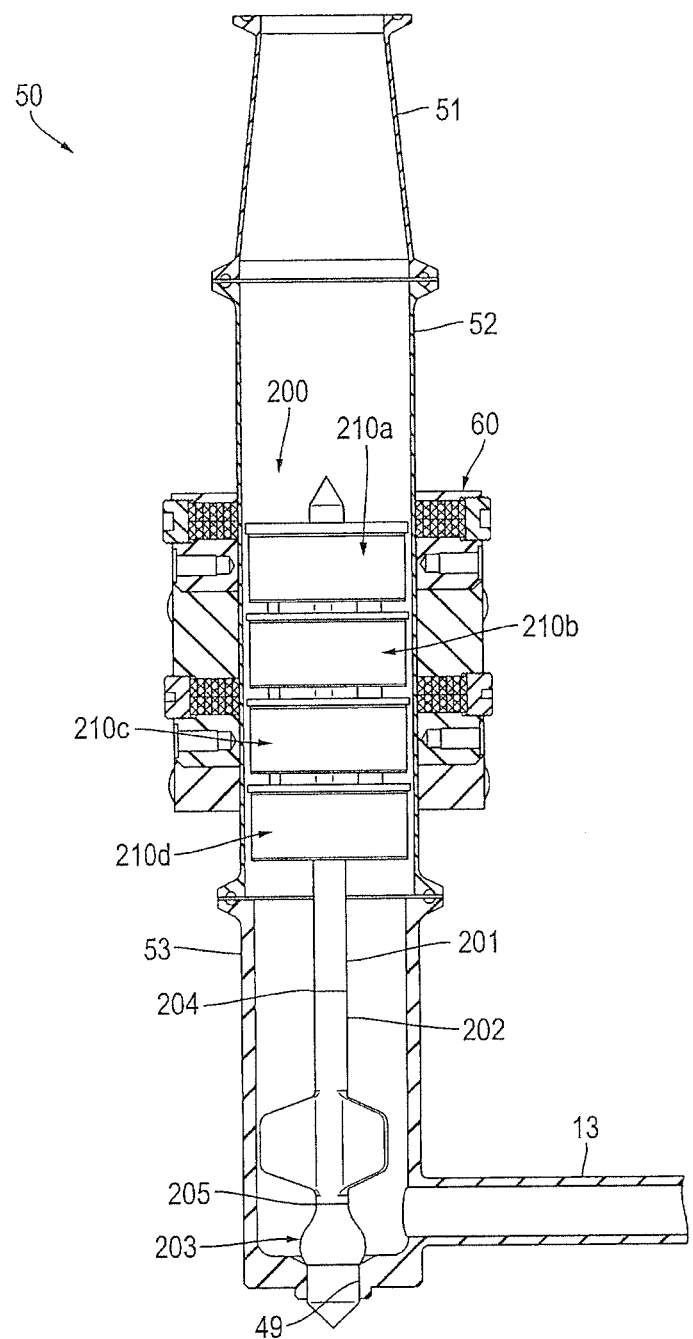
FIG. 4A is a partial cross-sectional view taken from the location indicated in FIG. 3A.

FIG. 4A is a partial cross-sectional view taken from the location indicated in FIG. 3A. Clamps 56 and 57 and other external components of filler unit 10 are omitted from FIG. 4A. Shown in cross-section in FIG. 4A are inlet tube 51, main housing 52, cup 53, and drive sleeve 60. FIG. 4A reveals the shuttle 200 of filling valve 50. Shuttle 200 is not shown in cross-section in FIG. 4A.

Shuttle 200 include a center stem 201 and four magnetic drive rings 210a, 210b, 210c and 210d. Drive rings 210a-210d are collectively referred to as "rings 210"; an arbitrary one of rings 210 is generically referred to as a "ring 210." A similar convention is followed elsewhere in this description where multiple similar or identical components are assigned a common reference numeral with an appended letter.

As explained in further detail below, each of rings 210 includes multiple magnets that are oriented so as to be in repulsion with magnets of drive sleeve 60 and that are sealed within stainless steel enclosures of rings 210. Stem 201 is extended by a guide vane element 202 and an end element 203. Guide vane element 202 is attached to stem 201 at a threaded connection 204 and to end element 203 at a threaded connection 205. When filling valve 50 is closed, and as shown in FIG. 4A, a portion of end element 203 rests on the inside edge and shoulder of an outlet 49 so as to prevent flow of product through outlet 49.

Figure 4B:
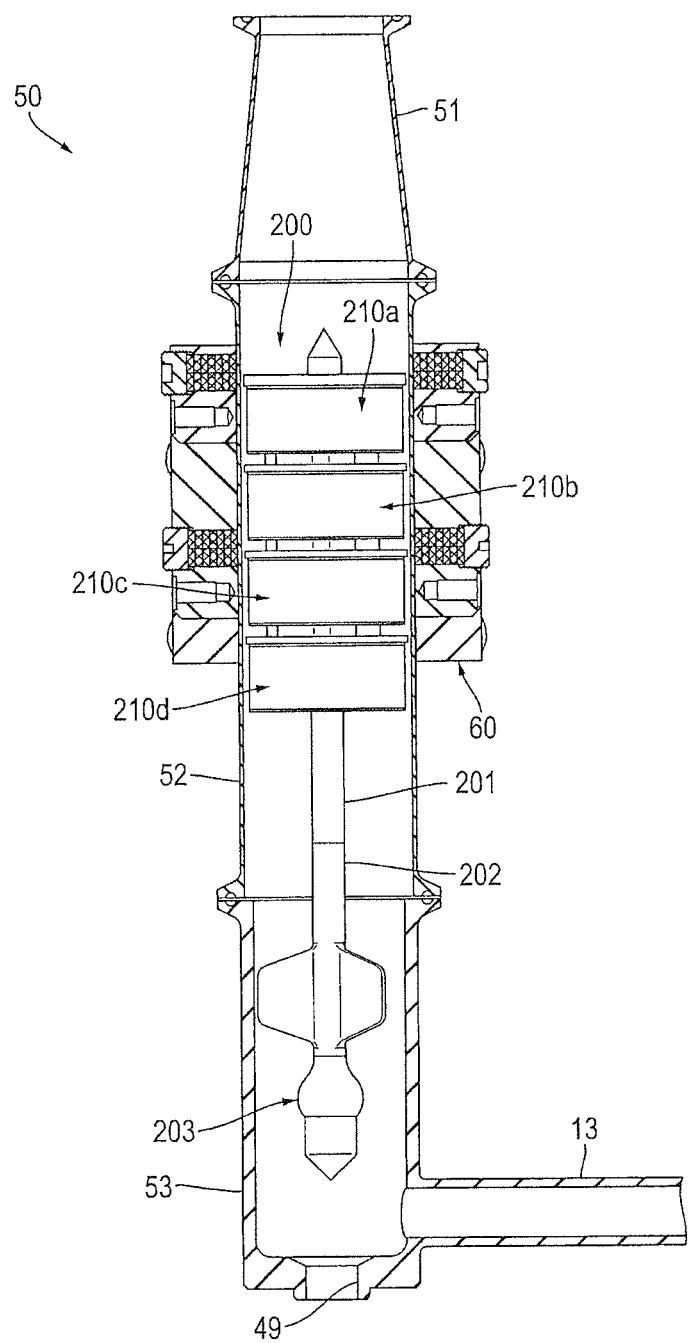
FIG. 4B is a cross-sectional view similar to FIG. 4A, but with the filling valve in an open condition.

FIG. 4B is a cross-sectional view similar to FIG. 4A, but with filling valve 40 in an open condition. When filling valve 50 is open, and as shown in FIG. 4B, drive sleeve 60 is raised. Because magnets of drive sleeve 60 and of drive rings 210 are in repulsion, rings 210 remain centered about the longitudinal centerline of main tube 52. As explained in more detail below, a "magnetic spring" is formed by the magnetic force of magnets in rings 210 and sleeve 60. This spring is not shown as compressed in FIG. 4A. Because shuttle 200 is magnetically coupled to sleeve 60, it moves up and down with sleeve 60. When shuttle 200 moves upward, end element 203 is withdrawn from opening 49 and product can flow from opening 49 to a container positioned under cup 53.

As seen in FIGS. 4A and 4B, a flow path through the interior of the filling valve 50 housing is substantially straight. In some embodiments, outlet 49 has a width of approximately 0.625 inches. As used herein when describing a size of an opening or other flow passage, a "width" could be a diameter if the opening or passage is circular.

Figure 5A:
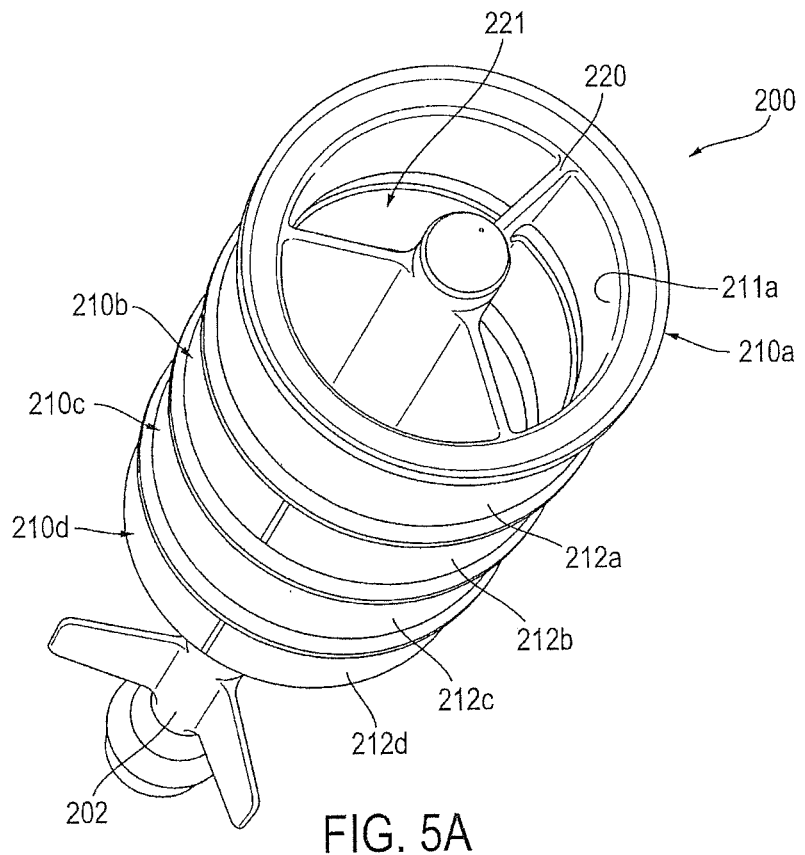
FIGS. 5A through 5C are, respectively, enlarged top perspective, top and bottom perspective views of a shuttle from the filler unit of FIG. 1A.
Figure 5B:
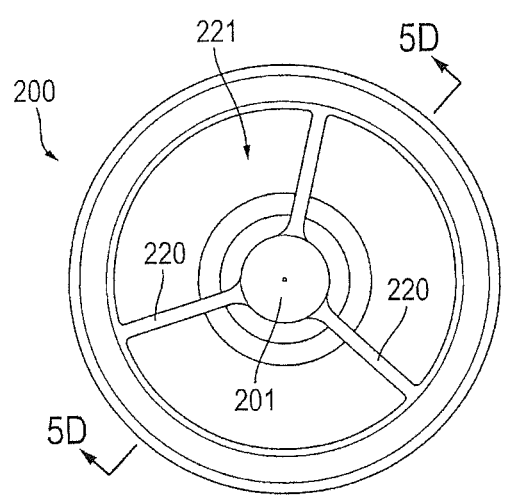

FIG. 5A is a top perspective view of shuttle 200 removed from filling valve 50. Except as indicated below, drive rings 210 are substantially identical to one another. Each of rings 210b through 201d includes an inner wall 211 and an outer wall 212 similar to inner wall 211a and outer wall 212a of ring 210a. Each of rings 210 also includes a sweeper ridge 232, which sweeper ridges are discussed below. As discussed below in connection with FIGS. 5D and 5E, magnets are sealed in the space between the inner wall 211 and the outer wall 212 of each ring 210. Rings 210 are connected to stem 201 by three radial vanes 220. In the embodiment shown, each of vanes 220 is solid and extends the full length of rings 210. Vanes 220 may be equally spaced from one another, i.e., the angles between adjacent vanes 220 may be 120°. Vanes 220 and inner walls 212 of rings 210 thus form three equally-sized 120° sectors 221. FIG. 5B is a top view of shuttle 200. In at least some embodiments, sectors 221 are sized so that 10 mm cubic inclusions can pass.

Figure 5C:
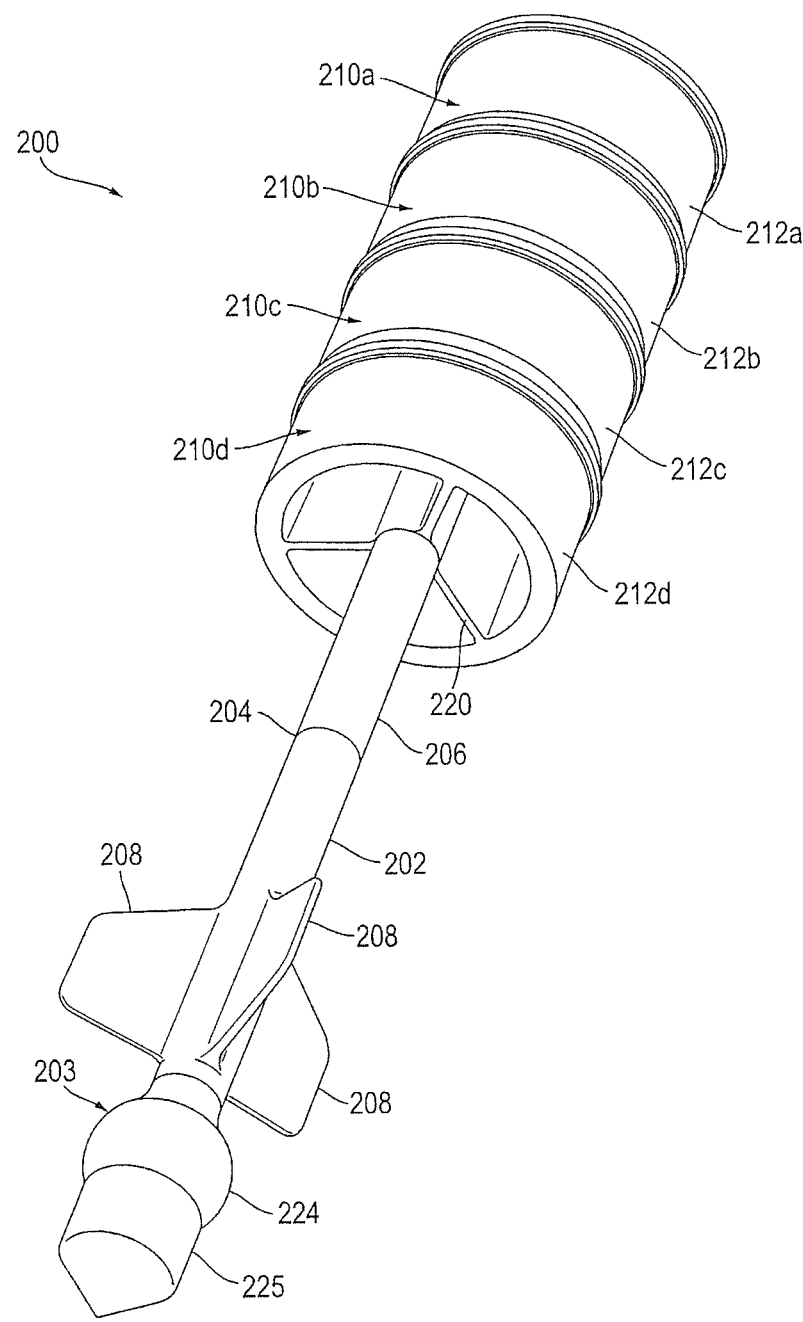

FIG. 5C is a bottom perspective view of shuttle 220. Guide vane element 202 includes three radially extending vanes 208 that help to straighten the flow of beverage product being dispensed through filling valve 50. End element 203 includes a round stopper 224 that seals outlet 49 of cup 53. A terminal end 225 of stopper element 203 is sized to extend through outlet 49. During closing of valve 50, terminal end 225 provides shear force to sever inclusions that might be trapped in the throat of outlet 49 so as to provide a clean break. This avoids fragments emanating from a closed outlet 49, which fragments would be undesirable in hot filling or aseptic filling operations. As explained in more detail below, terminal end 225 may be partially situated in outlet 49 during low-flow operation so as to reduce flow of product and prevent overfilling and improve filling accuracy.

Figure 5D:
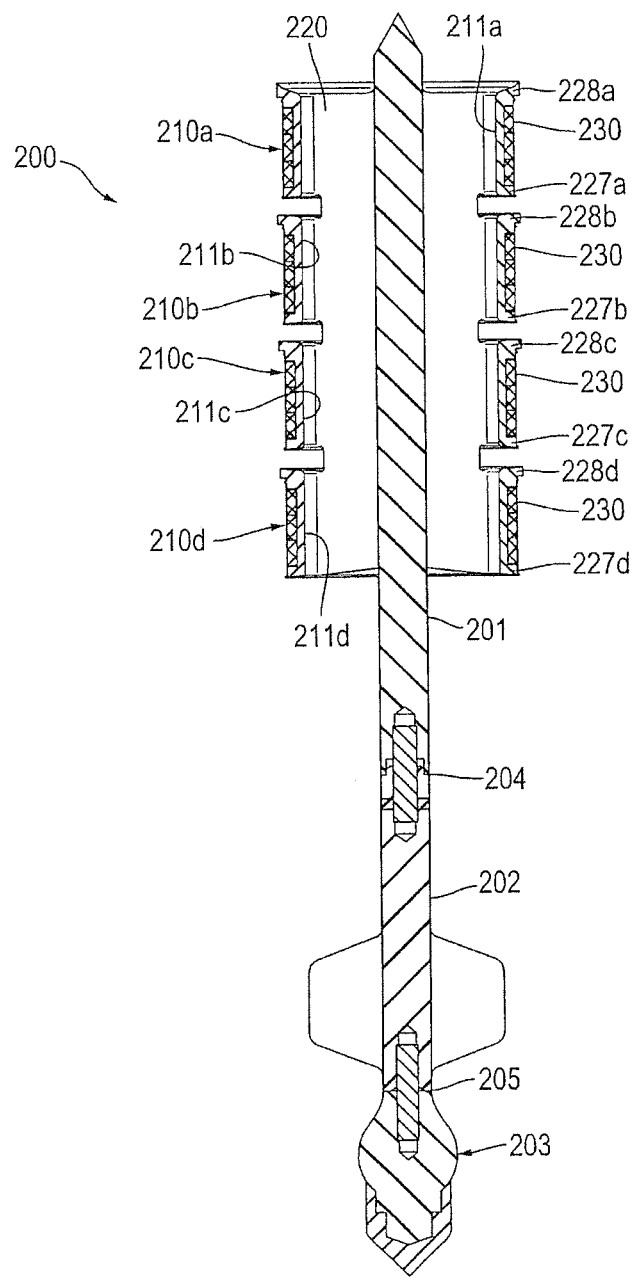
FIG. 5D is a cross-sectional view taken from the location indicated in FIG. 5B.

FIG. 5D is a cross-sectional view of shuttle 200 from the location indicated in FIG. 5B. As indicated above, and as is visible in FIG. 5D, vanes 220 extend the length of all four drive rings 210. Each vane 220 includes slight indentations in the spaces between two adjacent rings 210. As seen in FIG. 5D, and as further discussed below in connection with FIG. 5G, the inner wall 211 of each ring 210 includes an upper flange 228 and a lower flange 227. The sweeper ridge 232 of each ring 210 extends outward from its upper flange 228. Magnets 230 are located in the spaces between inner walls 211, their associated flanges 227 and 228, and outer walls 212.

Figure 5E:
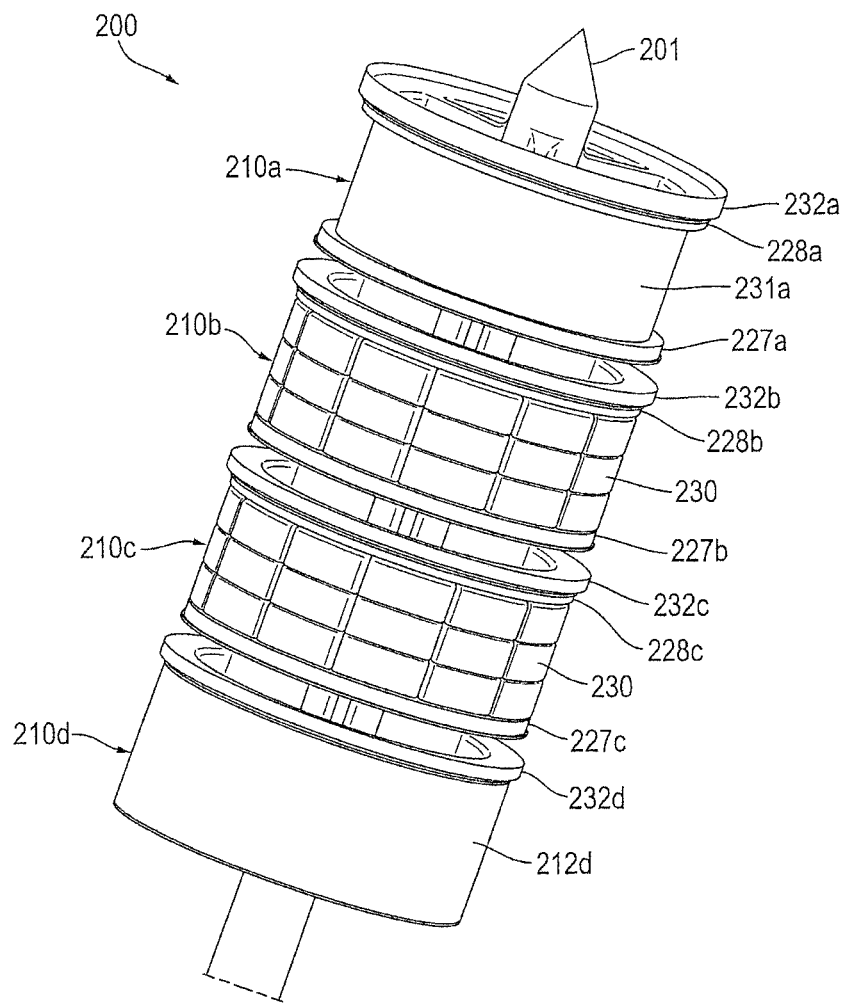
FIG. 5E is an enlarged side perspective view of the shuttle from FIGS. 5A-5C, but with certain elements removed.

The arrangement of magnets 230 in rings 210 is further shown in FIG. 5E. FIG. 5E is a side perspective view of shuttle 200 with certain elements removed. The outer wall 212a and magnets 230 have been removed from the ring 210a to reveal an outside face 231a of inner wall 211a and an inside edge of lower flange 227a. Outer walls 212b and 212c of rings 210b and 210c have been removed to reveal magnets 230. Magnets 230 are arranged in a similar manner in rings 210a and 210d.

Figure 5F:
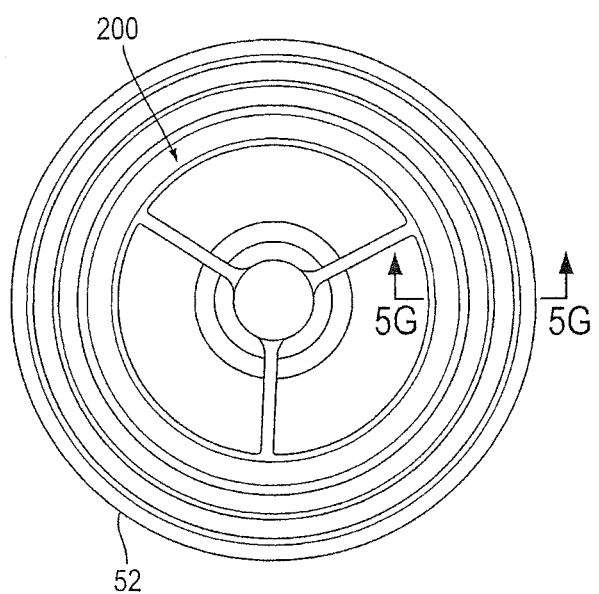
FIG. 5F is an enlarged top view of the shuttle in a main tube from the filler unit of FIG. 1A.
Figure 5G:
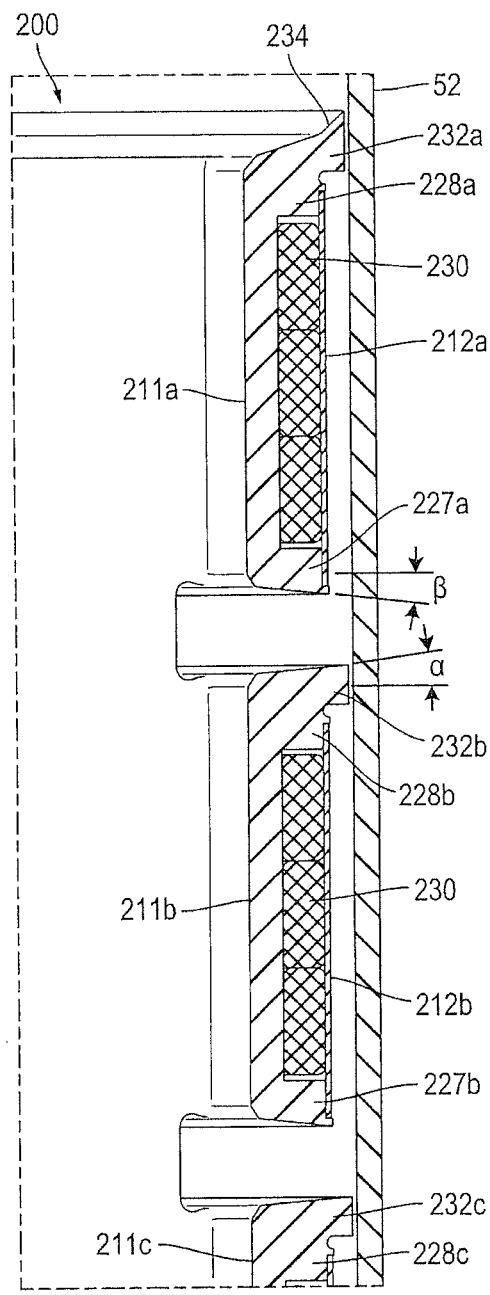
FIG. 5G is an enlarged cross-sectional view taken from the location indicated in FIG. 5F.

FIG. 5F is a top view of shuttle 200 within main tube 52, with other elements of filling valve 50 omitted. FIG. 5G is an enlarged partial cross-sectional view taken from the location indicated in FIG. SF. Each drive ring 210 includes magnets 230 arranged in three bands. Each band includes four concentric sub-bands of individual magnets 230. As seen in FIG. 5E, each of magnets 230 only extends across a small sector of a drive ring 210 perimeter. The magnets 230 in a band are arranged end-to-end so as to circumscribe a ring 210.

FIG. 5G also shows further details of sweeper ridges 232. Clearance between rings 210 and the inner wall of main tube 52 is narrowed in the regions of sweeper ridges 232 so as to prevent seeds or other inclusions from reaching the space between main tube 52 and a ring 210. In some embodiments, the clearance between the outer edge of a sweeper ridge 232 and the main tube 52 inner wall is approximately 0.01 inches. The clearance between the outer sides of rings 210 (at the outer sides of outer walls 212) and the inner wall of main tube 52 may be sized so as to prevent seeds or other small inclusions from jamming between a drive ring 210 and the inner wall of main tube 52. In at least some embodiments, that clearance may be approximately 0.049 inches.

The top faces of sweeper ridges 232 are angled downward toward the center of the rings 210 at an angle α. These downwardly angled faces help to guide inclusions toward the center of shuttle 200 during an upward stroke of shuttle 200 and while product is flowing through main tube 52 and past shuttle 200. In some embodiments, the bottom faces of lower flanges 227 may be angled upward toward the center of a ring at an angle β. These upwardly angled faces help to guide inclusions toward the center of shuttle 200 during a downward stroke of shuttle 200. In some embodiments α and β may each be approximately 6 degrees. The sweeper ridge 232a of the topmost ring 210a may further include a lip 234. The top face of lip 234 may angle downwardly toward the center shuttle 200 at a substantially steeper angle.

As further seen in FIG. 5G, outer walls 212 of rings 210 are relatively thin. In some embodiments, outer walls 212 are formed from 0.006 inch thick work-hardened 316L austenitic stainless steel with weak magnetic attraction. Thin pieces that form walls 212 are used in a hard state to facilitate assembly. The thinness of walls 212 maximizes clearance between walls 212 and the inner wall of main tube 52 while minimizing the distance between magnets 230 of shuttle 60 and magnets 230 of sleeve 60. Outer walls 212 may be laser welded in place to seal magnets 230 in rings 210 and prevent those magnets 230 from contacting beverage product or cleaning solution that may pass through valve 50. The laser welds of outer walls 212 may be polished to promote cleanliness.

In at least some embodiments, the inner walls 211 of each ring 210, including the flanges 227 and 228 and sweeper ridge 232, lip 234, vanes 220 and stem 201 may be formed as an integral unit from a single integral piece of 316L austenitic stainless steel. The single piece unit may be formed, e.g., by electrical discharge machining (EDM). Guide vane element 202 and stopper element 203 may also be machined from 316L austenitic stainless steel. Use of a soft austenitic material for the shuttle minimizes interaction between shuttle 200 and the magnetic field of magnets 230.

Figure 5H:
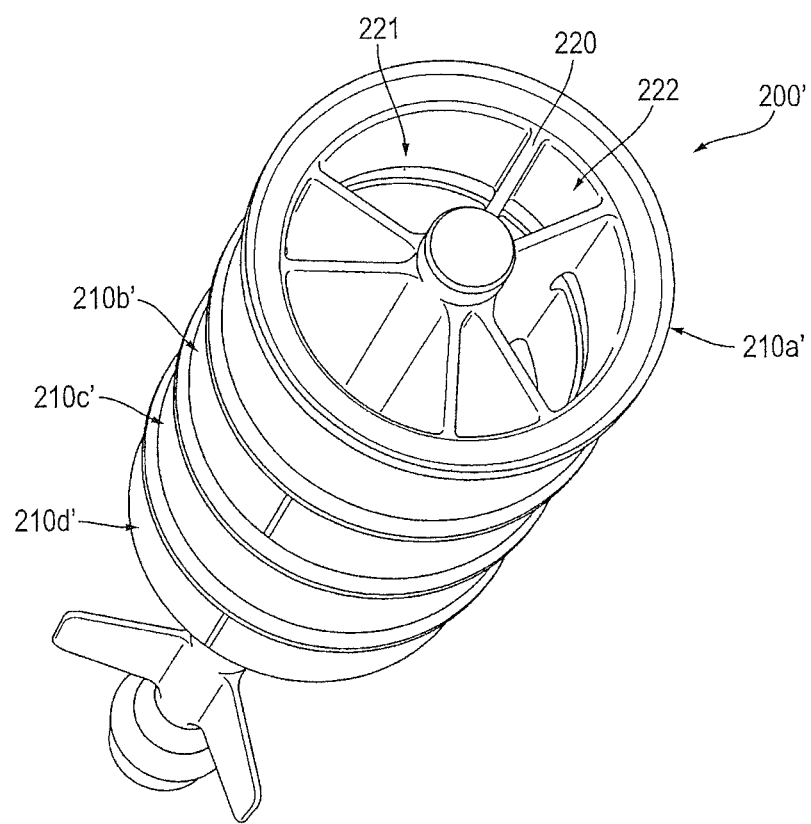
FIGS. 5H and 5I are, respectively, enlarged top and bottom perspective views of a shuttle according to certain other embodiments.
Figure 5I:
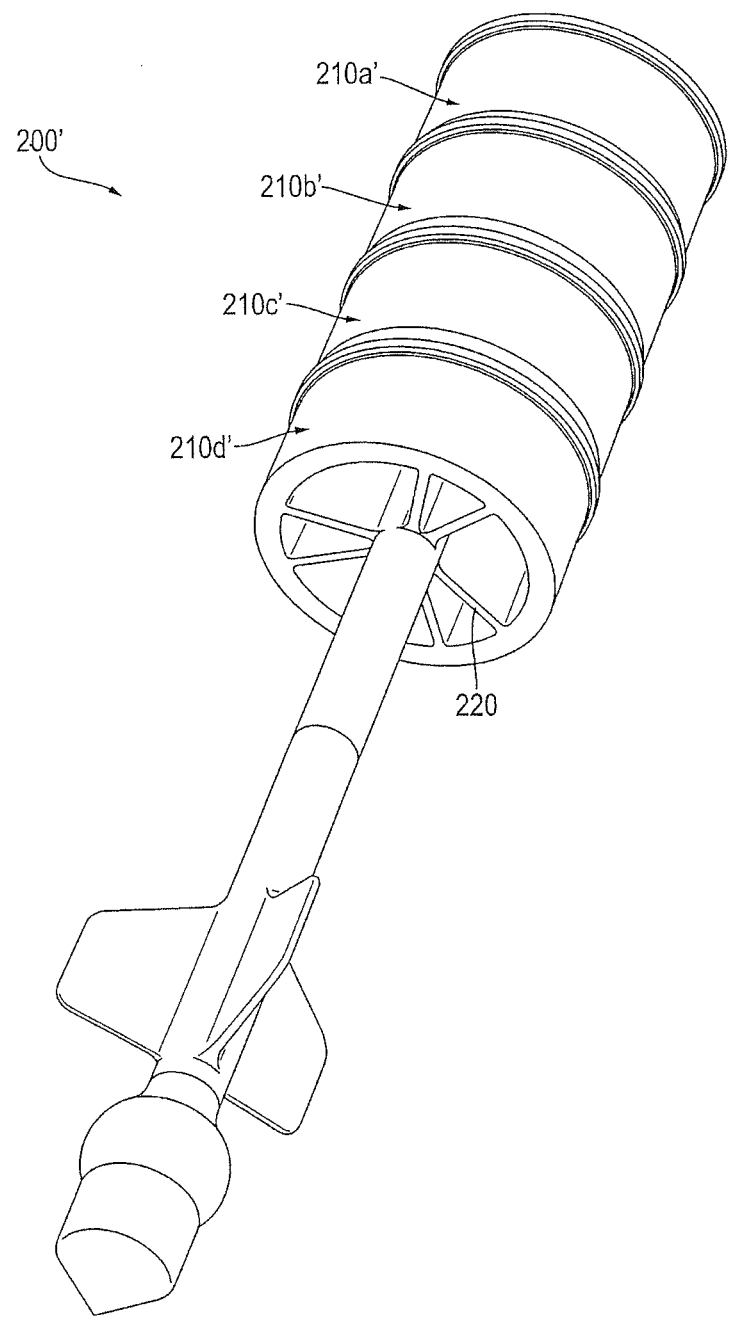

FIGS. 5H and 5I are, respectively, enlarged top and bottom perspective views of a shuttle 200' according to certain other embodiments. Shuttle 200' may be used in filling valve 50 as an alternative to shuttle 200. Shuttle 200' may be identical to shuttle 200 except with regard to vanes 220'. In particular, shuttle 200' includes six radial vanes 220' that connect rings 210a' through 210d' to the central stem. Vanes 220' may be arranged so as to form major sectors 221 and minor sectors 222. Major sectors 221 may be sized so that 10 mm cubic inclusions may pass.

As described above, rings 210 travel up and down within main tube 52. In some embodiments, main tube 52 is also formed from 316L austenitic stainless steel. An exemplary wall thickness for main tube 52 is approximately 0.044 inches, with an exemplary cylindricity within 0.0025 inches.

In at least some embodiments, cup 53 is formed from PEEK (polyether ether ketone). Although PEEK is quite rigid and durable, it has sufficient flexibility to permit a seal between stopper 224 of end element 203 and the inner upper edges and shoulders of outlet 49, thereby avoiding a need for additional gaskets to seal outlet 49 when valve 50 is closed.

Figure 6A:
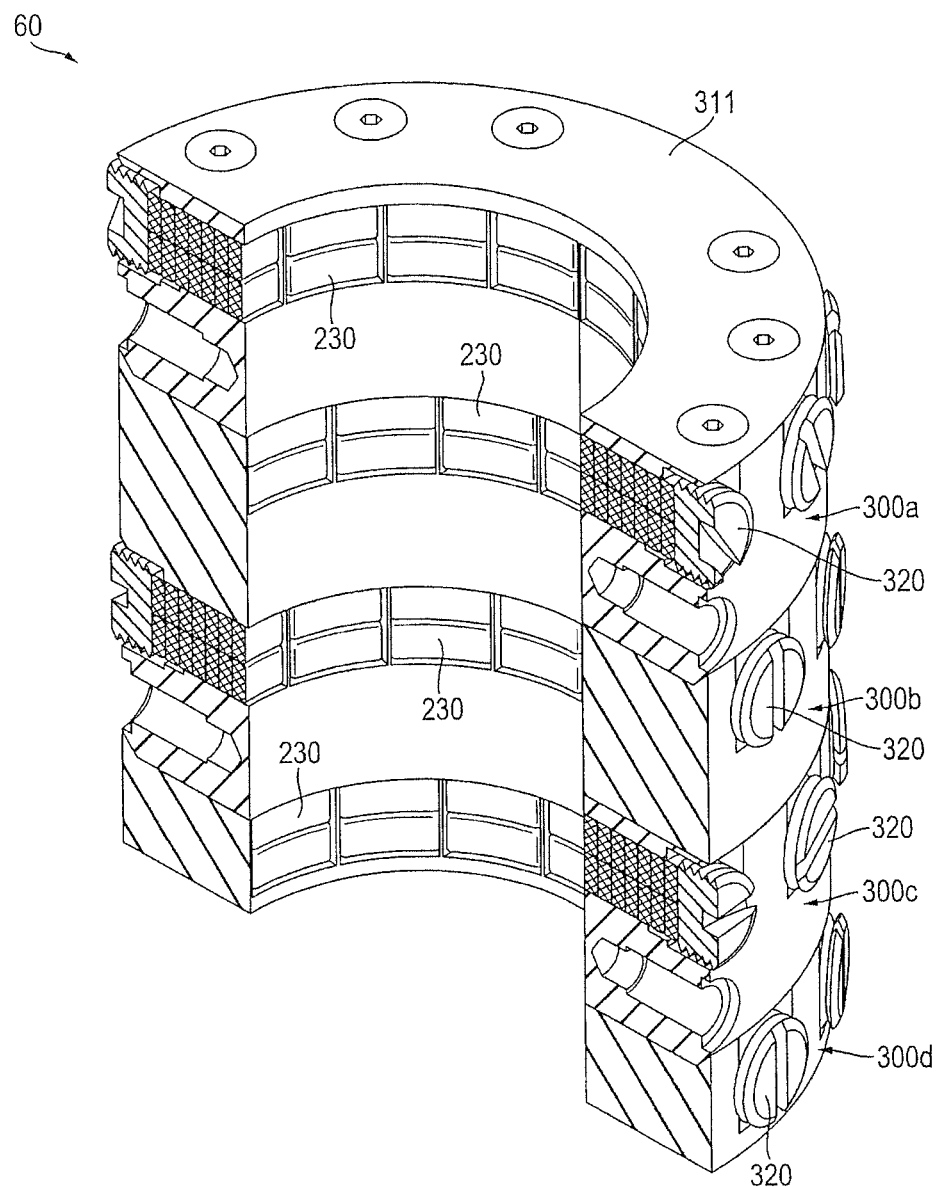
FIG. 6A is an enlarged cross-sectional perspective view of a filling valve drive sleeve from the filler unit of FIG. 1A.
Figure 6B:
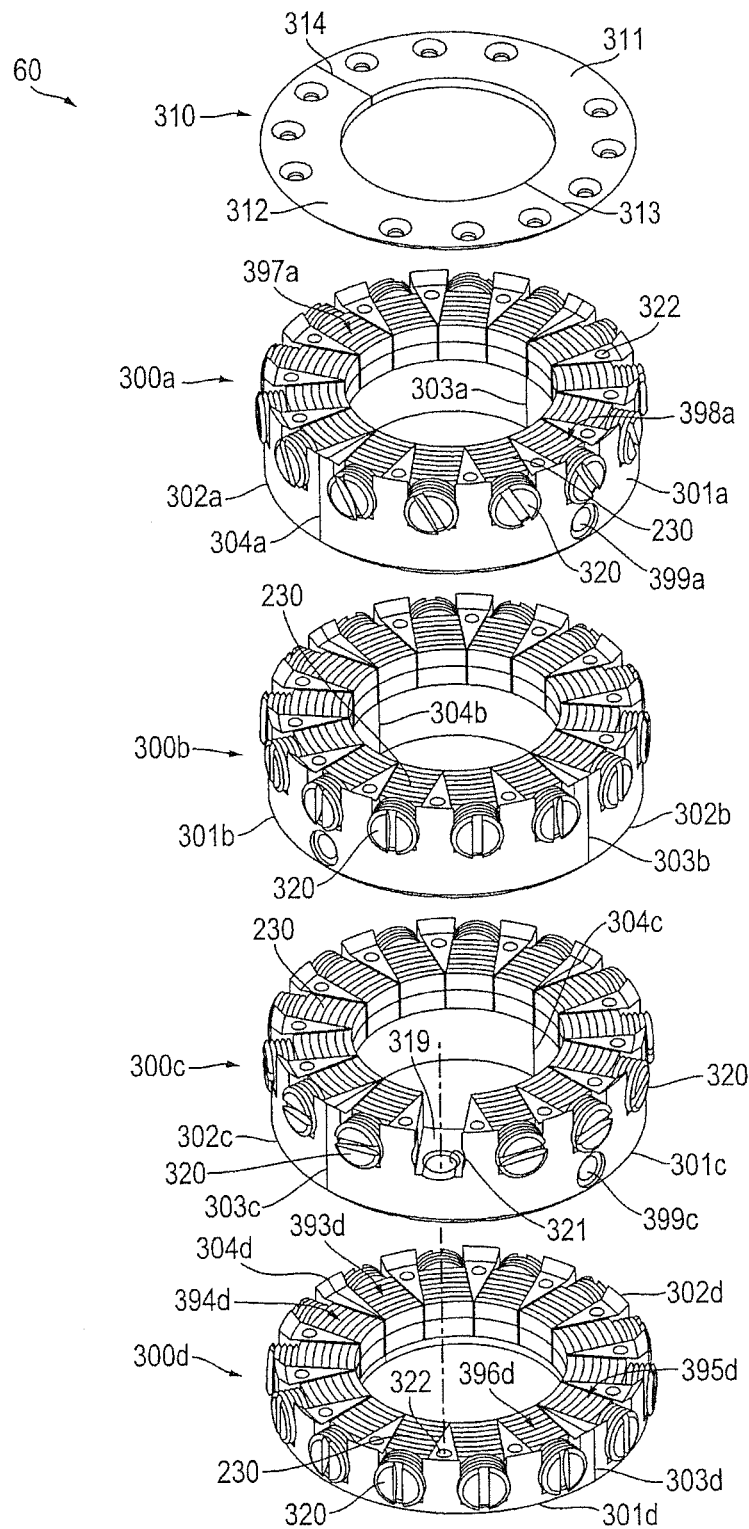
FIG. 6B is a perspective view of the drive sleeve of FIG. 6A.

FIG. 6A is an enlarged cross-sectional perspective view of drive sleeve 60. The cross-sectioning plane in FIG. 6A is the same as that of FIGS. 4A and 4B. FIG. 6B is a perspective view of drive sleeve 60 in which rings of sleeve 60 have been separated to further reveal internal structural details. In the embodiment shown, drive sleeve 60 includes four magnet-holding rings 300a, 300b, 300c and 300d. Each ring 300 includes two half rings. For example, ring 300d includes half rings 301d and 302d. The ends of half rings 301d and 302d meet at joints 303d and 304d. A second ring 300c includes half rings 301c and 302c that meet at joints 303c and 304c. A third ring 300b includes half rings 301b and 302b that meet at joints 303b and 304b. A fourth ring 300a includes half rings 301*a* and 302*a* that meet at joints 303*a* and 304*a*. A cover plate 310 includes two half plates 311 and 312 that meet at joints 313 and 314.

Each of the half rings may be machined from PEEK and may include seven channels 319 formed in an upper surface. Two rows of magnets 230 are then placed in each channel and held in place by a set screw 320. The orientations of magnets 230 in sleeve 60, which orientation is discussed below, results in magnetic repulsive forces that push those magnets 230 radially outward. Set screws 320 resist those outward forces and secure magnets 230. Magnets 230 and a set screw 320 have been omitted from one of the channels 319 in half ring 301*c* to show additional details of that channel 319. Each channel 319 in half rings 301*a*, 302*a*, 301*b*, 302*b*, 301*c*, 302*c*, 301*d* and 302*d* includes a countersunk hole 321 through which a bolt is inserted and secured to a threaded hole 322 in a lower half ring. This is indicated with an uneven broken line for one hole 321 in half ring 301*c* and a corresponding hole 322 in half ring 301*d*.

The orientation of each ring 300 is rotated 90 degrees relative to adjoining rings 300. For example, a line between joints 303*d* and 304*d* of ring 300*d* is perpendicular to a line between joints 303*c* and 304*c* of ring 300*c*. A similar pattern follows with regard to rings 300*c* and 300*b* and rings 300*b* and 300*a*. The half rings of a ring 300 are not directly bolted to one another. Instead, the half rings of each ring 300 are held in place by their attachment to an adjacent ring 300. For example, half ring 301*d* of ring 300*d* is attached to one end of half ring 301*c* and one end of half ring 302*c*. Similarly, half ring 302*d* is attached to the other ends of half rings 301*c* and 302*c*. A similar pattern follows half rings 301*c* and 302*c* relative to half rings 301*b* and 302*b* and for half rings 301*b* and 302*b* relative to half rings 301*a* and 302*a*.

Drive sleeve 60 can be assembled by loading magnets 230 into channels 319 of half rings 301*d* and 302*d*, securing those magnets 230 with set screws 320, and then placing half rings 301*d* and 302*d* into position around main tube 52. Half rings 301*c* and 302*c*, without magnets 230 installed, can then be placed into position around main tube 52 and on top of half rings 301*d* and 302*d*. Fasteners are then placed through holes 321 in channels 319 of half rings 301*c* and 302*c* into holes 322 of half rings 301*d* and 302*d* and tightened. Magnets 230 can then be placed into channels 319 of half rings 301*c* and 302*c* and secured with set screws 320. A similar procedure can be performed for rings 300*b* and 300*a*. Finally, half plates 311 and 312 are installed on top of ring 300*a* by inserting bolts (not shown in FIG. 6B) through countersunk holes in half plates 311 and 312 and holes 322 in half rings 301*a* and 302*a*. Also shown in FIG. 6B are holes 399*a* (ring 300*a*) and 399*c* (ring 300*c*) by which sleeve 60 may be attached to riser bracket 91 (see FIG. 3G).

In at least some embodiments, magnets 230 of shuttle 200 and drive sleeve 60 may be curved Neodymium Iron Boron (NDFeB) grade N45H. This grade, which corresponds to a working temperature of up to 248° F., allows magnets 230 to withstand temperatures associated with sterilization of valve 50 during cleaning and/or sterilization cycles. Magnets with higher maximum working temperatures are available and may be used in some embodiments. The magnets 230 may be sized such that fourteen magnets placed end to end form a band with an outside diameter or 43 mm, an inside diameter of 39 mm and a height of 5 mm. The magnetization may be from inside curve to outside curve so that the north pole of each magnet is on the outside face. Magnets 230 are placed into sleeve 60 so that the north pole faces are oriented inward and toward shuttle 200. Magnets 230 are placed in shuttle 200 so that the north pole faces are oriented outward and toward sleeve 60.

In some embodiments, magnets 230 in some channels 319 of sleeve 60 may be replaced with PTFE (polytetrafluoroethylene) bearing elements. For example, all magnets 230 in the channel 319 of ring 300*a* directly above hole 399*a* (indicated by arrow 398*a*) and all magnets in the channel 319 on the other side of ring 300*a* (indicated by arrow 397*a*), all magnets 230 in the channels 319 of ring 300*d* on either side of joint 303*d* (indicated by arrows 395*d* and 396*d*) and all magnets 230 in the channels 319 of ring 300*d* on either side of joint 304*d* (indicated by arrows 393*d* and 394*d*) may be omitted. A PTFE bearing may then be inserted into each of the channels 319 from which those magnets 230 have been omitted. In some embodiments, those PTFE bearings may be fabricated by cutting approximately 9/16 inch length pieces from a 7/16 inch diameter stock PTFE rod. These PTFE bearings extend from the set screws 320 of their respective channels 319 and slightly beyond the inner diameters of rings 300*a* and 300*d*. Those set screws 320 may then be used to adjust compression on the PTFE bearings so that inner ends of those PTFE bearings contact the outer wall of main tube 52. Use of such PTFE bearings smoothes travel of sleeve 60 over main tube 52 and may reduce wear on main tube 52.

As can be appreciated from FIGS. 4A and 4B, and in view of the description of shuttle 200 in connection with FIGS. 5A-5G and the description of sleeve 60 in connection with FIGS. 6A and 6B, magnets 230 of drive ring 210*a* of shuttle 200 are straddled by the magnets 230 of sleeve ring 300*a* and sleeve ring 300*b*. The magnets of rings 210*b* and 210*c* of shuttle 200 are straddled by the magnets of rings 300*b* and 300*c* and of rings 300*c* and 300*d*, respectively. The repulsive forces of magnets 230 prevent each ring 210 from moving past a ring 300 of sleeve 60 that is immediately above or below that ring 210. This results in a coupling whereby shuttle 200 can be moved up or down by moving sleeve 60 up or down.

The staggered arrangement of rings 210 relative to rings 300 offers additional advantages. For example, this arrangement places the repulsive forces between rings 300 and rings 210 into a precise and repeatable vertical alignment. Moreover, this staggered arrangement provides a degree of magnetic spring force. In particular, applying an upward vertical force to shuttle 200 when stopper element 203 rests on the inside edge and shoulder of outlet 49 (as shown in FIG. 4A) while also applying a downward vertical force to ring 60 moves rings 300*a* through 300*d* closer to rings 210*a* through 210*d*, respectively. As the spacing between a ring 300 and a ring 210 decreases, the repulsive magnetic forces attempting to separate those two rings increase. When sleeve 60 is then moved upward again, shuttle 200 springs back to its original location relative to sleeve 60. This allows sleeve 60 to slightly over travel shuttle 200 when closing valve 50, which compresses the magnetic spring, and which results in the shuttle applying a constant force to the inside edge and shoulder of outlet 49.

As also seen in FIG. 4A, rings 210 and 300 are staggered so that there is a ring 300 above each ring 210, but there is a ring 300 under 210*a*, 210*b* and 210*c* only. This configuration allows greater magnetic coupling in the downward direction so as to provide increased available downward force on shuttle 200 to seal valve 50 when closing. In at least some embodiments, the coupling force between shuttle 200 and sleeve 60 in the downward direction is at least 30 pounds to provide adequate closing force and a sufficiently fast closing time. This closing force also facilitates shearing of inclusions that might be resting in outlet 49 when valve 50 is closing.

In some embodiments a single ring magnet could replace the segmented assembly of magnets 230 in a ring 210. Similarly, a single ring (or half ring) magnet could replace the segmented assemblies of magnets 230 used in a ring of sleeve 60, although a single ring magnet for a ring 300 would have a larger diameter than a single ring magnet used for a ring 210. Such single ring magnets could also be NDFeB grade N45H.

Returning briefly to FIGS. 1A and 1B, in some embodiments filler unit 10 is used in conjunction with container handling arm 20. Except for slight movement of some arm 20 components described below, arm 20 is substantially fixed relative to filling unit 10. An empty container C is received in a gripper of arm 20 at or prior to a beginning of a filling operation. Upon opening filling valve 50 of filler unit 10, a beverage product is dispensed from outlet 49 of filling valve 50 and through an open top of that container C. The weight of that container C increases as it is filled. A load cell in arm 20 sends signals indicative of that weight. A controller may then determine when to close filling valve 50 based on those signals.

A container C may be placed onto arm 20 in a conventional manner. For example, one of the arms 20 of filling system 40 (FIG. 2) may receive a container C as the continuously-rotating carousel rotates that arm 20 past a location (e.g., at the 6 o'clock position in FIG. 2) where a first conveyor delivers empty containers C for receipt by passing handling arms. Product is then dispensed into a received container C by a filler unit 10 corresponding to that arm 20 as the carousel continues to rotate toward a second conveyor. By the time the rotation of the carousel has brought that arm 20 to the location of the second conveyor (e.g., at the 12 o'clock position in FIG. 2), the now-filled container C is removed from that arm 20 and carried away by the second conveyor system. The rotation of the carousel then returns that arm 20 to the first conveyor to receive a new empty container C.

Figure 7A:
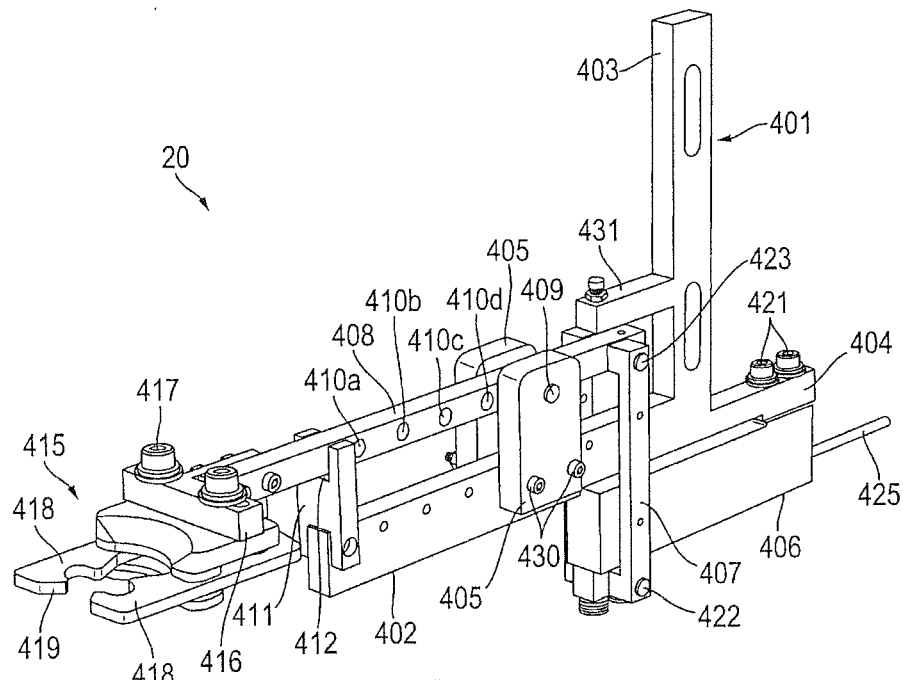
FIGS. 7A through 7C are, respectively, left front perspective, right front perspective and right side views of the container handling arm of FIG. 1A.

FIG. 7A is a left front perspective view of a container handling arm 20 according to at least some embodiments. A support beam 401 of arm 20 includes a boom 402, a riser 403 and a load cell attachment extension 404. In at least some embodiments, beam 401 is a single piece. Beam 401 is rigid and remains fixed relative to a filling unit 10 to which the arm 20 corresponds. In particular, riser 403 may be bolted or otherwise attached to a carousel or other structure of a filling system that incorporates arm 20. Upon attachment to the filling system structure, boom 402 is cantilevered and horizontally oriented.

Components of arm 20 attached to boom 402 include a pair of fulcrum brackets 405, a load cell 406 and load cell linkages 407. A balance lever 408 is pivotally coupled to boom 402 by a fulcrum element 409 held in place by brackets 405. Fulcrum element 409 interacts with a cooperating feature of lever 408 at one of multiple pivot locations so as to allow rotational movement of lever 408 about fulcrum element 409. In the embodiment of arm 20, fulcrum element 409 may be a bolt or pin and a cooperating arm feature is one of holes 410a through 410f in lever 408. Holes 410e and 410f are visible in FIG. 7D.

Figure 7B:
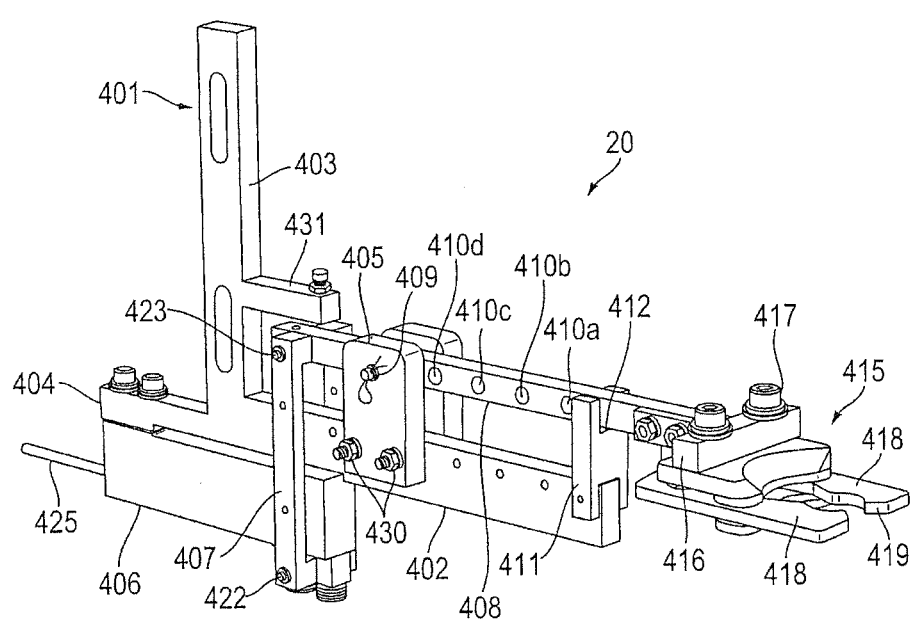

In some configurations, and as shown in FIGS. 7A and 7B, an anti-yaw bracket 411 may be attached at a distal end of boom 402. Bracket 411 includes a guide slot 412 that constrains movement of lever 408 to the left or right of boom 402 and that helps keep lever 408 aligned with boom 402 in a vertical plane. Guide slot 412 is sized so that lever 408 can freely move up and down within slot 412. In other configurations described below, bracket 411 may be omitted.

A container gripper 415 is attached to a distal end of lever arm 408 by a bracket 416 and bolts 417. In the configuration shown in FIGS. 7A-7D, gripper 415 is a conventional gripper having spring-loaded jaws 418 that are sized to receive and hold a portion of a container C neck. In some embodiments, gripper 415 may be configured to hold bottles having a neck finish size between 28 mm and 43 mm. The spring tension of jaws 418 can be overcome by the force of a container neck pushing horizontally against surfaces 419 (e.g., when receiving an empty container from the first conveyor system described above) and by the force of a contained neck pushing outward from within jaws 418 (e.g., when a filled container is removed by the second conveyor system described above). Gripper 415 can be removed and replaced with a different type of gripper to handle a different type of container. Other types of gripper can be used. For example, in some embodiments a gripper may not have spring-loaded jaws and may simply be a bracket with an indentation corresponding to the shape of a container neck.

Figure 7C:
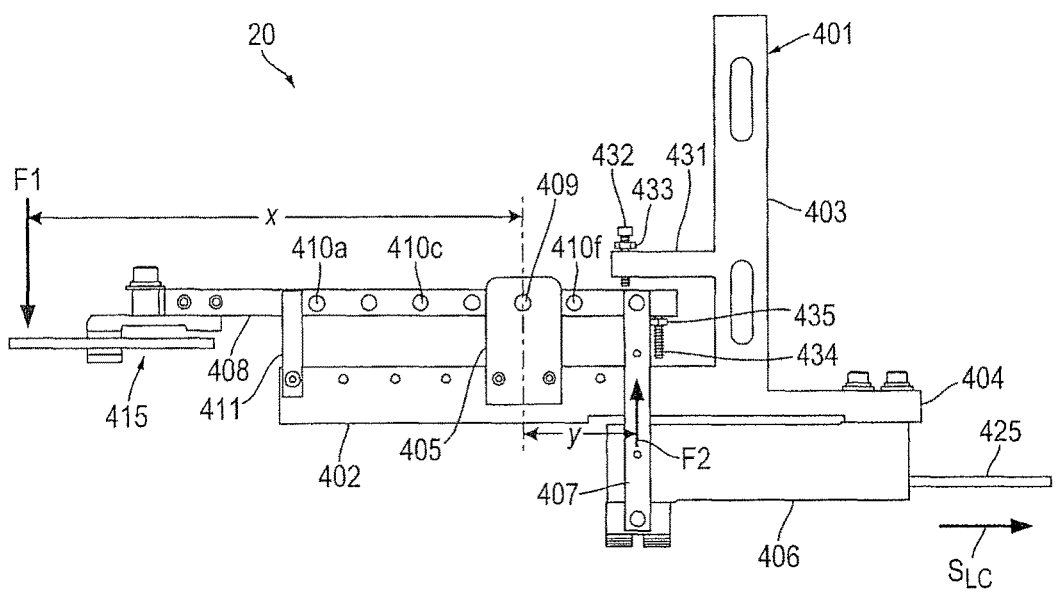

A proximal end of a load cell 406 is fixedly attached by bolts 421 to extension 404 of support beam 401. A distal end of load cell 406 is coupled to a proximal end of lever 408 by linkages 407. Lower ends of linkages 407 are pivotally attached to load cell 406 by a pin 422. Upper ends of linkages 407 are pivotally attached to lever 408 by a pin 423. As indicated in FIG. 7C, a container held in gripper 415 imposes a downward force F1. This results, though the rotation of lever 408 about fulcrum element 409, in an upward force F2 pulling on linkages 407. Force F2 is transferred by linkages 407 to load cell 406, resulting in slight deformation of load cell 406. Strain gauges and other elements within load cell 406 generate signals $S_{LC}$ corresponding to the magnitude of that deformation, and thus to the magnitude of force F2, and output signals $S_{LC}$ through a cable 425. Based on signals $S_{LC}$, known dimensions of arm 20 and the configuration of brackets 405 (as discussed below), a controller of a filling system incorporating arm 20 can determine the weight of a container held by arm 20. Because the volume of that container and the density of the beverage product being dispensed are known, that controller can also use signals $S_{LC}$ to determine the degree to which the container has been filled.

In at least some embodiments, load cell 406 has a range of 0 to 7.5 kilograms (kg). Load cells are well known weight transducers that utilize strain gauges to detect deformation and output a signal indicative of a force causing that deformation. Load cells and control software for processing load cell signal output are commercially available from numerous sources.

In general, the accuracy of a load cell increases if a larger range of that load cell's capacity is utilized. For example, assume container C holds 20 fluid ounces of product when filled and that the product in question is milk. The weight of 20 fluid ounces of milk is approximately 0.61 kg. Assume load cell 406 is arranged so that the weight measured by load cell 406 only increases by 0.61 kg when container C is completely filled and that load cell 406 has 7.5 kg of available range. In this scenario, only about 8% (0.61 kg/7.5 kg) of the load cell 406 measuring capacity is used to measure the difference between an empty and full container. Now assume that load cell 406 is arranged so that the load measured by load cell 406 increases by 2.58 kg (factor of 4.227) as that same container C is filled with milk. In this scenario, approximately 34% of the load cell 406 capacity would be utilized and weight measuring accuracy improved. The deformation of load cell 406 would also increase in this second scenario. Even at maximum load, however, the magnitude of load cell deformation is relatively small.

The relationship between the weight of a container and its contents and the weight experienced by load cell 406 varies based on the position of fulcrum element 409 relative to gripper 415 and linkages 407. If it is assumed that the center of force for a container and its contents passes through the center of the gripping area of jaws 418, and if fulcrum element 409 is equidistant between the center of jaws 418 and pin 423 of linkages 407, the ratio of the weight of filled product to resulting weight imposed on load cell 406 by that product is 1:1. If fulcrum element 409 is moved closer to pin 423, however, that ratio increases. In general, if the distance between the center of force F1 for a gripped container and its contents and fulcrum element 409 is x and the distance between fulcrum element 409 and pin 423 is y, then the force F2 imposed on load cell 406 by the weight of the container and its contents is (x/y)*F1.

Figure 7D:
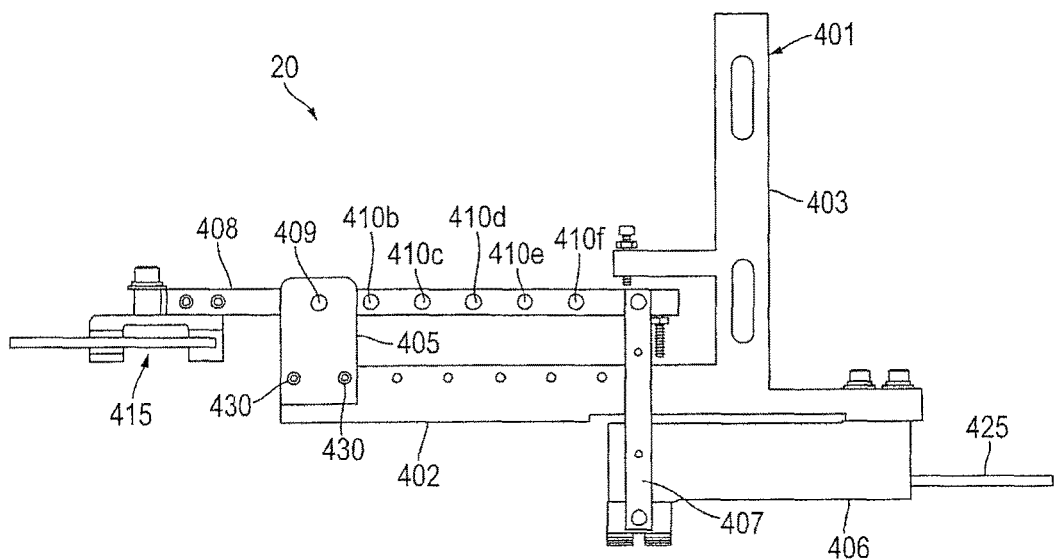
FIG. 7D is a right side view of the container handling arm of FIG. 1A in an alternate configuration.

In some embodiments, arm 20 can be reconfigured to better accommodate filling operations that result in filled containers having different weights. In particular, bolts 430 holding brackets 405 and fulcrum element 406 can be removed and brackets 405 repositioned so that fulcrum element 409 cooperates with a different one of holes 410. In FIGS. 7A-7C, brackets 405 are positioned so that bolts 430 pass through holes in boom 402 on either side of hole 410*e* and so that fulcrum element 409 cooperates with hole 410*e*. In FIG. 7D, anti-yaw bracket 411 has been removed and brackets 405 repositioned at the distal end of boom 402. In this position, bolts 430 pass through holes in boom 402 on either side of hole 410*a* and fulcrum element 409 cooperates with hole 410*a*. Brackets 405 could alternately be positioned so that fulcrum element 409 cooperates with any of holes 410*a* through 410*f*.

In some embodiments, lever 408 and other arm 20 components are sized so that ratios of force F2 (resulting force on load cell from container and contents) to force F1 (container and contents) associated with positioning of fulcrum element 409 in each of holes 410*a* through 410*f* is as set forth in Table 1.

TABLE 1

| Lever 408 hole: | Ratio (F2/F1) |
| --- | --- |
| 410a | 0.880:1 |
| 410b | 1.252:1 |
| 410c | 1.783:1 |
| 410d | 2.645:1 |
| 410e | 4.348:1 |
| 410f | 8.406:1 |

In some embodiments, indicia may be added to lever 408 adjacent to each of holes 410. That indicia could correspond to a setting that is input to a filling system controller when setting up that filling system to fill a particular type of container. That indicia could also or alternatively identify container sizes associated with each hole 410. Additionally or alternatively, such indicia could also or alternatively be included on boom 402 to indicate bracket 405 locations for a particular container size.

In some embodiments, arm 20 may include one or more adjustable stops that limit the range of lever 408 motion. For example, riser 403 of support beam 401 may include a projection 431 that extends over the proximal end of lever 408. A first bolt 432 may extend through a threaded hole in the end of projection 431 and may include a nut 433. Bolt 432 may be adjusted and secured with nut 433 so that an end of bolt 432 is spaced a predetermined distance above lever 408. If lever 498 is inadvertently subjected to an excessive downward force at its distal end, the top of lever 408 will contact that end of bolt 432 and limit the upward force on linkages 407 and on load cell 406. A second bolt 434 may extend through a threaded hole in the end of the lever 408 proximal end and may include a nut 435. Bolt 434 may be adjusted and secured with nut 435 so that an end of bolt 434 is spaced a predetermined distance above the top of boom 402. If lever 408 is inadvertently subjected to an excessive upward force at its distal end, the end of bolt 434 will contact the top of boom 402 and limit the downward force on linkages 407 and on load cell 406.

Arm 20 offers numerous advantages that facilitate use of a single filling system for filling a wide range of beverage containers with a wide range of product types. When filling a beverage container, it can be important monitor the amount of beverage placed into that container during the filling operation. An underfilled container may not be sellable. Overfilling a container results in wasted product and spillage that can foul production equipment. Conventionally, a flow meter has been used to monitor the amount of product flowing through a filling valve while filling a container. When filling containers with beverages having large inclusions, however, existing flow meters are not sufficiently accurate for monitoring fill level of product in a container. Use of arm 20 to monitor container fill level based on weight of a container and its contents avoids the use of a flow meter for determining fill level. The adjustability of arm 20 facilitates use of a filling system with containers of widely ranging sizes and for products of significantly different densities. Moreover, the positioning of load cell 406 on arm 20 minimizes the number of components that must be located within an aseptic region.

The configuration of arm 20 also offers further advantages. In particular, the arrangement of lever 408, linkages 407, support beam 401 and other components isolates load cell 406 from uncontrolled environmental forces such as forcing of a container into or out of gripper 415. In the configuration shown in FIGS. 7A-7D, only forces in the vertical plane are transmitted to load cell 406. Because of the limited amount that load cell 406 deflects under load, this effectively results in only purely vertical forces on load cell 406. Torques and side loads on load cell 406 are eliminated, thereby avoiding reductions in measurement accuracy that side loads or torques might cause. The vertical forces on load cell 406 are limited to a safe range by the stops of bolts 432 and 434. Linkage 408 remains in tension, thereby eliminating backlash in the mechanism and reducing variations in weight measurement.

In some embodiments, a handling arm similar to arm 20 may be modified so that the adjustment of the fulcrum element position is automated. As but one example of such an embodiment, brackets 405 could be mounted on a slider or other linear motion device and movable by a servo or other type of actuator. Additional servos could be used to move the fulcrum element into and out of position on lever 408 and to support lever 408 while the position of the fulcrum element is being adjusted.

To reduce the time needed to fill a single container and thereby increase overall production speed, it is useful to fill a container at a relatively high flow rate. As the level of product in the container approaches its desired level, however, it is desirable to reduce the speed at which product is flowing into that container. In particular, a slower flow rate allows more time to completely stop product flow and thus permits more accurate filling to a desired level.

Predictably reducing flow through a filling valve becomes more complex if that filling valve is part of a system that is intended to accommodate widely varying types of product. Flow through a filling valve can be reduced by partially closing the filling valve and thus reducing size of an opening through which product flows from the filling valve to a container. The degree to which a filling valve must be partially closed can be affected by product viscosity and by the presence of inclusions. The time at which flow should be reduced can be affected by size of a container.

In at least some embodiments, a filler unit includes components that facilitate closing a filling valve to an adjustable low flow setpoint. For example, and as indicated above in connection with FIGS. 3A-3F, filler unit 10 includes an actuator 80 that is part of a low flow setpoint system. An interruptible fluid circuit connects two chambers of actuator 80. When filling of a container is to begin, actuator 70 pushes crossbar 92 upward to open filling valve 50. Pushing upward on crossbar 92 pulls on rod 82 of actuator 80. If fluid is permitted to flow between the actuator 80 chambers, a piston in actuator 80 can move, thereby allowing rod 82 to be withdrawn from housing 81. When the container is nearly full, actuator 70 begins to close filling valve 50 by pulling downward on crossbar 92. Downward force on crossbar 92 pushes on rod 82, which in turn pushes down on the actuator 80 piston. Initially, fluid is allowed to flow in a reverse direction between the actuator 80 chambers as the actuator 80 piston moves downward in response to pushing by rod 82. When filling valve 50 reaches a low flow setpoint for the product and container being filled, however, fluid flow between the actuator 80 chambers is interrupted. This causes the piston of actuator 80 to stop moving and stops the downward movement of crossbar 92, thereby holding filling valve 50 at a low flow setpoint in which valve 50 is only partially open. Once the weight of the container and its contents indicates a fill to the proper level, flow between the actuator 80 chambers is again permitted and filling valve 50 can move to a fully closed position.

FIGS. 8A through 8H are partially schematic drawings of filler unit 10 that further explain the operation of the low flow setpoint system. FIGS. 8A through 8H assume a rear view of filler unit 10. Shelf 11, drive sleeve 60, riser bracket 91, crossbar 92, optical flag 121 and optical sensor 120 are shown in simplified form. Also shown in simplified form are housing 71 and rod 72 of actuator 80 and housing 81 and rod 82 of actuator 80. Other elements of filler unit 10 shown in FIGS. 3A-3G have been omitted from FIGS. 8A through 8H for convenience.

As previously indicated, and as is now visible in FIGS. 8A through 8H, actuator 70 includes a piston 501. Piston 501 acts as a barrier between chambers 502 and 503 in actuator 70. When piston 50 moves upward, the volume of chamber 502 increases and the volume of chamber 503 decreases. A lower end of rod 72 is attached to piston 501. Rod 72 extends out of housing 71 through a sealed opening in a top wall of housing 71. Piston 501 includes seals that prevent fluid from passing between chambers 502 and 503 past the edge of piston 501. To extend rod 72 from housing 71, pressurized fluid can be introduced into chamber 502 while fluid is allowed to exit chamber 503. To retract rod 72 into housing 71, pressurized fluid can be introduced into chamber 503 while fluid is allowed to exit chamber 502. In some embodiments, actuator 70 may be a commercially available fluid actuator and be operated using a compressed air as a working fluid. For convenience, the remainder of the description of FIGS. 8A-8H will refer to the working fluid of actuator 70 as air and will use stippling to indicate air. In other embodiments a different working fluid may be used.

Compressed air enters and leaves chamber 502 through a port 505. Compressed air enters and leaves chamber 503 through a port 506. Fittings 74 and 75 (FIG. 3D) may be attached to ports 505 and 506, respectively. A two position control valve 507 is connected to port 506. When control valve 507 is in its first position, port 506 is in fluid communication with a source of compressed air. When control valve 507 is in its second position, port 506 is in fluid communication with the atmosphere through a restricted exhaust vent 508. The position of control valve 507 is controlled by a solenoid 509. When solenoid 509 is not energized, a spring biases control valve 507 to its second position. When solenoid 509 is energized, control valve 507 moves to its first position. Solenoid 509 energizes in response to a control signal from a controller as described below.

Another two position control valve 517 is connected to port 505. When control valve 517 is in its first position, port 505 is in fluid communication with a source of compressed air. When control valve 517 is in its second position, port 505 is in fluid communication with the atmosphere through a restricted exhaust vent 518. The position of control valve 517 is controlled by a solenoid 519 that receives a control signal from a controller as described below. A spring biases control valve 517 to its second position when solenoid 519 is not energized. Energizing solenoid 519 moves control valve 517 to its first position.

As further shown in FIGS. 8A through 8H, actuator 80 also includes a piston 551. Piston 551 acts as a barrier between chambers 552 and 553 in actuator 80. When piston 551 moves upward, the volume of chamber 552 increases and the volume of chamber 553 decreases. A lower end of rod 82 is attached to piston 551. Rod 82 extends out of housing 81 through a sealed opening in a top wall of housing 81. Piston 551 includes seals that prevent fluid from passing between chambers 552 and 553 past the edge of piston 551.

A two position control valve 559 is interposed in a fluid circuit 560 that connects ports 555 and 556 of actuator 80. Fittings 84 and 85 (FIG. 3C) may be attached to ports 555 and 556, respectively. When control valve 557 is in its first.position, fluid circuit 560 is blocked and oil cannot flow between chambers 552 and 553. When control valve 557 is in its second position, fluid circuit 560 is unblocked and oil can flow between chambers 552 and 553. The position of control valve 557 is controlled by a solenoid 559 that receives a control signal from a controller as described below. A spring biases control valve 557 to its second position when solenoid 559 is not energized. Energizing solenoid 559 moves control valve 557 to its first position. A spring-loaded supply valve 561 connects fluid circuit 560 to a gravity-fed source 562 of oil to maintain fluid level in circuit 560.

In order to withdraw rod 82 from housing 81, fluid is allowed to enter chamber 552 while fluid is allowed to exit chamber 553. To allow pushing of rod 82 into housing 81, fluid is permitted into chamber 553 while fluid is allowed to flow from chamber 552. In some embodiments, actuator 80 may be a commercially available fluid actuator and be operated using a liquid (e.g., food grade silicone oil). For convenience, the remainder of the description of FIGS. 8A-8H will refer to the working fluid of actuator 80 as oil and will use shading to indicate same. In other embodiments a different working fluid may be used. The fluid used in connection with actuator 80 can be selected based on viscosity so as to control the speed with which rod 82 can be pulled from or pushed into housing 81.

Figure 8A:
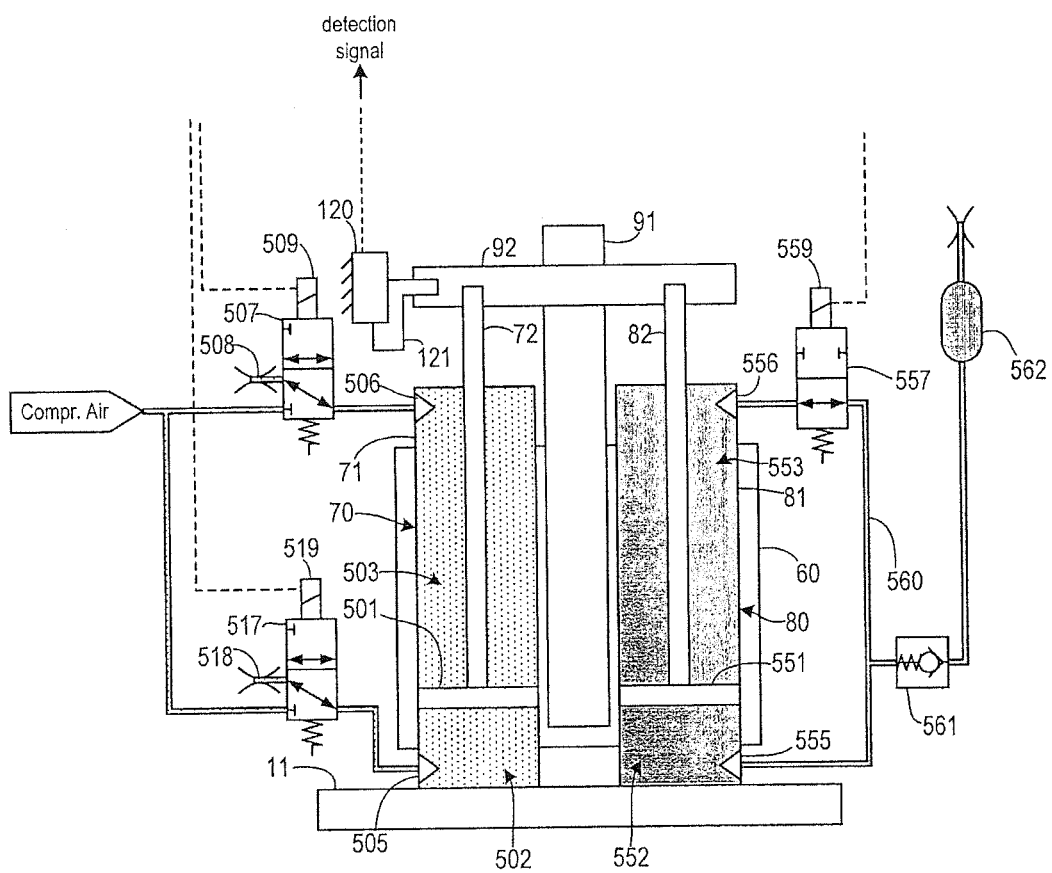

FIG. 8A shows filler unit 10 at a time T1. At time T1, filling valve 50 is closed and shuttle 200 is at the bottom of its stroke (as shown in FIG. 4A). Time T1 may be a time after the filling of one container is completed and prior to beginning the filling of a next container. Pistons 501 and 551 are at the bottoms of their strokes within housings 71 and 81, respectively. Solenoids 509, 519 and 559 are not energized, and thus each of control valves 507, 517 and 557 is in its second position (chambers 502 and 503 vented to atmosphere, fluid circuit 560 unblocked). Optical sensor 121 is generating a detection signal in response to flag 120 being located in sensor 121. At this stage of filler unit 10 operation, however, the controller takes no action based on the detection signal.

Figure 8B:
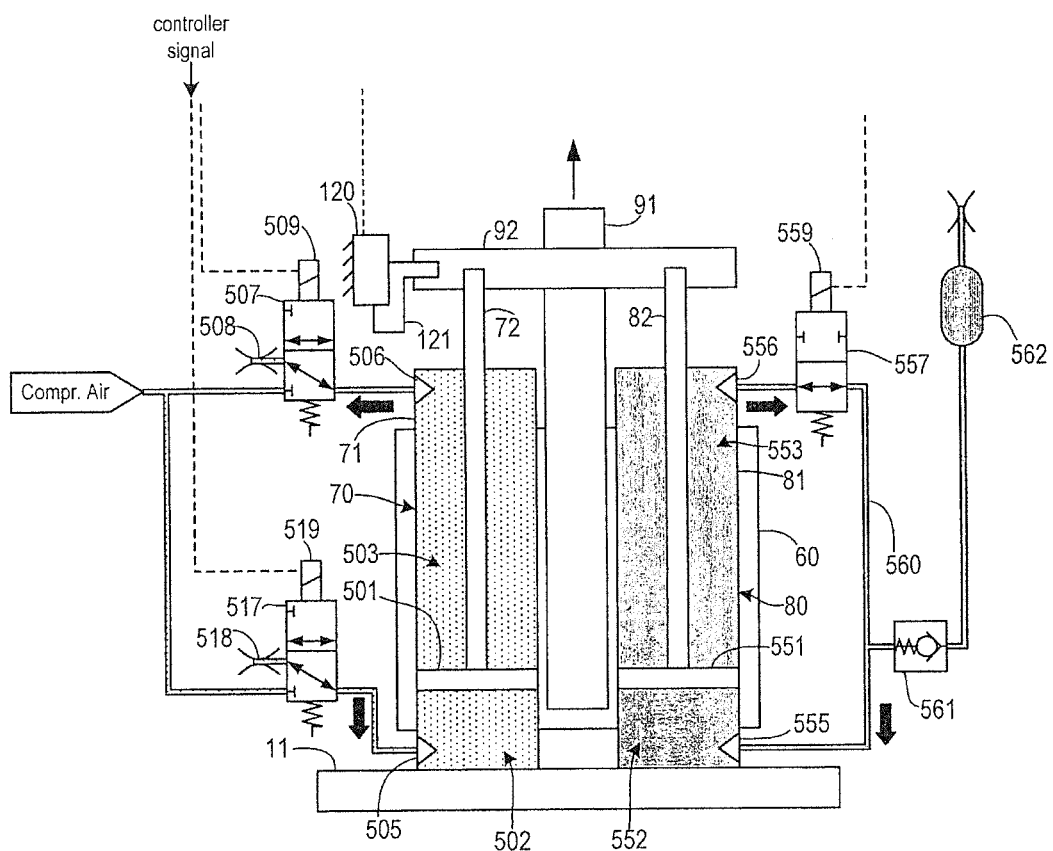

FIG. 8B shows filler unit 10 at a time T2 after time T1. At time T2, filler unit 10 begins to open filling valve 50. Solenoid 519 is energized in response to a signal from the controller and moves control valve 517 to its first position (connecting chamber 502 to compressed air source). Solenoid 509 is not energized and control valve 507 remains in its second position (venting chamber 503 to atmosphere). Solenoid 559 is also not energized and control valve 557 remains in its second position (fluid circuit 560 unblocked). Compressed air begins flowing into chamber 502 and pushing piston 501 upward. This pushes rod 72 upward and out of housing 71, with rod 71 pushing crossbar 92 upward. Because crossbar 92 is coupled to shuttle 200 via riser bracket 91 and drive sleeve 60, the upward movement of crossbar 92 results in upward movement of shuttle 200 and opening of filling valve 50. Because optical flag 120 is still within optical sensor 121, sensor 121 continues to output a detection signal. At this stage of filler unit 10 operation, however, the controller takes no action based on the detection signal.

Because fluid circuit 560 is unblocked oil can flow between chambers 552 and 553 of actuator 80. Upward force on crossbar 92 from rod 72 of actuator 70 causes crossbar 92 to pull rod 82 of actuator 80. That pulling force on rod 82 causes upward movement of piston 551 as rod 82 is pulled from housing 81. The movement of piston 551 causes oil to flow from chamber 553 as its volume decreases and to chamber 552 as its volume increases.

For convenience, FIG. 8B includes arrows near ports 505 and 506 indicating the direction of air flow. Similarly, arrows near ports 555 and 556 indicate the direction of oil flow. An arrow positioned near the top of riser bracket 91 indicates the direction in which crossbar 92 and its coupled components (pistons 501 and 551, rods 72 and 82, optical flag 120, riser bracket 91, and drive sleeve 60 (and thus, shuttle 200)) are moving.

Figure 8C:
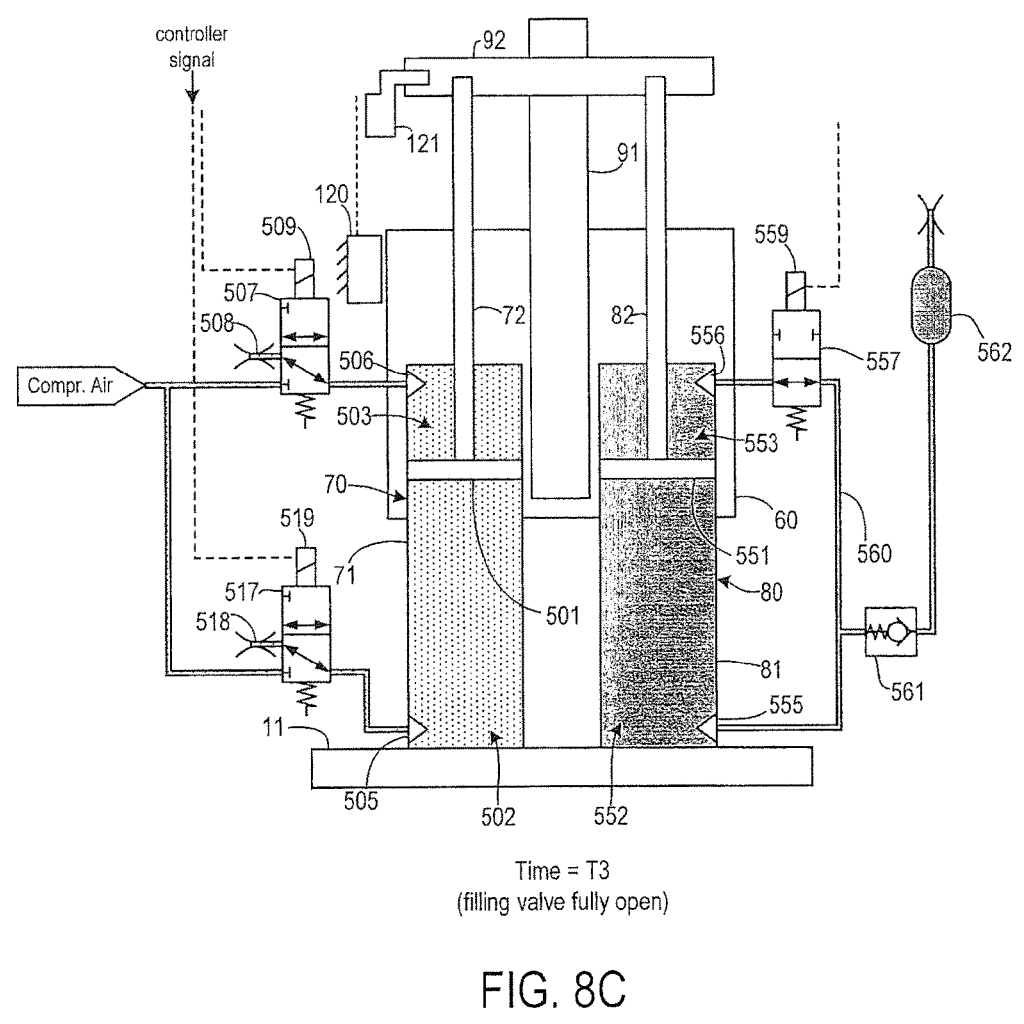

FIG. 8C shows filler unit 10 at a time T3 after time T2. At time T2, filling valve 10 is fully open and shuttle 200 is at the top of its stroke. Solenoid 519 remains energized in response to a signal from the controller and maintains control valve 517 in its first position (connecting chamber 502 to a compressed air source). Solenoid 509 remains unenergized and control valve 507 remains in its second position (venting chamber 503 to atmosphere). Solenoid 559 also remains energized and control valve 557 is in its second position (fluid circuit 560 unblocked). The upward movement of crossbar 92 and its coupled components is stopped by adjustable rod 110 (FIG. 30). Because piston 501 is no longer moving, air flow through ports 505 and 506 has stopped notwithstanding control valve 517 being in its first position and control valve 507 being in its second position.

Similarly, and even though fluid circuit 560 is unblocked, oil flow through ports 555 and 556 has stopped because piston 551 is no longer moving. Optical flag 120 has moved out of optical sensor 121 and sensor 121 is no longer sending a detection signal.

Figure 8D:
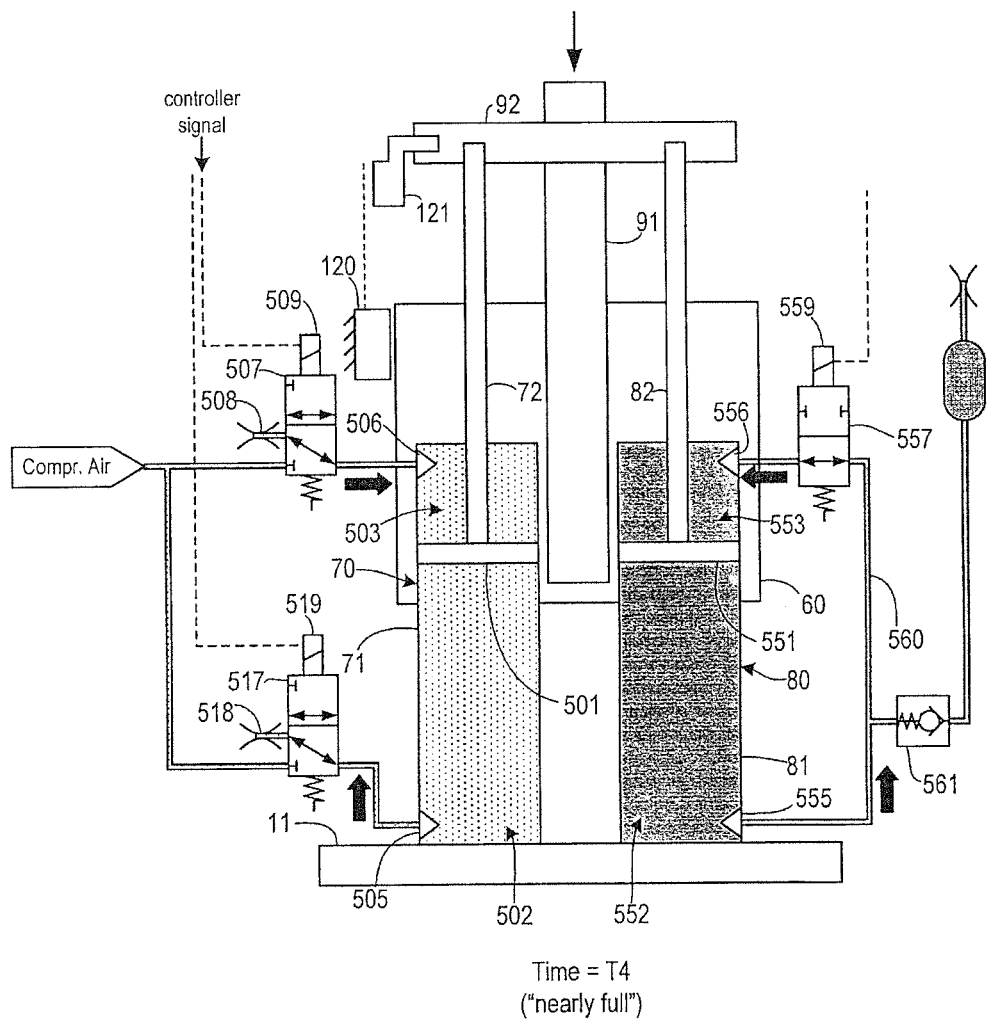

FIG. 8D shows filler unit 10 at a time T4 after time T3. Between time T3 and time T4, one or more signals $S_{LC}$ output from load cell 406 of arm 20 indicated to the controller that the weight of the container being filled and its contents had reached a level corresponding to a predetermined "nearly full" fill level for the container. At time T4, and in response to the "nearly full" indication, the controller sends a signal that energizes solenoid 509 and stops sending the signal that energized solenoid 519. This causes movement of control valve 507 to its first position (connecting chamber 503 to a compressed air source) and return of control valve 517 to its second position (venting chamber 502 to atmosphere). Solenoid 559 remains unenergized and fluid circuit 560 remains unblocked.

As a result of compressed air flowing into chamber 503 and air flow out of chamber 502, and because oil can flow in fluid circuit 560, piston 501 moves downward. This pulls rod 72 and crossbar 92 downward. Downward movement of crossbar 92 results in downward movement of riser bracket 91, drive sleeve 60 and shuttle 200, as well as downward movement of rod 82 and piston 551. Arrows near ports 505 and 506 indicate the direction of air flow. Arrows near ports 555 and 556 indicate the direction of oil flow. An arrow positioned near the top of riser bracket 91 indicates the direction in which crossbar 92 and its coupled components are moving.

Figure 8E:
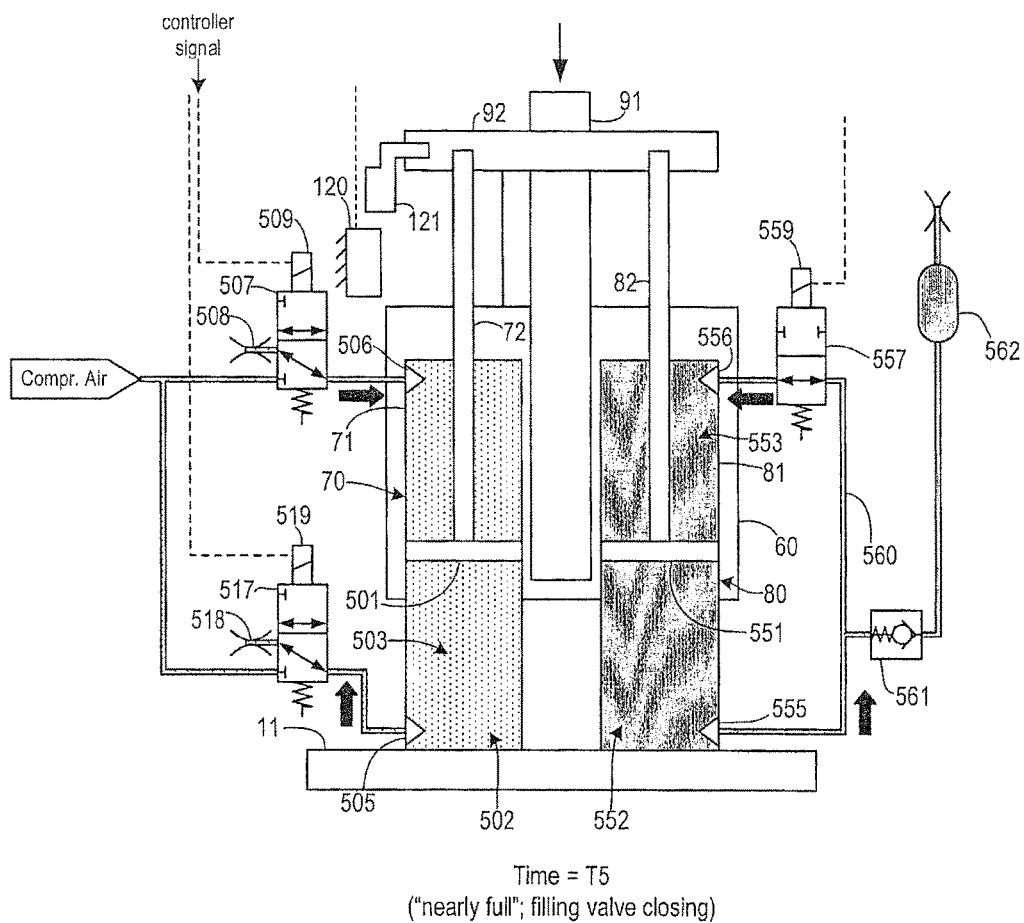

FIG. 8E shows filler unit 10 at a time T5 after time T4. Crossbar 92 and its coupled components continue to move downward. Solenoid 509 remains energized and solenoids 519 and 559 remain unenergized. Air and oil continue to flow in the directions indicated.

Figure 8F:
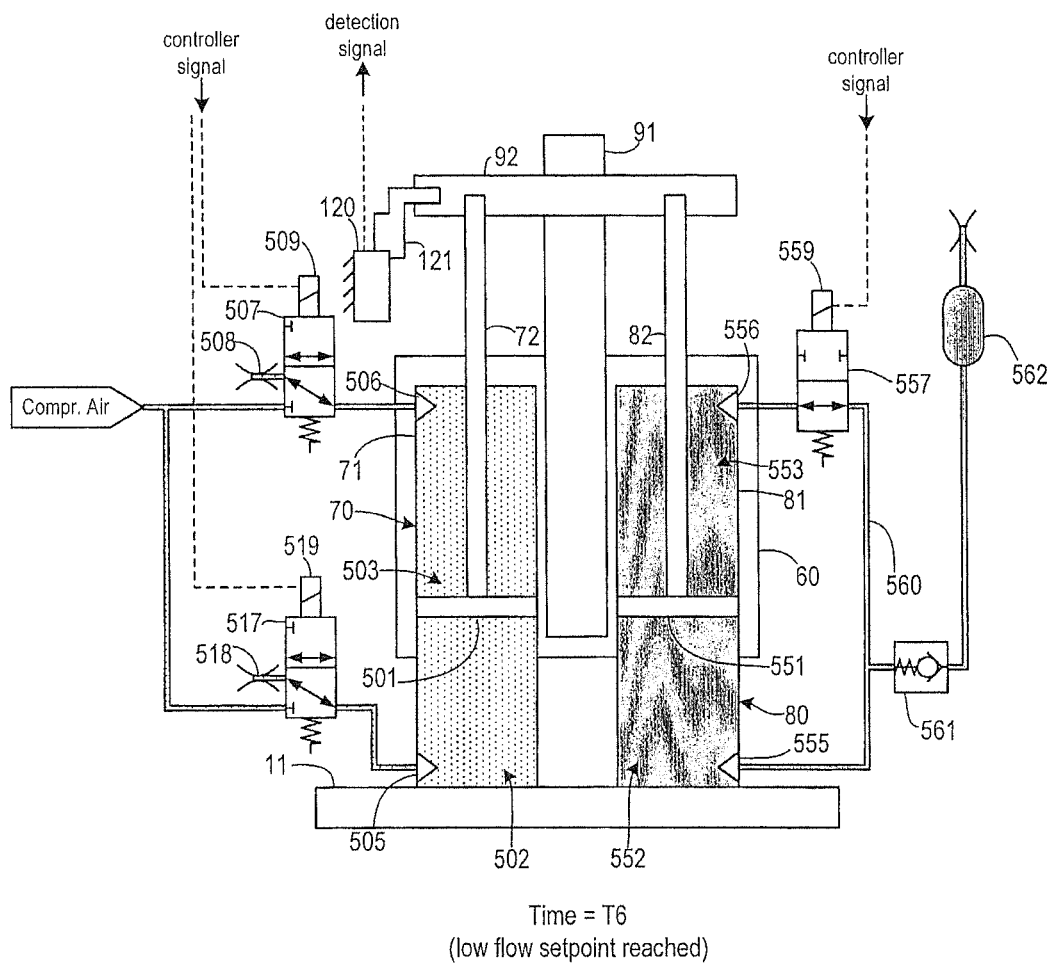

FIG. 8F shows filler unit 10 at a time T6 after T5. The downward motion of crossbar 92 has caused optical flag 120 to reach a point where it is detected by sensor 121. This causes optical sensor 121 to send a detection signal to the controller. In response to the detection signal, the controller sends a signal energizing solenoid 559. This causes movement of control valve 557 to its first position (blocking fluid circuit 560). Solenoid 509 remains energized and solenoid 519 remains unenergized. Because oil can no longer flow in fluid circuit 560, oil can no-longer move between chambers 552 and 553. As a result, movement of piston 551 is stopped. This causes rod 82, crossbar 92 and other components coupled to crossbar 92 to stop moving. Although control valve 507 is in its first position (connecting chamber 503 to compressed air source) and control valve 517 is in its second position (venting chamber 502 to atmosphere), piston 501 is held in place by virtue of its coupling to crossbar 92, and air does not flow in or out of actuator 70.

The position of shuttle 200 at time T6 corresponds to a low flow setpoint. When shuttle 200 is in this position, flow of beverage product through opening 49 is partially obstructed, with the rate at which product flows from opening 49 to a container being reduced. The low flow setpoint will vary based on beverage type and may vary based on container type. For example, a first low flow setpoint corresponding to a less viscous product with no inclusions may place shuttle 200 in a first position that almost completely closes opening 49. A second low flow setpoint corresponding to a product that is more viscous and/or that has inclusions may place shuttle 200 in a second position that partially obstructs opening 49, but to a lesser degree than the first position.

The system described above allows simple adjustment of the low flow setpoint. In particular, the locations of optical sensor 121 and of flag 120 control when downward movement of drive sleeve 60 is arrested. By moving optical sensor 121 up or down (and/or adjusting the position of flag 120 on relative crossbar 92), the low flow setpoint can be changed.

In some embodiments, the low flow setpoint is controlled without use of an optical sensor. Instead, the controller starts a timer when a "nearly full" indication is received. The timer is set to a value that represents the time needed, after sending a control signal to energize solenoid 509 (and concomitant ceasing of the control signal energizing solenoid 519), for sleeve 60 to travel downward to the low flow setpoint position. The timer value can be readily determined by performing several trial runs of filler unit 10 with the product at issue and clocking the time required to reach the low flow setpoint. That time value could then be used for that filler unit and for other filler units in a filling system.

Figure 8G:
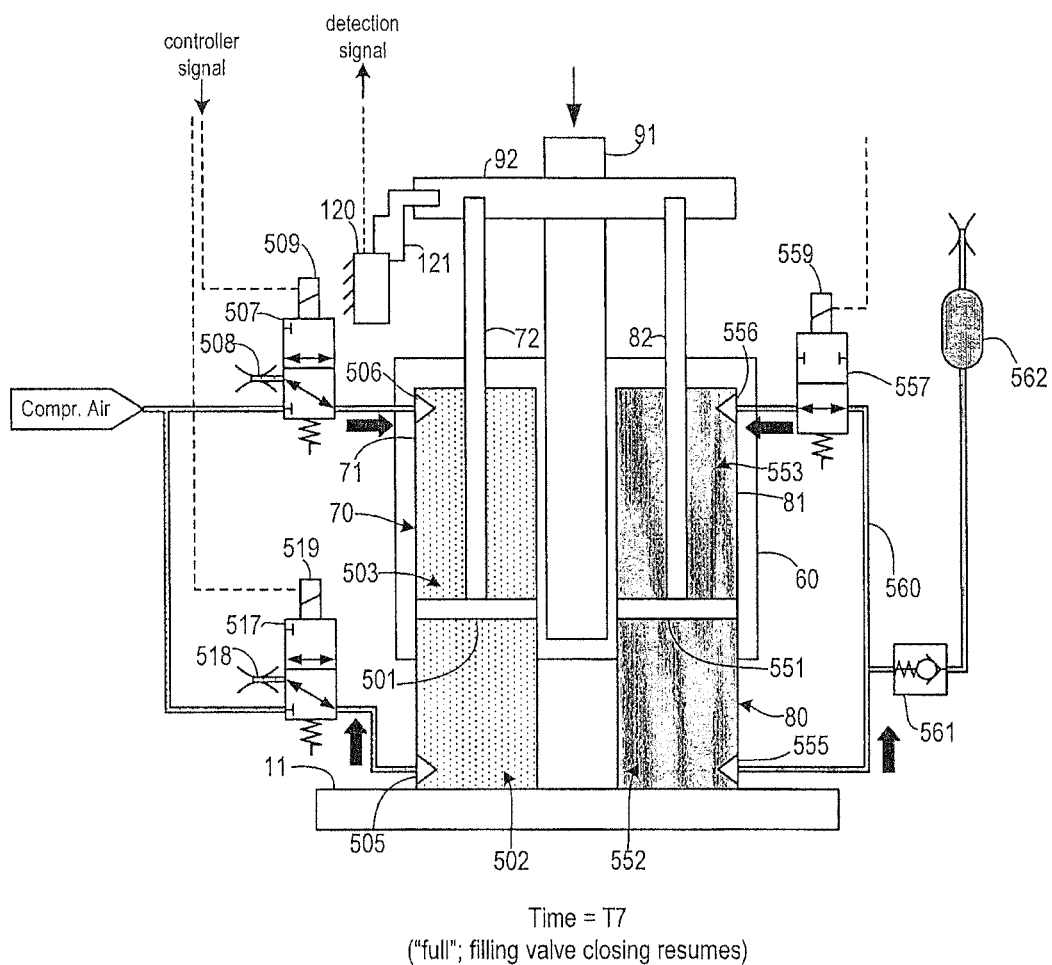

FIG. 8G shows filler unit 10 at a time T7 after T6. One or more signals $S_{LC}$ output from load cell 406 of arm 20 have indicated to the controller that the weight of the container being filled and its contents have reached a value corresponding to a fully filled container. In response to the "full" indication, the controller stops sending a signal to energize solenoid 559. This causes movement of control valve 557 to its second position (unblocking fluid circuit 560). The controller continues to send a signal energizing solenoid 509, thereby maintaining control valve 507 in its first position (connecting chamber 503 to a compressed air source). Solenoid 519 is unenergized and control valve 517 is in its second position (venting chamber 502 to atmosphere). Because oil can now flow from chamber 553 to chamber 552, downward motion of pistons 501 and 551 and their coupled components (including shuttle 200) resumes.

Figure 8H:
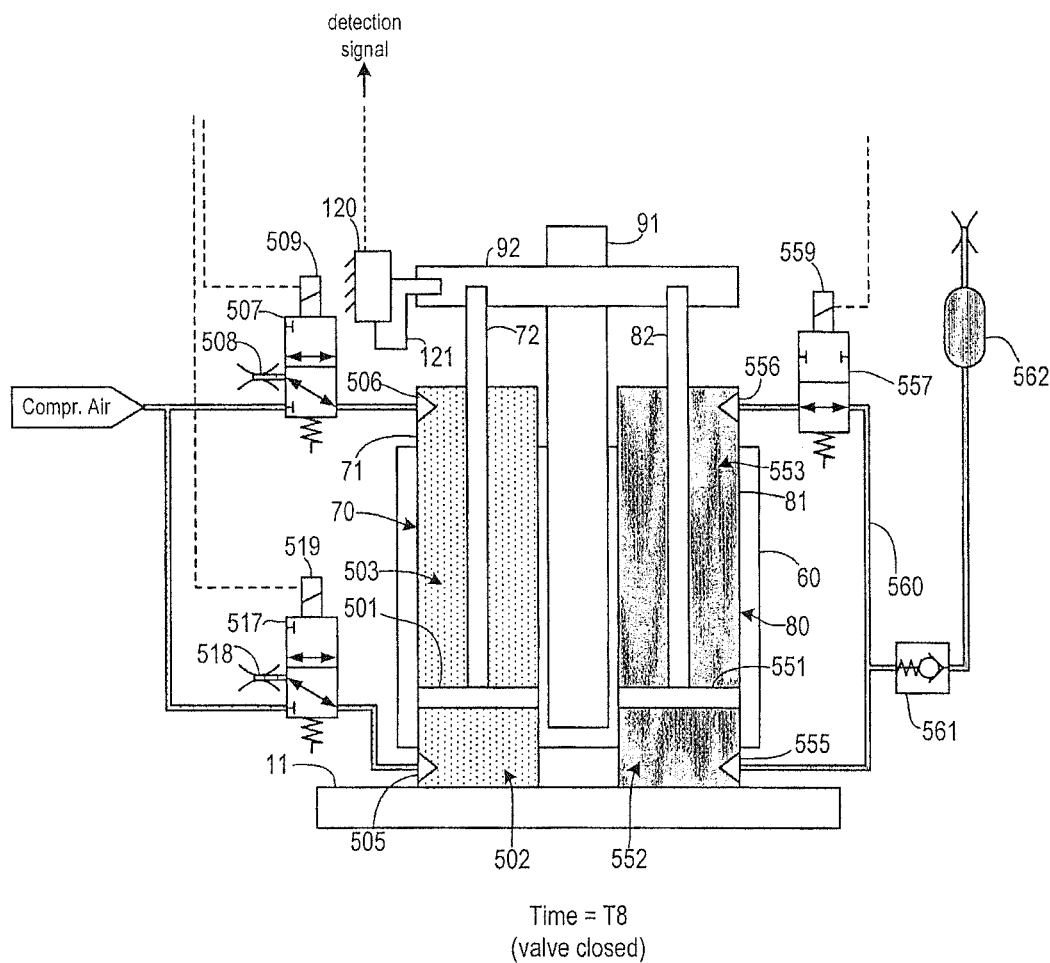

FIG. 8H shows filler unit 10 at a time T8 after T7. At time T8, filling valve 50 is fully closed. The signal from the controller energizing solenoid 509 can now be discontinued so as to return filler unit 10 to the condition shown in FIG. 8A. The operations shown in FIGS. 8B through 8H can then be repeated when the next container is in position for filling. In some embodiments, the controller continues to send a signal energizing solenoid 509 until it is time to again open filling valve 50.

FIGS. 8I through 8P are partially schematic rear views of a filler unit incorporating a low flow setpoint system according to another embodiment. The filler unit of FIGS. 8I-8P is similar to filler unit 10 shown in FIGS. 8A-8H. In the embodiment of FIGS. 8I-8P, however, cylinder 80 has been has been replaced with a cylinder 81'. Cylinder 80' is similar to cylinder 80, with housing 81', rod 82', piston 551', ports 555' and 556', chamber 552' and chamber 553' being respectively similar to housing 81, rod 82, piston 551, ports 555 and 556, chamber 552 and chamber 553 of cylinder 80.

Fluid circuit 560 has been replaced, however. Chamber 552', via port 555', is connected to an oil reservoir 581 by two paths. The first path includes a check valve 583. The second path includes a control valve 557' that is similar to control valve 557 and a flow restricting orifice 582. Control valve 557' has a first position in which flow is blocked and a second position in which flow is unblocked. The position of control valve 557' is controlled by a solenoid 559' that receives a control signal from a controller as described below. A spring biases control valve 557' to its second position when solenoid 559' is not energized. Energizing solenoid 559' moves control valve 557' to its first position.

Chamber 553' is connected, via port 556', to the top of oil reservoir 581. In the embodiment of FIGS. 8I-8P, oil flows between lower chamber 552' and oil reservoir 581. Chamber 553' contains air and only a small amount of oil for sealing and lubrication. Chamber 553' is connected to oil reservoir 581 so that any oil that might be expelled through port 556' can be returned to oil reservoir 581. The upper portion of oil reservoir 581 is vented to the atmosphere. The oil used in the embodiment of FIGS. 8I-8P may also be food grade silicone oil.

Check valve 583 permits flow from oil reservoir 581 to chamber 552' when piston 551' moves upward, but blocks flow in the other direction when piston 551' moves downward. Orifice 582 allows flow in either direction, but restricts that flow. In this manner, orifice 582 slows the downward movement of piston 551'. This slows downward movement of shuttle 200 so as to prevent stopper 225 from slamming into outlet 49 and causing premature wear. When valve 50 is opened, check valve 583 allows oil to bypass orifice 582 so as to permit the shuttle to be raised more quickly.

Figure 8I:
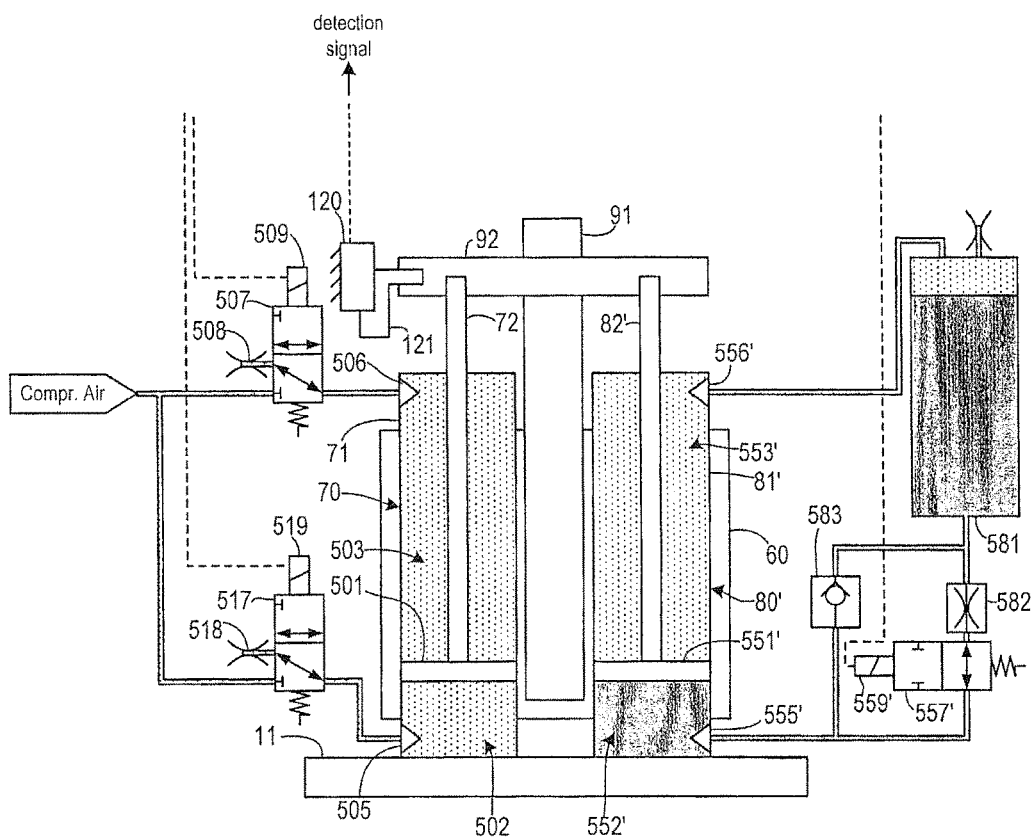
Figure 8J:
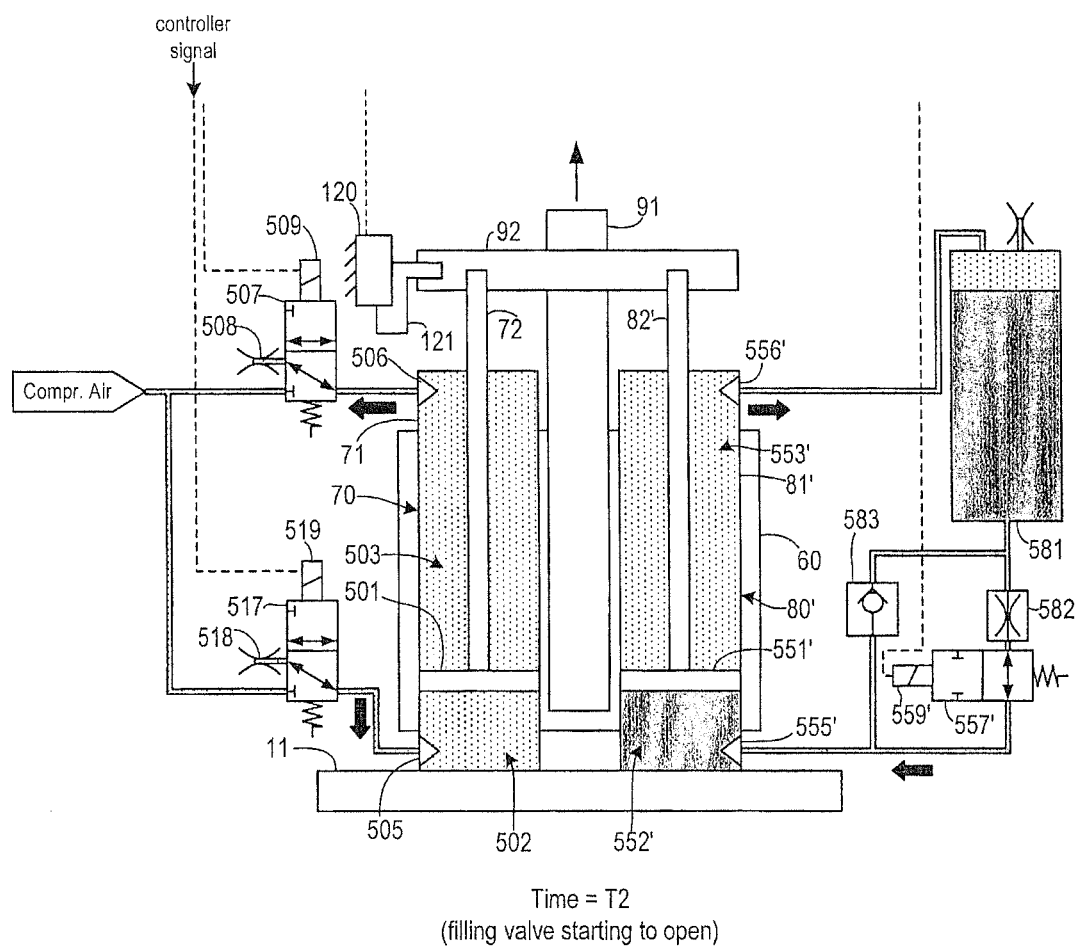
Figure 8K:
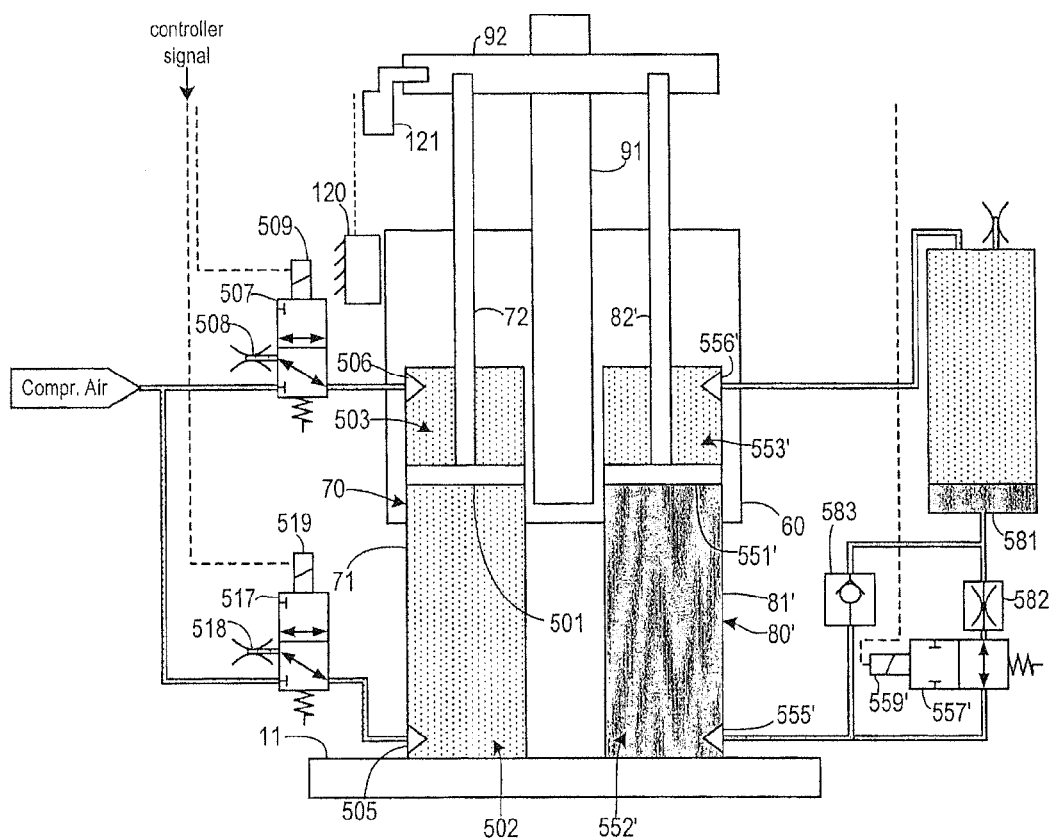
Figure 8L:
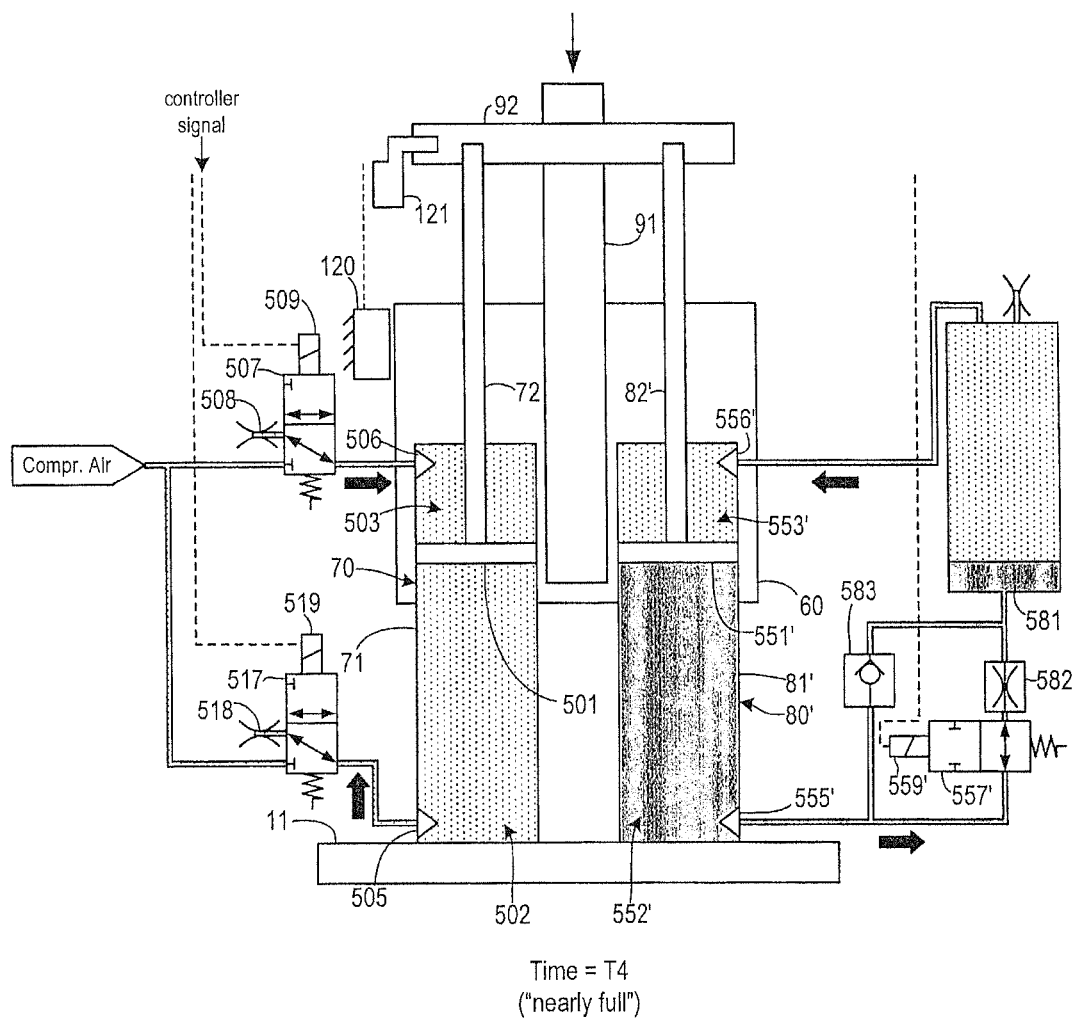
Figure 8M:
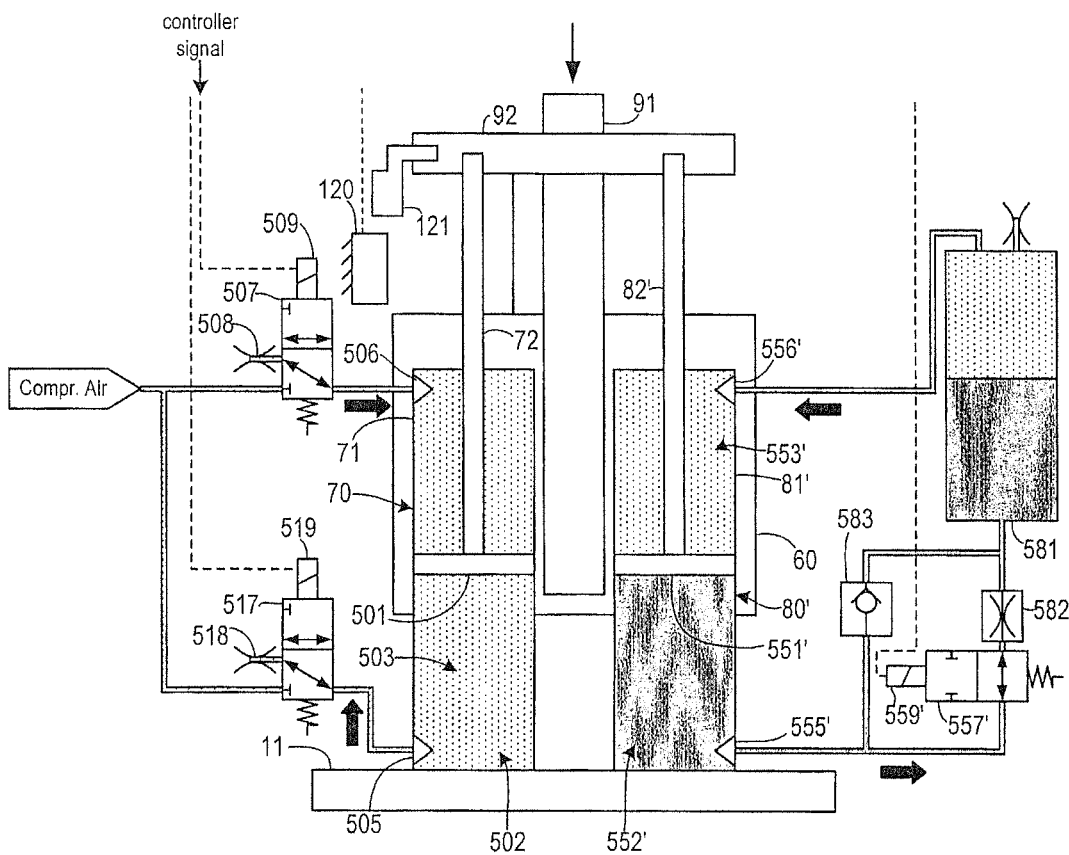
Figure 8N:
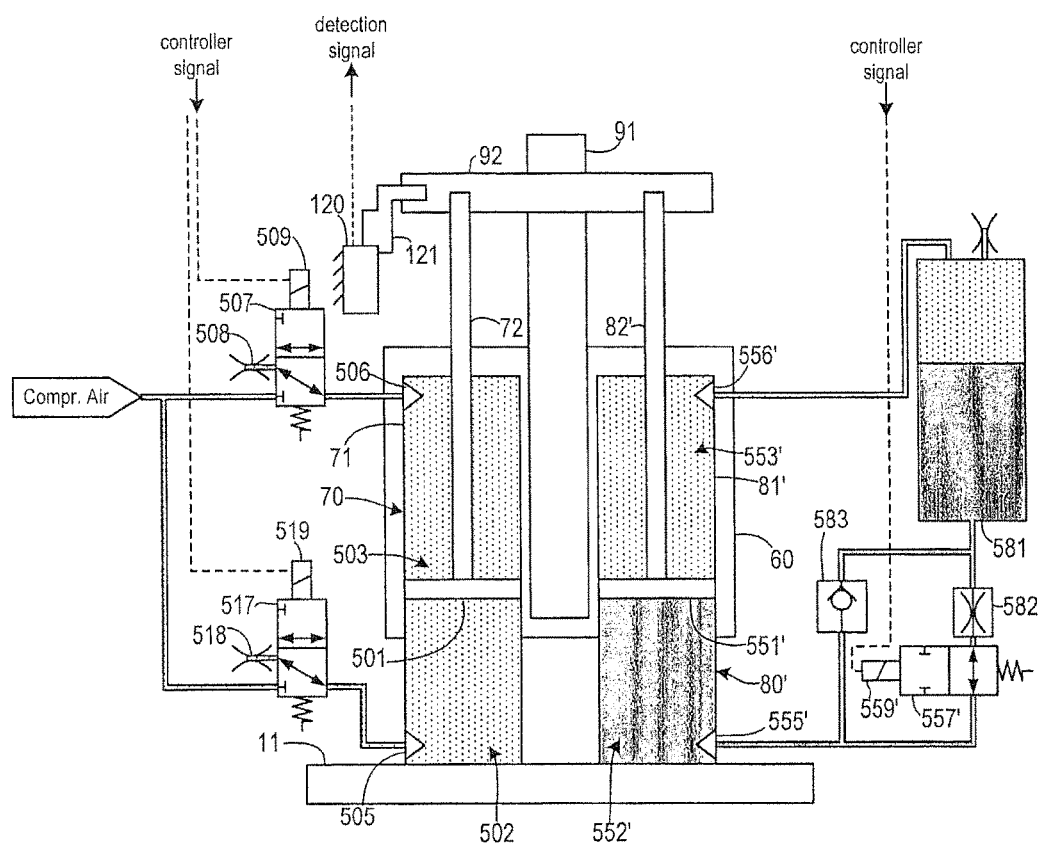
Figure 80:
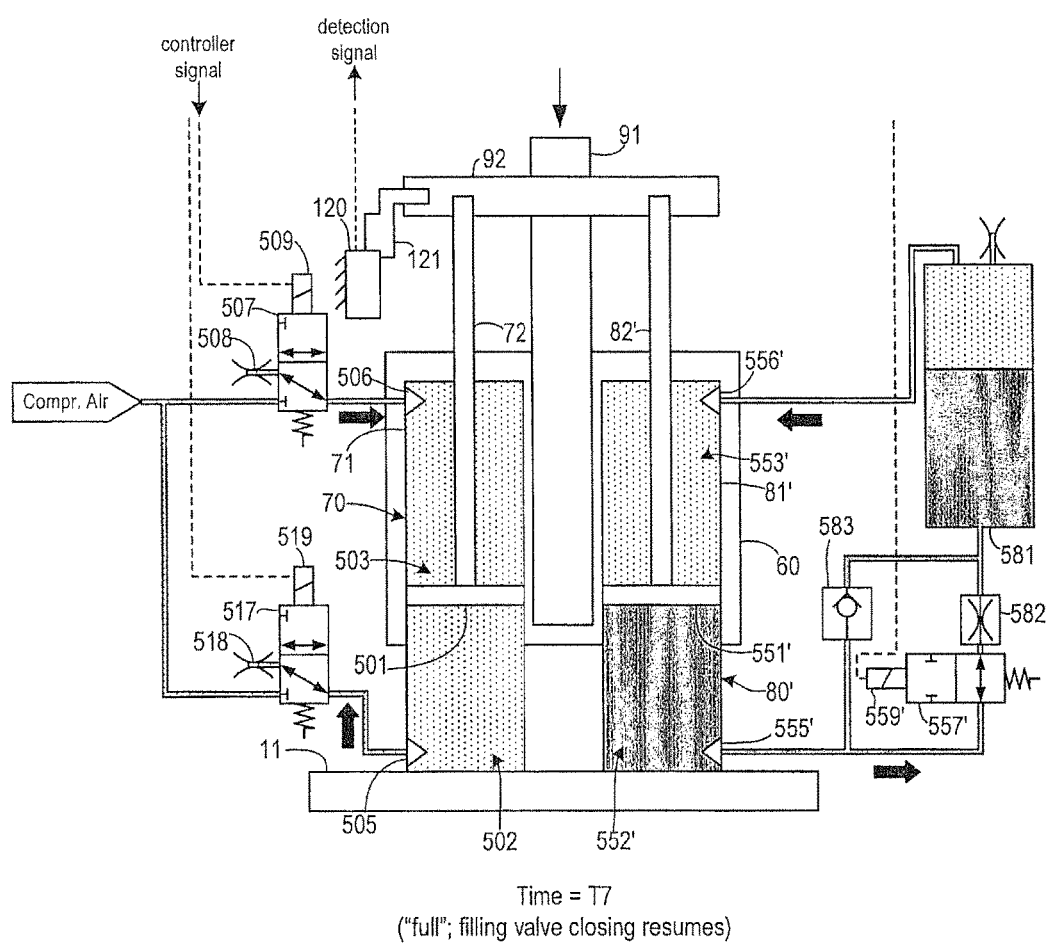
Figure 8P:
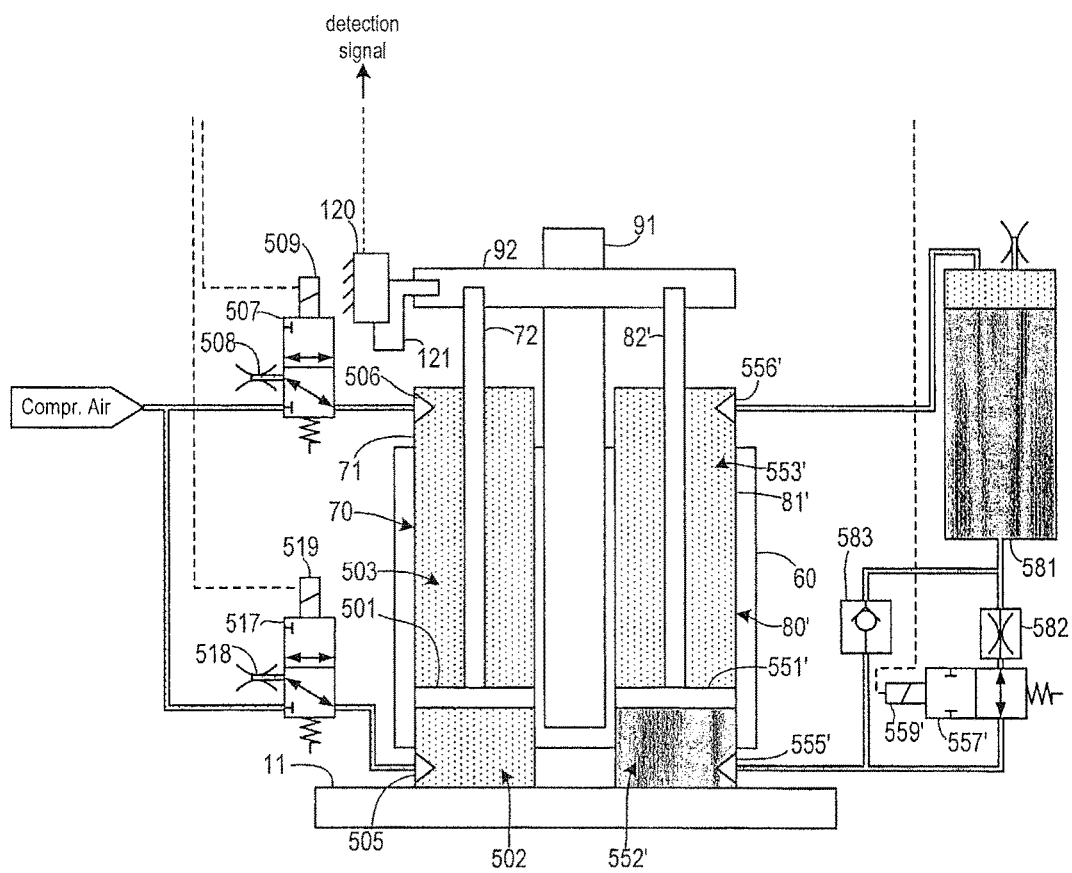

The same control signals used in the embodiment of FIGS. 8A-8H may be used in the embodiment of FIGS. 8I-8P to achieve the same valve movements. In FIG. 8I (time T1), filling valve 50 is closed, shuttle 200 is at the bottom of its stroke, pistons 501 and 551' are at the bottoms of their strokes, and solenoids 509, 519 and 559' are not energized. Optical sensor 121 is generating a detection signal in response to flag 120 being located in sensor 121. At this stage of filler unit operation, however, the controller takes no action based on the detection signal.

At time T2 (FIG. 8J), the filler unit begins to open filling valve 50. Solenoid 519 is energized in response to a signal from a controller. Solenoid 509 is not energized. Solenoid 559' not energized and control valve 557' remains in its second position (unblocked). Oil flows from reservoir 581 to the increasing volume of chamber 552' as piston 552' moves upward. That oil flows through check valve 583 and, to a lesser extent, through orifice 582 and control valve 557'.

At time T3 (FIG. 8K), the filling valve is fully open and shuttle 200 is at the top of its stroke. Solenoid 519 remains energized in response to a signal from the controller. Solenoid 509 remains unenergized. Solenoid 559' also remains energized and control valve 557' is in its second position (unblocked). Because pistons 501 and 551' are no longer moving, air and oil flow has stopped. Optical flag 120 has moved out of optical sensor 121 and sensor 121 is no longer sending a detection signal.

At time T4 (FIG. 8L), in response to a "nearly full" indication, the controller sends a signal that energizes solenoid 509 and stops sending the signal that energized solenoid 519. Solenoid 559' remains unenergized and control valve 557' remains in its unblocked position. Oil flows to oil reservoir 581 from chamber 552', but only through control valve 557' and orifice 582.

At time T5 (FIG. 8M), solenoid 509 remains energized and solenoids 519 and 559' remain unenergized. Air and oil continue to flow in the directions indicated.

At time T6 (FIG. 8N), valve 50 has reached its low flow setpoint and optical sensor 121 to send a detection signal to the controller. In response, the controller sends a signal energizing solenoid 559'. This causes movement of control valve 557' to its first position (blocking fluid flow). Solenoid 509 remains energized and solenoid 519 remains unenergized. Because oil can no longer flow from chamber 552' to oil reservoir 581, movement of piston 551' is stopped.

At time T7 (FIG. 8O), the controller has received a "full" indication and stops sending a signal to energize solenoid 559'. This causes movement of control valve 557' to its second position (unblocked). The controller continues to send a signal energizing solenoid 509. Solenoid 519 is unenergized. Because oil can now flow from chamber 552' to oil reservoir 581, downward motion of pistons 501 and 551' resumes.

At time T8 (FIG. 8P), filling valve 50 is fully closed. The signal from the controller energizing solenoid 509 can now be discontinued so as to the return filler unit to the condition shown in FIG. 8I.

As previously indicated, in some embodiments filler unit 10 is used in a filling system that may fill containers with multiple types of beverage products. Those products may have a wide range of viscosities and may or may not comprise inclusions. In order to accommodate products with larger inclusions, opening 49 of filling valve 50 is sized so that those inclusions can pass. For example, opening 49 of cup 53 may have a width of about 0.625 inches. However, an opening sized to pass larger inclusions (e.g., 10 mm cubes) may result in undesirably high flow rates for products that lack inclusions and/or that are less viscous. In some embodiments, a filling system that includes filling valve 50 may also include a pressure control system that maintains a desired pressure at a location in that filling system. That location may be in the product reservoir that supplies one or more filling valves, or it may be in a flow path from that reservoir. For some products, the desired pressure may be above atmospheric pressure so as to encourage product flow through filling valves. For other products, the desired pressure may be sub-atmospheric (i.e., a vacuum) so as to slow the flow of product through filling valves. As used herein, "atmospheric," "atmospheric pressure" and "ambient atmospheric pressure" all refer to an ambient pressure in the spaces surrounding the filling system, including the space at the outlet of the filling valve(s).

Figure 9A:
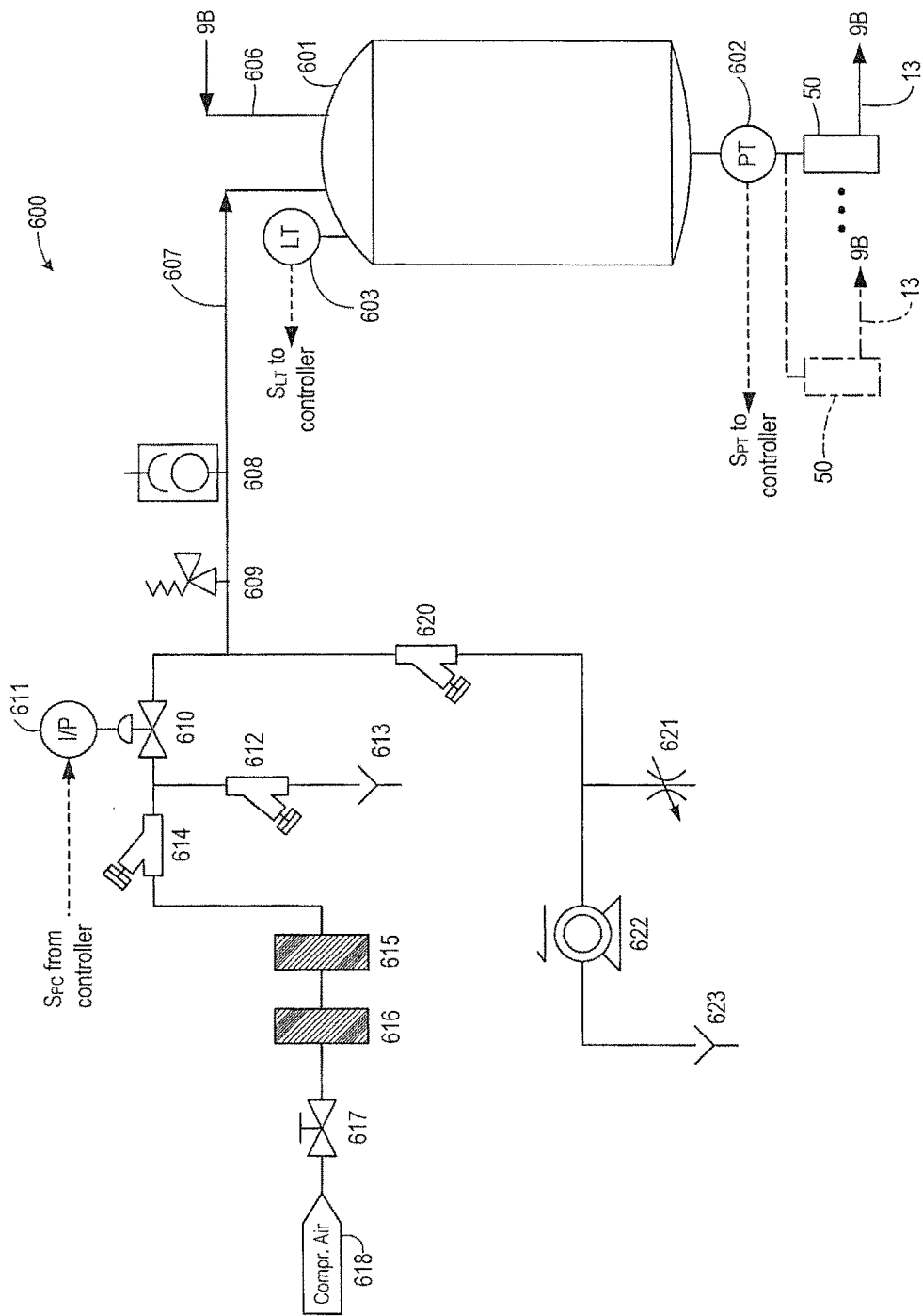
FIG. 9A is a schematic diagram showing a portion of a beverage container filling system that includes a pressure control system according to at least some embodiments.

FIG. 9A is a schematic diagram showing a portion of a beverage container filling system that includes a pressure control system 600 according to at least some embodiments. The filling system portion shown in FIG. 9A could be part of a filling system such as filling system 40 shown in FIG. 2 and include filling valve 50. Because filling valve 50 is symbolically shown as a rectangle in FIG. 9A, the locations of recirculation pipe(s) 13 are indicated for orientation purposes. As shown in uneven broken lines, additional filling valves 50 may be included in parallel. Throughout the remaining description of FIGS. 9A and 9B, "filling valve(s) 50" indicates that between 1 and n filling valves 50 are present, where n is an arbitrary number (e.g., 72 for filling system 40 of FIG. 2). Recirculation pipe(s) 13 of filling valve(s) 50 are connected to a product recirculation system. That product recirculation system is further discussed in connection with FIG. 9B.

Filling valve(s) 50 are connected to product reservoir 601. An interior of reservoir 601 has a capacity to hold an amount of beverage product that is greater than the combined volumes of multiple containers being filled. The interior of the housing for each of filling valve(s) 50 is in fluid communication with the interior of product reservoir 601. A pressure transducer (PT) 602 is located in a fluid path between reservoir 601 and filling valve(s) 50. In some embodiments, pressure transducer 602 may be located within reservoir 601, e.g., in a lower region of the reservoir 601 interior near an outlet leading to filling valve(s) 50. Pressure transducer 602 outputs signals $S_{PT}$ to a controller. Although not shown in FIG. 9A, the controller forms a part of pressure control subsystem 600 (and other systems described herein) and is discussed below in connection with FIG. 10. Signals $S_{PT}$ are indicative of pressures detected at various times by transducer 602 in the fluid path between reservoir 601 and filling valve(s) 50. A level transducer (LT) 603 is located within reservoir 601 and output signals SLT to the controller, with signals SLT being indicative of fluid levels within reservoir 601 at various times.

Reservoir 601 is filled with beverage product through a supply inlet 606. Supply inlet 606 may receive beverage product from a pasteurizer or sterilizer, as described in connection with FIG. 9B.

Reservoir pressure control system 600 is connected to the interior of reservoir 601 by a reservoir pressure control line 607. Line 607, as well as other lines described in connection with system 600, may be include one or more pipes, tubes or other type of conduit capable of containing pressurized fluid and, for some portions of system 600, holding a vacuum without collapsing. The working fluid of reservoir pressurization control system 600 may be a gas or gas mixture, e.g., air, nitrogen, carbon dioxide, etc. By adjusting the pressure of a fluid in line 607, the pressure within reservoir 601 (and at locations in a flow path from reservoir 601) may be controlled. Line 607 may include a vacuum breaker 608 to prevent tank collapse as a result of an inadvertently high vacuum, as well as a relief valve 609 to prevent system damage from inadvertent overpressure in line 607.

A first branch of line 607 is connected to an output of a pressure control valve 610. Pressure control valve 610 is selectively opened and closed by a current-to-pressure transducer (I/P) 611. The input side of pressure control valve 610 is connected by additional lines to a source 618 of pressurized air (or other pressurized working fluid source). Included in those lines connecting pressure control valve 610 and source 618 may be an angle seat valve 614, filters 615 and 616, and a hand valve 617. Filters 615 and 616 may be 0.2 micron filters and included to prevent microorganisms or other contaminants from entering reservoir 601. For aseptic filling operations, filters 615 and 616 may be sterilizable HEPA/ULPA filters. Hand valve 618 may be used to isolate system 600 from source 618. Angle seat valve 614 may also be used to isolate system 600 from source 618, but while keeping filters 615 and 616 pressurized. An angle seat valve 612 connects the portions of system 600 between source 618 and the input side of valve 610 to a drain 613.

A second branch of reservoir pressure control line 607 is connected to the input side of a vacuum pump 622. The outlet of vacuum pump 622 is connected to a drain 623. An angle seat valve 620 may be included in the lines connecting vacuum pump 622 to line 607. An adjustable vacuum relief orifice 621 (e.g., a needle valve) is connected to the fluid path between angle seat valve 620 and vacuum pump 622.

Pressure transducer 602, level transducer 603, vacuum breaker 608, relief valve 609, pressure control valve 610, current-to-pressure transducer 611, angle seat valves 612, 614 and 620, filters 615 and 616, hand valve 617, vacuum orifice 621, and vacuum pump 622 may be conventional commercially available components. Accordingly, and except with regard to their use in the novel and inventive systems described herein, additional details of these components are not provided.

The pressure in line 607 is adjusted so as to maintain a pressure $P_{Target}$ at a location corresponding to pressure transducer 602 at or near (e.g., +/−0.1 psi, +/−0.05 psi, etc.)

$P_{Target}$. As indicated above, that location is between reservoir 601 and filling valve(s) 50 in FIG. 9A. In other embodiments, that location may be within reservoir 601 or elsewhere in a flow path from reservoir 601. That $P_{Target}$ pressure may be a sub-atmospheric pressure (a vacuum), may be an atmospheric pressure, or may be a pressure above atmospheric pressure. Because of head pressure from the reservoir 601 contents, the actual pressure in line 607 may be lower than the pressure as measured by transducer 602. Nonetheless, reducing pressure in line 607 reduces pressures between reservoir 601 and filling valve(s) 50 and increasing pressure in line 607 increases pressures between reservoir 601 and filling valve(s) 50.

Vacuum pump 622 pulls fluid from line 607 to generate a sub-atmospheric pressure (i.e., vacuum) in that line. Valve 610 can be opened to permit pressurized fluid from its input side to flow from its output side. Depending on the degree to which valve 610 is opened, the output from valve 610 can reduce a sub-atmospheric pressure in line 607, neutralize a sub-atmospheric pressure in line 607 to bring the line 607 pressure to atmospheric, or overcome a sub-atmospheric pressure created in line 607 by vacuum pump 622 so as to bring the line 607 pressure above atmospheric. The controller receives signals $S_{PT}$ from pressure transducer 602. Using a control algorithm described below in connection with FIG. 11C, and based on received signals $S_{PT}$ and previously-set control parameters, the controller outputs signals $S_{PC}$ to transducer 611. In response to those signals $S_{PC}$, transducer 611 opens pressure control valve 610 to overcome more of the sub-atmospheric pressure created by pump 622 (thereby increasing pressure in line 607) or closes control valve 610 to overcome less of the sub-atmospheric pressure created by pump 622 (thereby decreasing pressure in line 607).

Each the angle seat valves 612, 614 and 620 is normally either completely open or completely closed. Each of these angle seat valves is actuatable by a solenoid (or solenoid-controlled pneumatic actuator), not shown, in response to a signal from the controller. The controller sends a signal to keep angle seat valve 614 open while system 600 is running and stops sending that signal when system 600 is not being operated or if it is necessary to cut off high pressure flow for some reason. The controller sends a signal to keep angle seat valve 620 open while the system is running and stops sending that signal when the system is not being operated or if it is necessary to isolate the vacuum side from the pressure side for some reason. Angle seat valve 612 remains closed during operation; the controller may send a signal to open valve 612 if there is a need to dump air from the high pressure side.

Using both compressed fluid source 618 and vacuum pump 622 to adjust pressure allows better control, particularly when it is necessary to maintain a vacuum in line 607. In operation, valves 617, 614 and 620 may be opened, valve 612 closed and vacuum pump 622 energized prior to opening any of valve(s) 50. With pressure control valve 610 set in the middle of its optimum operating range, orifice 621 may adjusted so that the pressure detected by transducer 602 is at $P_{Target}$. The controller may then begin executing a pressure control algorithm as described below and filling operations with valve(s) 50 begun.

A desirable $P_{Target}$ will depend on the beverage product in question and, in particular, on the viscosity of that product. A desired $P_{Target}$ for a particular beverage product can be determined by performing a limited number of tests (e.g., at 0.1 psia intervals between 14 psia and 15.5 psia) to map input pressure of a filling valve 50 against flow rate through an outlet 49 of that filling valve 50 for the product in question. A desired flow rate can be selected and the corresponding pressure then used. A full system test can then be performed to adjust that pressure to account for multiple filling valve(s) 50 receiving product from the reservoir.

In the embodiment of system 600 shown in FIG. 9A, the output of pressure control valve 610 and the input of vacuum pump 622 are connected to pressure control line 607. As can be appreciated from FIG. 9A, line 607 and the interior of reservoir 601 form a common fluid space. In other embodiments, the output of a pressure control valve and the input of a vacuum pump (or other vacuum source) may be connected to a different configuration of lines forming a common fluid space that includes a reservoir interior.

Reservoir 601 is sealed and can be maintained at a pressure above, at or below atmospheric pressure. In some embodiments, reservoir 601 may be vented to the atmosphere and filling operations performed in an open-to-atmosphere mode.

When performing hot filling operations, the temperature of a beverage product in a reservoir may be elevated to prevent microorganism growth in both the product and in a container filled with that product. For example, that heated product may help sterilize the interior of the container. In some filling operations, a container is inverted after it has been filled with heated product and capped with a closure. The heated product within the container then sterilizes the inner surfaces of the closure.

During hot filling operations, it is desirable to maintain the temperature of internal filling valve 50 components near the elevated temperature of the reservoir. If the temperature of the filling valve falls too far, the temperature of product dispensed into a container may be too low. If product flow stops completely when filling valve 50 is closed, the internal components of filling valve 50 may cool as the filling valve is waiting to begin the next container filling operation. For example, and as previously explained in connection with FIG. 2, a filling valve 50 may be located on a continuously rotating carousel and dispensing beverage product into a container while that filling valve 50 moves between the 6 o'clock and 12 o'clock locations. While that filling valve 50 moves between the 12 o'clock and 6 o'clock locations to receive another container and begin a new filling operation, product is not flowing from outlet 49 of that filling valve 50.

To prevent excessive cooling of a filling valve during times when that filling valve is closed, it is known to recirculate a small amount of heated product through that filling valve and back to a product tank. For many types of products, however, excessive recirculation can degrade product quality. Accordingly, the recirculation flow should be sufficient to keep the filling valve heated, but at a much reduced flow rate relative to flow through the filling valve when the filling valve is open.

As previously indicated, filling valve 50 may be used to fill containers with a wide variety of beverage products. Some of those products may have relatively large inclusions. In order to recirculate product having large inclusions, relatively large fluid passages are needed. For example, to recirculate a beverage product having 10 mm×10 mm×10 mm inclusions, is desirable that a flow passage have a width of at least 0.625 inches (e.g., a 0.625 inch diameter for a round passage). For lower viscosity beverages without inclusions, however, simply modifying a conventional product recirculation system to include passages of that size would result in undesirably high recirculation flow rates for low viscosity products with smaller (or no) inclusions.

In a some embodiments, a filling system may include a product recirculation system that can recirculate large-inclusion products, but that can also recirculate other products without doing so at undesirably high flow rates. The flow through that recirculation system may be monitored using a flow meter. Based on that flow meter output, the flow within the recirculation system may be adjusted and kept to a predefined level.

Figure 9B:
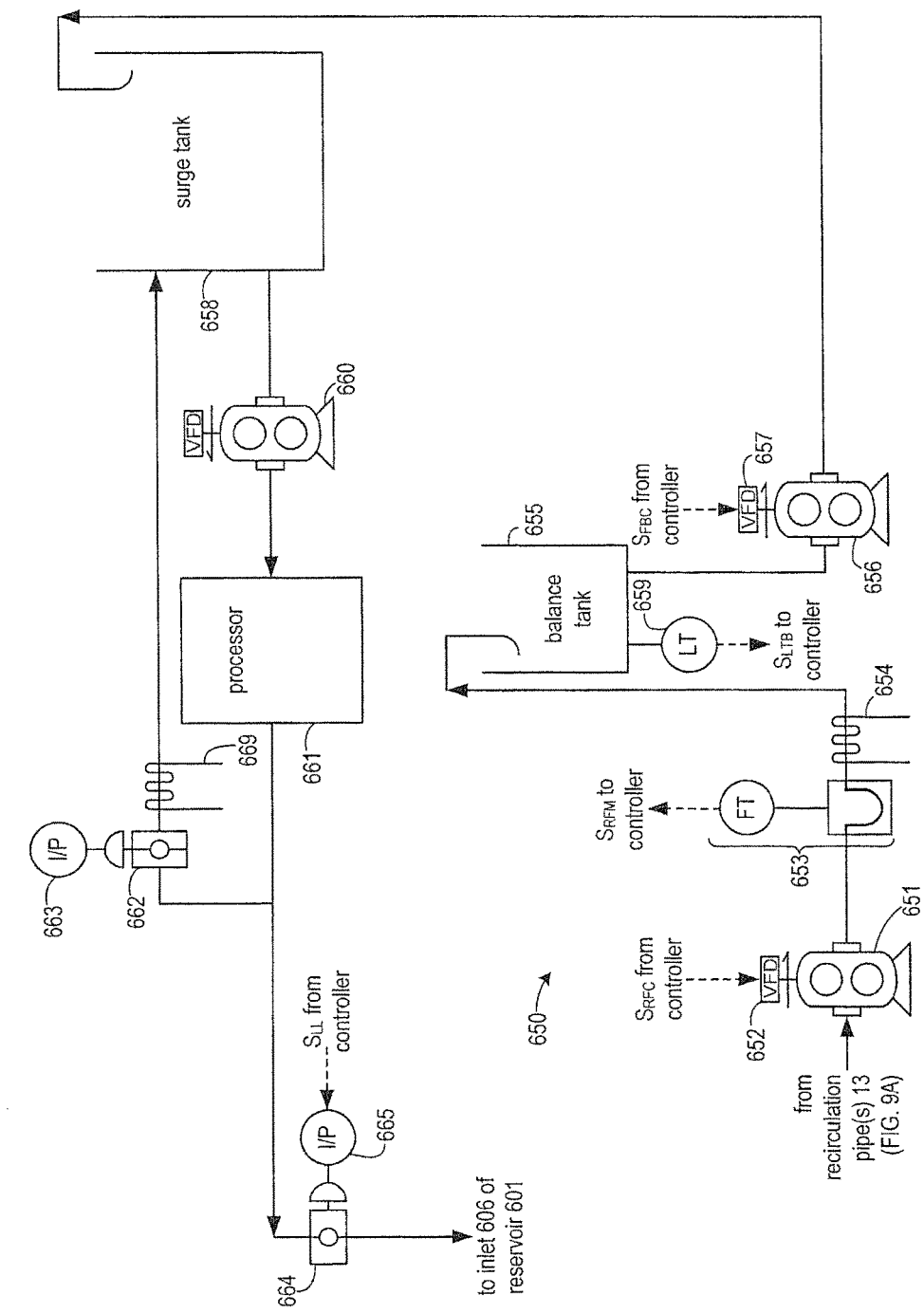
FIG. 9B is a schematic diagram showing a portion of a beverage container filling system that includes a product recirculation system according to at least some embodiments.

FIG. 9B is a schematic diagram showing a portion of a beverage container filling system that includes a product recirculation system 650 according to at least some embodiments. FIG. 9B is an extension of FIG. 9A and shows another portion of the same beverage container filling system.

A flow path of product recirculation system 650 includes a variable speed positive displacement pump 651 equipped with a variable frequency drive (VFD) 652. An input of pump 651 is connected to recirculation tube(s) 13 of filling valve(s) 50. An output of pump 651 flows to a balance tank 655. A flow meter 653 is located in a portion of the flow path between the pump 651 output and balance tank 655. Flow meter 653, which may include a mass flow meter and flow transmitter or other type of transducer, outputs signals $S_{RFM}$ indicative of flow rates through flow meter 653, and thus, through the flow path of product recirculation system 650. A flash cooler or other heat exchanger 654 may be located in the flow path of product recirculation system 650 and may cool beverage product to prevent damage from prolonged heating. Pump 651, variable frequency drive 652, flow meter 653, and heat exchanger 654 may be conventional commercially available components. Accordingly, and except with regard to their use in the novel and inventive systems described herein, additional details of these components are not provided.

Signals $S_{RFM}$ from flow meter 653 are received by the controller. Although not shown in FIG. 9B, the controller forms a portion of product recirculation system 650 and is discussed in connection with FIG. 10. Using a control algorithm described below in connection with FIG. 11D, and based on the received signals $S_{RFM}$ and previously set control parameters, the controller outputs signals $S_{RFC}$ to drive 652. In response to those signals $S_{RFC}$, drive 652 increases or decreases the speed of pump 651 to adjust the flow on the output side of pump 651.

Balance tank 655 outputs to the input of a second variable speed positive displacement pump 656 driven by a variable frequency drive 657. A level transducer 659 outputs signals $S_{LTB}$ indicative of product levels in tank 655 to the controller. Based on those signals $S_{LTB}$, the controller generates signals $S_{FBC}$ to increase or decrease the speed (and thus, flow) of pump 656. Level transducer 659, pump 656, and variable frequency drive 657 may be conventional commercially available components.

The output of pump 656 is an input to surge tank 658. An output of surge tank 658 is connected to the input of third variable speed positive displacement pump 660 driven by a variable frequency drive. The output of pump 660 flows to a processor 661. Processor 661 may be a pasteurizer or other sterilizer. The output of processor 661 flows to reservoir 601. The flow from processor 661 to reservoir 601 is controlled by a butterfly valve 664 (connected to a current-to-pressure transducer 665). The controller generates signals $S_{LL}$ to control the position of valve 664 based on signals $S_{LT}$ from level transducer 603 (FIG. 9A). A recirculation loop at the output of processor 661 includes another butterfly valve 662 connected to a current-to-pressure transducer 663. Signals from the controller, not shown, control the position of valve 662. Valve 662 can be opened if, e.g., flow to reservoir 601 is slowed or interrupted. Flow from valve 662 returns beverage product, through a second flash cooler 669, to surge tank 658. The portion of the system shown in FIG. 9B after pump 656 (i.e., surge tank 658, pump and drive 660, processor 661, valve 662 and transducer 663, valve 664, flash cooler 669 and transducer 665) may be similar to conventional systems used to supply heated product to a filling system tank that supplies filling valves. In some embodiments, passages in product recirculation system, 650 have a minimum width of 0.625 inches.

Figure 9C:
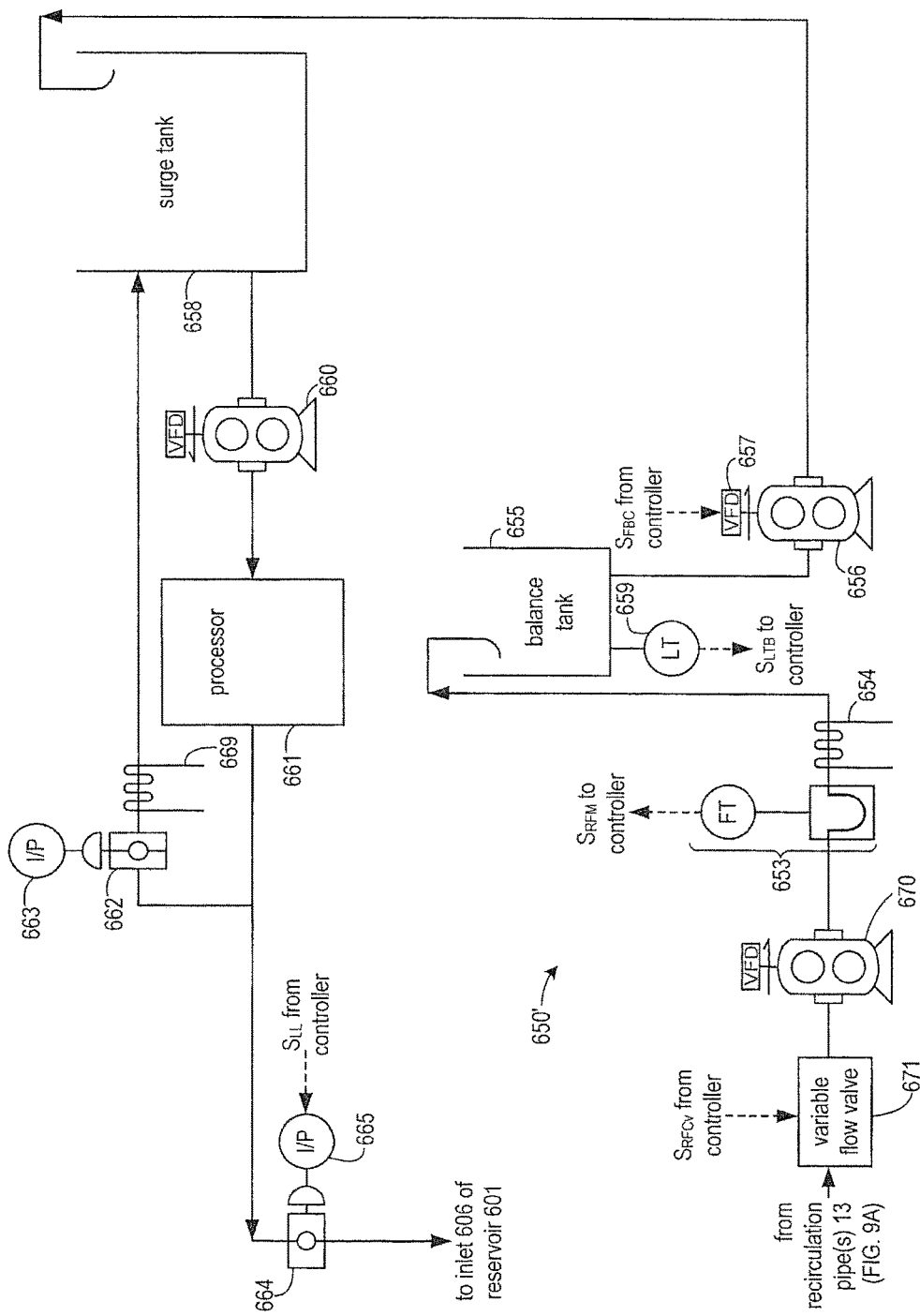
FIGS. 9C and 9D are schematic diagrams showing portions of beverage container filling systems incorporating product recirculation systems according to additional embodiments.

FIG. 9C is a schematic diagram showing a portion of a beverage container filling system that includes a product recirculation system 650' according to at least some embodiments. As to such an embodiment, FIG. 9C is an extension of FIG. 9A instead of FIG. 9B. Several aspects of the embodiment shown in FIG. 9C are similar to the embodiment of FIG. 9B, with elements in FIG. 9C being similar to and operating in a similar manner as elements in FIG. 8B having the same reference numbers. In recirculation system 650', however, a variable flow valve 671 has been added. Valve 671 may be a conventional diaphragm valve or other type of flow reducing valve. Variable speed pump 670 and its associated variable frequency drive are similar to pump 651 and drive 652. In system 650', valve 671 is used to adjust flow rate. The controller sends signals $S_{RFCv}$ (e.g., to a current-to-pressure transducer connected to valve 671) that cause valve 671 to increase or decrease the flow rate of product through the system 650' flow path. The controller may generate signals $S_{RFCv}$ based on signals $S_{RFM}$ received from flow meter 653. In some embodiments, and with the exception of valve 671 under some settings, passages in product recirculation system 650' have a minimum width of 0.625 inches. However, the controller may periodically pulse valve 671 to an open position sufficient to permit any buildup of inclusions in valve 671 to be flushed.

Figure 9D:
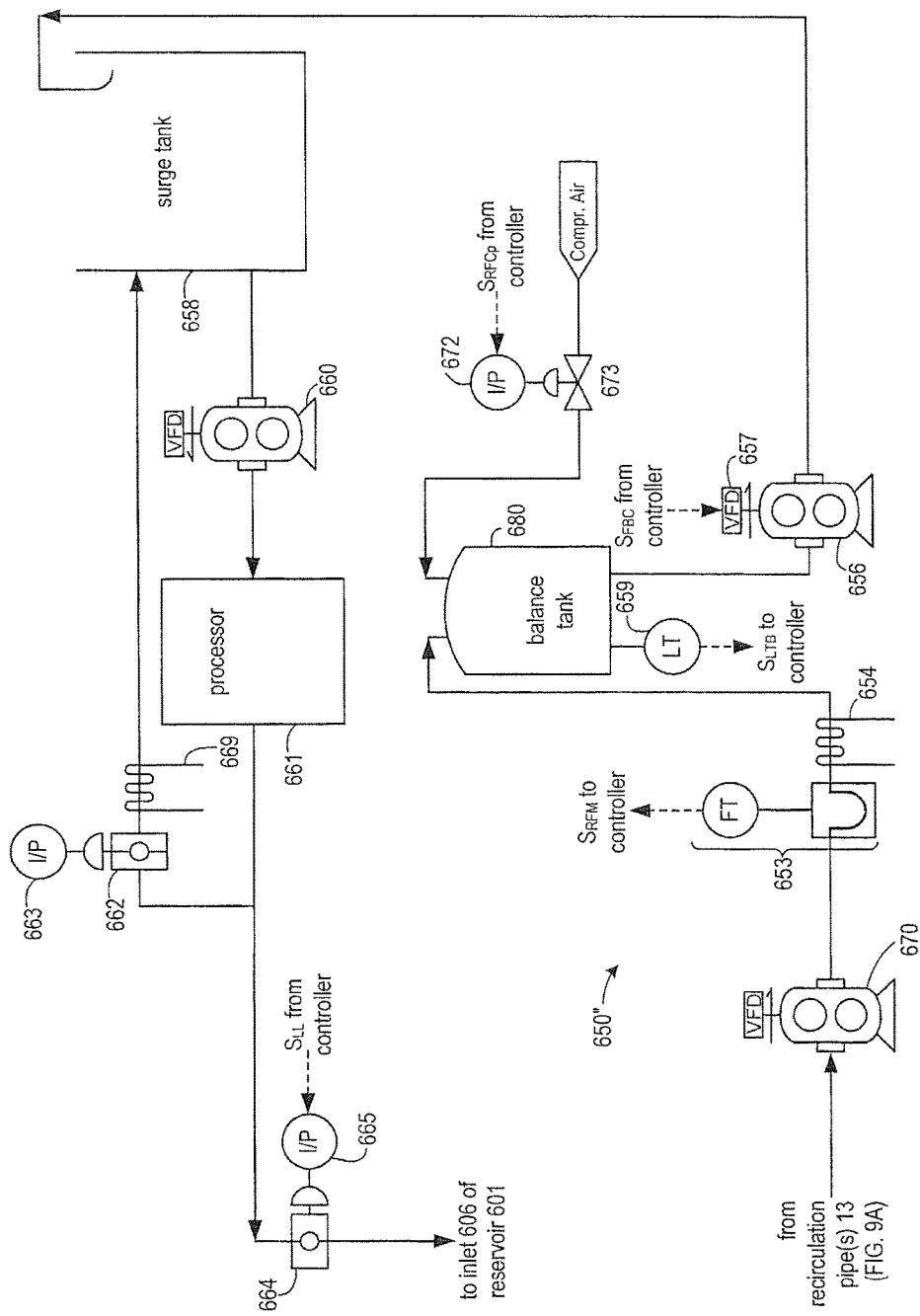

FIG. 9D is a schematic diagram showing a portion of a beverage container filling system that includes a product recirculation system 650" according to at least some additional embodiments. As to such an embodiment, FIG. 9D is an extension of FIG. 9A instead of FIG. 9B. Several aspects of the embodiment shown in FIG. 9D are similar to the embodiment of FIG. 9B, with elements in FIG. 9D being similar to and operating in a similar manner as elements in FIG. 8B having the same reference numbers. In recirculation system 650", however, balance tank 655 is replaced with a pressurized balance tank 680. Tank 680 is connected to a source of compressed air through a pressure control valve 673, with valve 673 being connected to a current to pressure transducer 672. Variable speed pump 670 and its associated variable frequency drive are similar to pump 651 and drive 652. In system 650", however, valve 673 is used to adjust flow rate by increasing or decreasing the pressure in tank 680, thereby increasing or decreasing the back pressure in the flow path of system 650". The controller sends signals $S_{RFCp}$ to current-to-pressure transducer 672 that cause valve 673 to increase or decrease the flow rate of compressed air into tank 680. The controller may generate signals $S_{RFCp}$ based on signals $S_{RFM}$ received from flow meter 653. In some embodiments, passages in product recirculation system 650" have a minimum width of 0.625 inches.

Figure 10:
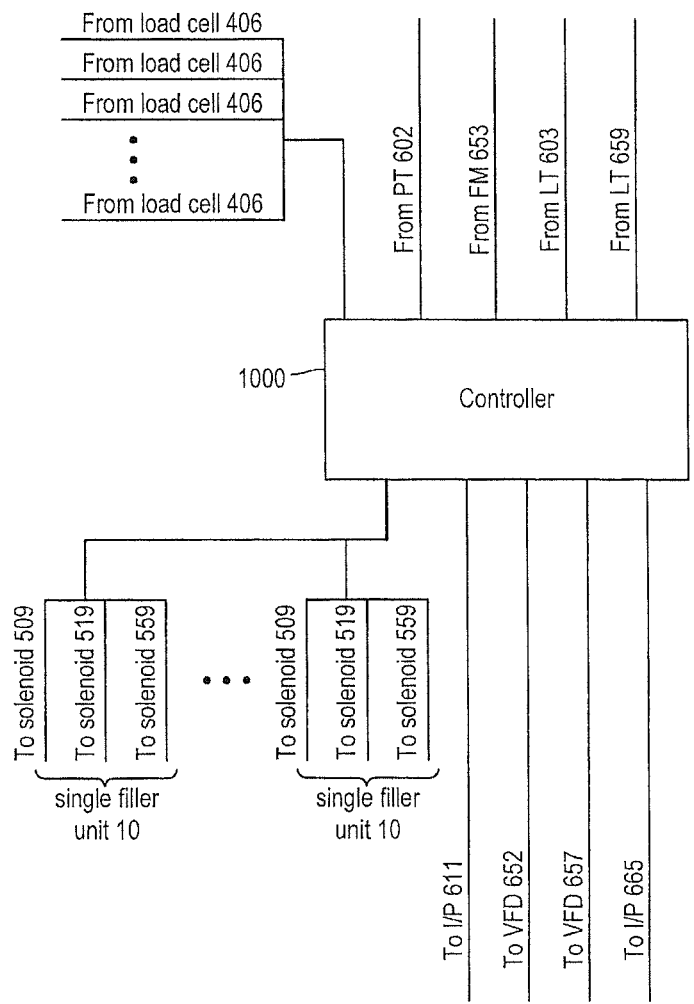
FIG. 10 is a block diagram showing inputs and outputs to a filling system controller according to some embodiments.

FIG. 10 is a block diagram showing inputs and outputs to a controller 1000 of a filling system according to some embodiments. Controller 1000 may be a microprocessor, a programmable integrated circuit (IC), a special purpose IC, a programmable logic controller (PLC), a field programmable gate array (FPGA) or other type of device able to receive signals, execute instructions, and output signals based on the received signals and instructions. Controller 1000 may include memory for storing instructions and data and/or may access separate memory components (not shown). Although FIG. 10 shows a single controller 1000, in some embodiments a filling system may include multiple controllers, with controller operations such as those described herein distributed among those multiple controllers.

Controller 1000 is connected to one or more input signal lines over which controller 1000 receives signals from various filling system components. Some of those input signal lines carry signals $S_{LC}$ from load cells 406 of arms 20 (FIGS. 7A-7D). As shown in FIG. 10, controller 1000 may receive a separate input from each of multiple load cells 406. Each of those inputs may be signals $S_{LC}$ from a load cell 406 of an arm 20 that corresponds to a single filler unit 10. Controller 1000 is also connected to input signal lines over which controller 1000 receives signals $S_{PT}$ from pressure transducer 602 (FIG. 9A), signals $S_{RFM}$ from flow meter 653 (FIG. 9B), signals $S_{LTB}$ from level transducer 659, and signals $S_{LT}$ from level transducer 603 (FIG. 9A). Controller 1000 may include additional signal lines to receive signals from other transducers, programming instructions, etc. For example, and as indicated above, controller 1000 receives a signal from optical sensor 121 when filling valve 50 is at a low flow setpoint.

Controller 1000 is also connected to one or more output signal lines over which controller 1000 outputs control signals to various filling system components. Some of those output signal lines carry signals to solenoids of actuators of each of multiple filler units 10. As shown in FIG. 10, this may include, for each filler unit 10, a separate signal line to each of solenoids 509, 519 and 559 (FIGS. 8A through 8H) (or signal lines to solenoids 509, 519 and 559' in the embodiment of FIGS. 8I-8P). Controller 1000 associates each group of output signal lines to a set of solenoids 509, 519 and 559 in a filler unit 10 with an input signal line carrying signals $S_{LC}$ from the load cell 406 of the arm 20 corresponding to that filler unit 10. Controller 1000 is also connected to output signal lines over which controller 1000 sends signals $S_{PC}$ to transducer 611 (FIG. 9A), signals $S_{RFC}$ to variable frequency drive 652 (FIG. 9B), signals $S_{FBC}$ to drive 657 and signals $S_{LL}$ to transducer 665 (FIG. 9B). Controller 1000 may include additional signal lines over which controller 1000 sends signals to other filling system components. Those signals may include, without limitation, signals to angle seat valves 612, 614 and 620, signals to current-to-pressure transducers 663 and 665, a signal to valve 671 (in the embodiment of FIG. 9C), a signal to transducer 672 (in the embodiment of FIG. 9D), a signal to the drive of pump 660, a signal to the drive of pump 670 (in embodiments of FIGS. 9C and 9D), and an on/off signal to vacuum pump 622.

Figure 11A:
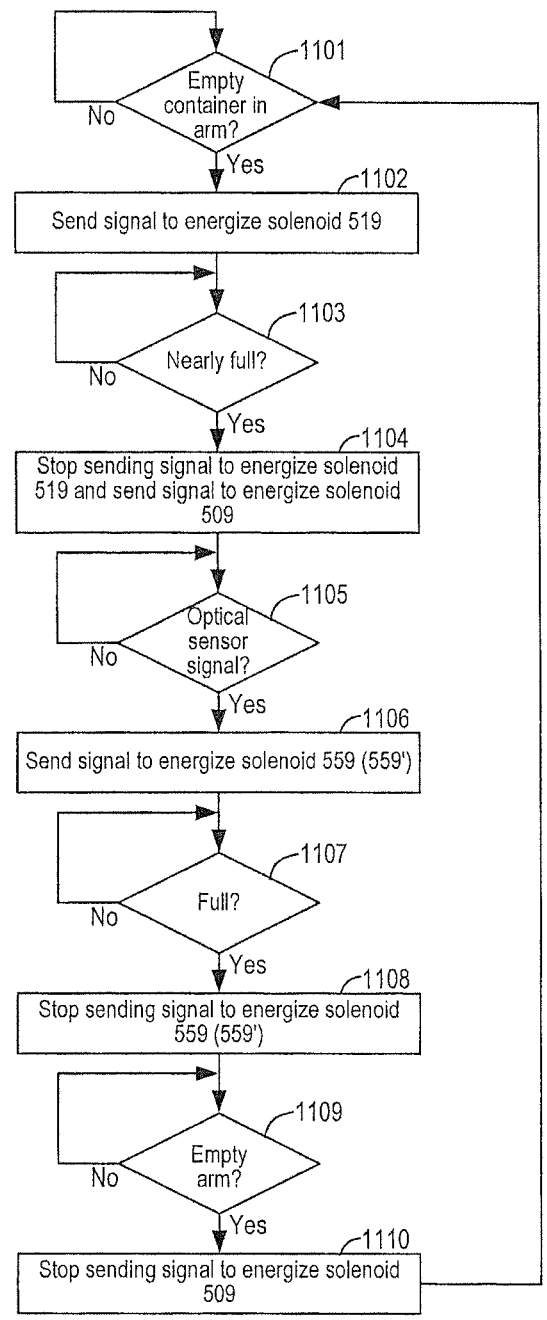
FIG. 11A is a flow chart showing an example of an algorithm that may be performed by a filling system controller in connection with the operations shown in FIGS. 8A-8H and FIGS. 8I-8P.

FIG. 11A is an example of an algorithm performed by controller 1000 in connection with the operations shown in FIGS. 8A-8H or in FIGS. 8I-8P. The FIG. 11A algorithm relates to, and will be described with regard to, a single filler unit and its corresponding arm 20. However, controller 1000 may simultaneously perform a separate instance of the FIG. 11A algorithm for each filler unit and its corresponding arm 20.

At step 1101, which may correspond to the state of a filler unit shown in FIG. 8A or in FIG. 8I, controller 1000 determines if an empty container has been placed into gripper 415 of arm 20. In some embodiments, controller 1000 may make this determination based on a separate optical or contact sensor positioned on gripper 415 to detect a container. In still other embodiments, controller 1000 makes this determination based on whether a currently-received signal $S_{LC}$ from load cell 406 corresponds to the weight of an empty container. As indicated by the "no" loop, controller 1000 continues making the determination of step 1101 until an empty container is in arm 20. At that point, the algorithm proceeds on the "yes" branch to step 1102. In step 1102, which may correspond to the state of the filler unit shown in FIG. 8B (or FIG. 8J), controller 1000 sends a signal to energize solenoid 519.

Controller 1000 then continues to step 1103, where controller 1000 determines if the container being filled is "nearly full," e.g., 90% full. Step 1103 may correspond to the state of the filler unit shown in FIG. 8C (or in FIG. 8K). In some embodiments, the determination in step 1103 is based on whether a signal $S_{LC}$ from load cell 406 indicates a weight corresponding to a nearly full container. As indicated by the "no" loop, step 1103 is repeated until a container is determined to be nearly full. Once that determination is made, controller 1000 proceeds to step 1104 on the "yes" branch. In step 1104, which may correspond to the state of the filler unit shown in FIG. 8D (or in FIG. 8L), controller 1000 stops sending a signal to solenoid 519 and starts sending a signal to solenoid 509.

Controller 1000 then proceeds to step 1105, where controller 1000 determines if it has received a signal from optical sensor 121. Step 1105 may correspond to the state of the filler unit shown in FIG. 8E (or in FIG. 8M). As indicated by the "no" loop, step 1105 is repeated until a signal from optical sensor 121 has been received. Once that optical sensor signal is received, controller proceeds to step 1106 on the "yes" branch. In step 1106, which may correspond to the state of the filler unit shown in FIG. 8F (or in FIG. 8N), controller 1000 sends a signal to energize solenoid 559 (or solenoid 559'). Controller 1000 then proceeds to step 1107 and determines if the container being filled is completely full. Controller 1000 may make the determination in step 1107 based on whether a signal $S_{LC}$ received from load cell 406 indicates a weight of a full container. Step 1107 is repeated ("no" loop) until a positive full container determination is made, at which point controller 1000 continues to step 1108.

In step 1108, which may correspond to the state of the filler unit shown in FIG. 8G (or in FIG. 8O), controller 1000 stops sending the signal to energize solenoid 559 (or solenoid 559'). Controller 1000 then proceeds to step 1109 and determines if arm 20 is empty, i.e., if the filled container has been removed. In some embodiments controller 1000 makes the determination of step 1109 based a signal from an optical or contact sensor on arm 20. In other embodiments, controller 1000 makes the determination in step 1109 based on whether a signal $S_{LC}$ from load cell 406 corresponds to the weight of an unloaded arm 20. Step 1109 is repeated ("no" loop) until a positive empty arm determination is made, at which point controller 1000 continues to step 1110. In step 1110, controller 1000 stops sending the signal to energize solenoid 509. Controller 1000 then returns to step 1101 and awaits a signal indicating that the next empty container is in position in arm 20.

Figure 11B:
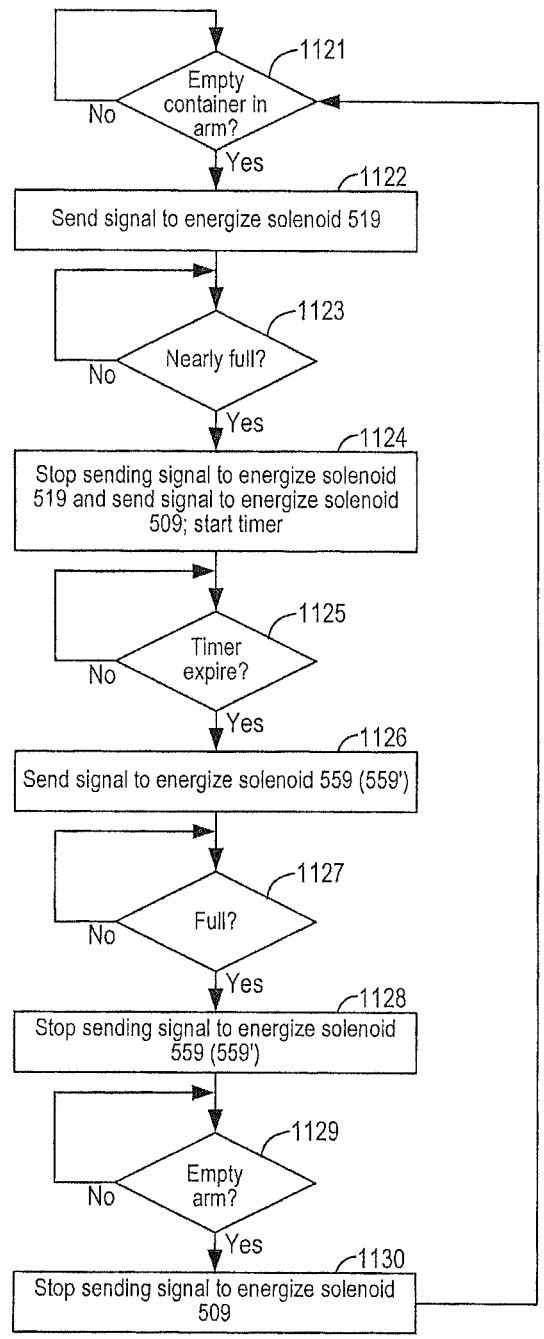
FIG. 11B is a flow chart showing an example of an alternate algorithm that may be performed by a filling system controller in connection with operations similar to those shown in shown in FIGS. 8A-8H and FIGS. 8I-8P.

FIG. 11B is an example of an alternate algorithm that may be performed by controller 1000 in connection with operations similar to those shown in shown in FIGS. 8A-8H and 8I-8P, but where an optical sensor 120 is not used. Steps 1121, 1122, 1123, 1126, 1127, 1128, 1129 and 1130 are respectively similar steps 1101, 1102, 1103, 1106, 1107, 1108, 1109 and 1110 of FIG. 11A and thus not further described. In step 1124, controller 1000 performs operations similar to those of step 1104 of FIG. 11A, but also starts a timer. That timer has a value representing the time needed for the filling valve to go from a fully open condition to a partially open condition corresponding to a desired low flow setpoint. In step 1125, controller 1000 determines if that timer has expired. Controller 1000 repeats step 1125 ("no" loop) until that timer has expired, at which point controller 1000 proceeds on the "yes" branch to step 1126.

Figure 11C:
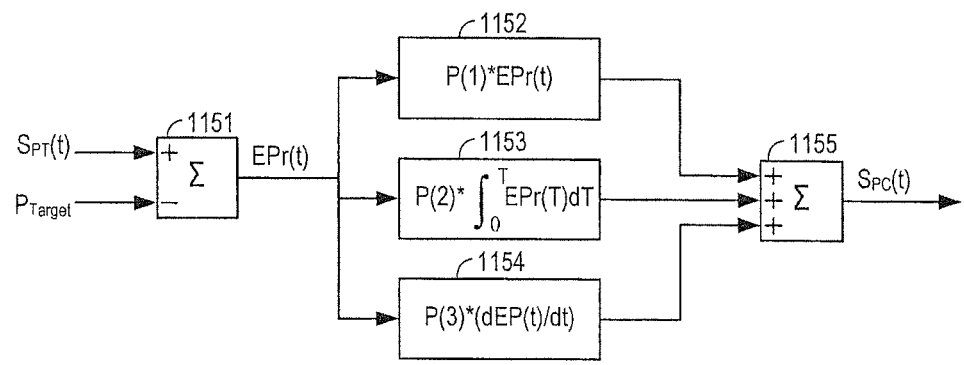
FIG. 11C is a block diagram showing an example of an algorithm that may be performed by a filling system controller in connection with a pressure control system.

As indicated above, controller 1000 also controls the pressure in reservoir 601 (or in a flow path from reservoir 601) by sending signals $S_{PC}$ to adjust the position of pressure control valve 610 (FIG. 9A). In some embodiments, controller 1000 executes instructions to control the setting of pressure valve 610 using a PID (proportional-integral-derivative) control loop algorithm. FIG. 11C is a block diagram showing an example of such an algorithm. At a clock cycle t of controller 1000, the algorithm receives two inputs. The first input is data corresponding to a value of a desired target pressure ($P_{Target}$) to be maintained in reservoir 601 (or in a flow path from reservoir 601). This value may be a constant stored in memory as a program parameter. The second input is $S_{PT}(t)$, a value of a signal $S_{PT}$ from pressure transducer 602 received at clock cycle t. A summer 1151 subtracts one of the inputs from the other and outputs a resulting difference as $E_{Pr}(t)$, a pressure error value at time t. The $E_{Pr}(t)$ value is received by a proportional calculator block 1152, an integral calculator block 1153 and a derivative calculator block 1154. The values P(1), P(2) and P(3) are tuning parameters, and "T" is an integration time interval (e.g., the total elapsed time since the algorithm began executing). Outputs of blocks 1152, 1153 and 1154 are received by a second summer block 1155, which outputs the sum as $S_{PC}(t)$, the control signal $S_{PC}$ (to current/pressure transducer 611) for clock cycle t. At the next clock cycle (t+1) of controller 1000, the algorithm of FIG. 11C is performed again, but using $S_{PT}(t+1)$ instead of $S_{PT}(t)$ as the second input to obtain $E_{Pr}(t+1)$, a pressure error value at time t+1, providing $E_{Pr}(t+1)$ to blocks 1152-1154, etc. The signal $S_{PT}(t+1)$ would be a value of signal $S_{PT}$ received at cycle t+1 and after pressure valve 610 had been adjusted in response to $S_{PC}(t)$. The FIG. 11C algorithm would be repeated in a similar manner for subsequent clock cycles.

Figure 11D:
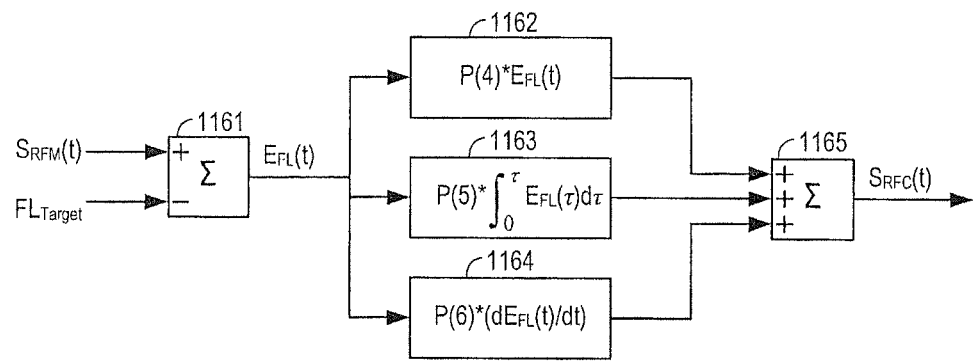
FIG. 11D is a block diagram showing an example of an algorithm that may be performed by a filling system controller in connection with a product recirculation system.

As also indicated above, controller 1000 controls the speed of positive displacement pump 651 by sending signals $S_{RFC}$ to adjust the speed of pump 651 (FIG. 9B). In some embodiments, controller 1000 executes instructions to control the setting of pump 651 using another PID control loop algorithm. FIG. 11D is a block diagram showing an example of such an algorithm. At a clock cycle t of controller 1000, the algorithm receives two inputs. The first input is data corresponding to a desired flow through the flow path of product recirculation system 650. In some embodiments, this value ($FL_{Target}$) is between 5% and 15% of the total flow into reservoir 601. Controller 1000 may calculate a value for $FL_{Target}$ by calculating a percentage of flow into reservoir 601. The flow into reservoir 601 may be determined by controller 1000 based on successive data from level transducer 603 over time. For example, a flow rate based on values $S_{LT}(t)$ and $S_{LT}(t-n)$ could be calculated as [[volume of reservoir 601 corresponding to $S_{LT}(t)$]−[volume of reservoir 601 corresponding to $S_{LT}(t-n)$]/[(t)−(t−n)]]), wherein n is a number of clock cycles corresponding to a sufficiently long period to detect change in product level. The second input is $S_{RFM}(t)$, a value of a signal $S_{RFM}$ from flow meter 653 received at clock cycle t. A summer 1161 subtracts one of the inputs from the other and outputs a resulting difference as $E_{FL}(t)$, a flow error value at time t. The $E_{FL}(t)$ value is received by a proportional calculator block 1162, an integral calculator block 1163 and a derivative calculator block 1164. The values P(4), P(5) and P(6) are tuning parameters, and "T" is an integration time interval (e.g., the total elapsed time since the algorithm began executing). Outputs of blocks 1162, 1163 and 1164 are received by a second summer block 1165, which outputs the sum as $S_{RFC}(t)$, the control signal $S_{RFC}$ (to variable frequency drive 652) for clock cycle t. At the next clock cycle (t+1) of controller 1000, the algorithm of FIG. 11D is performed again, but using $S_{RFM}(t+1)$ instead of $S_{RFM}(t)$ as the second input to obtain $E_{FL}(t+1)$, a flow error value at time t+1, providing $E_{FL}(t+1)$ to blocks 1162-1164, etc. The signal $S_{RFM}(t+1)$ would be a value of signal SRFM received at cycle t+1 and after the speed of pump 651 had been adjusted in response to $S_{RFC}(t)$. The FIG. 11D algorithm would be repeated in a similar manner for subsequent clock cycles. Values for tuning parameters P(4), P(5) and P(6) can be determined using conventional techniques for initializing and adjusting PID controllers used for existing types of fluid flow systems.

In the embodiment of FIG. 9C, controller 1000 controls the flow through the flow path of system 650' by sending control signals $S_{RFVc}$ to adjust valve 671. In some embodiments, controller 1000 generates signals $S_{RFVc}$ using a PID control loop algorithm similar to that of FIG. 11D, but with $S_{RFCv}$ as an output instead of $S_{RFC}$. In the embodiment of FIG. 9O, controller 1000 controls the flow through the flow path of system 650" by sending control signals $S_{RFVp}$ to adjust valve 673. In some embodiments, controller generates signals $S_{RFVp}$ using a PID control loop algorithm similar to that of FIG. 11D, but with $S_{RFCp}$ as an output instead of $S_{RFC}$.

As also indicated above, controller 1000 controls the speed of pump 656 by generating signals $S_{FBC}$. In some embodiments, controller 1000 generates signals $S_{FBC}$ using another PID control loop algorithm and based on signals $S_{LTB}$ from level transducer 659 as an input. For example, a target value ($\Delta L_{Target}$) for change in the product level within balance tank 655 might be set at 0. An input $\Delta L(t)$ could be calculated based on values of $S_{LTB}$ over time. The algorithm could then be tuned so as to maintain a constant level of product in tank 655. Alternatively, the algorithm to generate signals $S_{FBC}$ could be much simpler. For example, whenever the level of tank 655 reaches a certain value (e.g., 80% full), the controller could generate signals $S_{FBC}$ that cause pump 656 to run at a preset speed until the level in tank 655 has reached another level (e.g., 20% full).

Figure 12A:
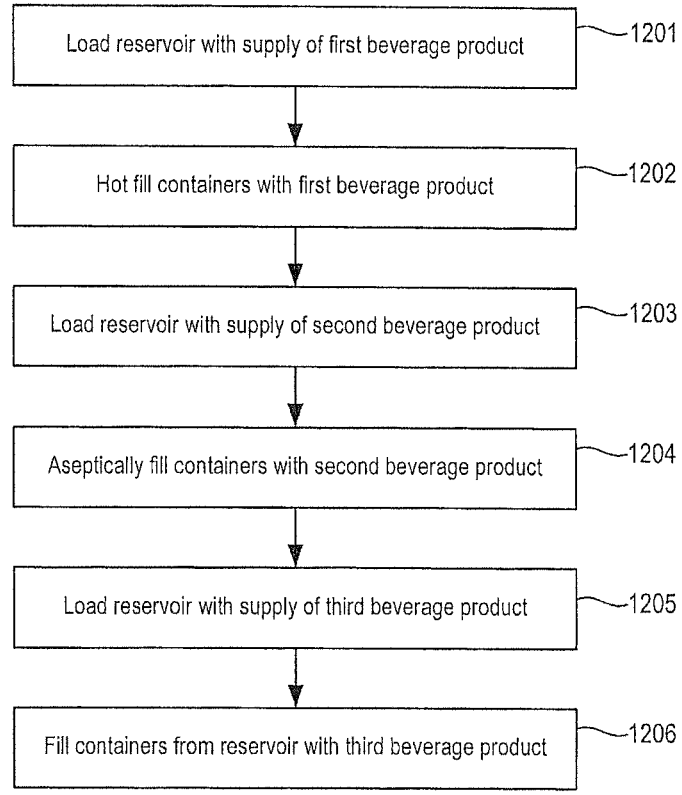
FIGS. 12A through 12D are block diagrams showing steps in methods according to certain embodiments.

FIG. 12A is a block diagram showing steps in a method according to some embodiments. In a first step 1201, a filling system reservoir is loaded with a supply of a first beverage product. That filling system may be a filling system such as described herein and may include a one or more filling valves 50 and/or other components such as are described herein. In step 1202, the filling system is used for hot filling of containers from the reservoir with the first beverage product. In particular, containers are placed into filling positions relative to the one or more filling valves and heated product is dispensed into those containers. After step 1202, the filling system is loaded with a supply of a second beverage product in step 1203. In step 1204, the filling system is then used for aseptic filling of containers from the reservoir with the second beverage product. After step 1204, the filling system is loaded with a supply of a third beverage product in step 1205. In step 1206, the filling system is then used for filling of containers from the reservoir with the third beverage product. The filling operation of step 1206 may be performed while the third product is chilled or at room temperature and without maintaining aseptic conditions. Although not shown in FIG. 12A, additional set-up, cleaning and/or sterilizing operations may be performed prior to step 1201, between steps 1202 and 1203, between steps 1204 and 1205, and after step 1206.

Any of the first, second or third beverage products may have a viscosity between 1 cps and 400 cps. Any of the first, second or third beverage products may contain inclusions (of sizes within ranges discussed above and at concentrations within ranges discussed above) or may be inclusion-free. As but one example, in some embodiments one of the first, second and third beverage products is inclusion free and another the first, second and third beverage products has inclusions, at a volumetric percentage of at least 10%, that have volumes between 125 cubic millimeters and 1000 cubic millimeters (e.g., 25%, 400 cubic millimeters). In some embodiments, one of the first, second or third beverage products has a viscosity between about 1 cps and about 50 cps, another of the first, second or third beverage products has a viscosity between about 50 cps and about 100 cps, and another of the beverage products has a viscosity between about 100 cps and about 200 cps. In some embodiments, one of the first, second or third beverage products has a viscosity between about 1 cps and about 50 cps and another of the first, second or third beverage products has a viscosity between about 100 cps and about 200 cps. In some embodiments, one of the first, second or. third beverage products has a viscosity between about 1 cps and about 100 cps and another of the first, second or third beverage products has a viscosity between about 200 cps and about 400 cps.

The steps in FIG. 12A need not be performed in the order shown. For example, the order in which the filling system is used to hot fill containers with the first beverage product, aseptically fill containers with the second beverage product and cold fill containers with the third beverage product could be varied.

Figure 12B:
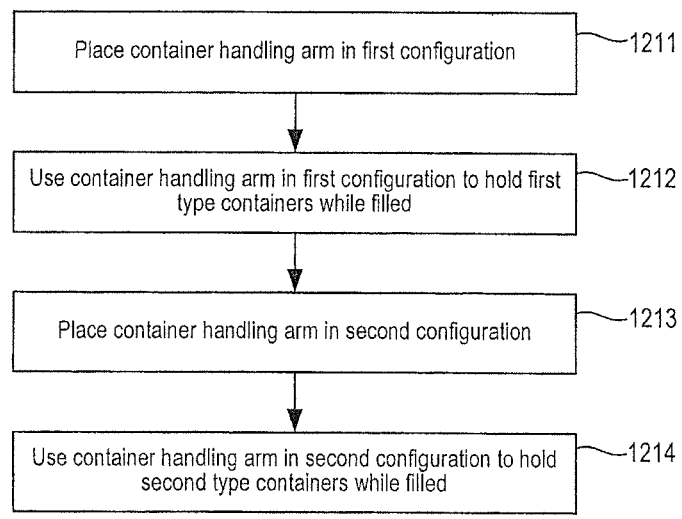

FIG. 12B is a block diagram showing steps in another method according to some embodiments. In step 1211, a container handling arm is placed into a first configuration for filling a first type of container. The container handling arm includes a load cell that outputs a signal indicative of a force F2 imposed on the load cell in response to a force F1 of a container held by the arm and the contents of that container. In the first configuration, the force F2 is a first ratio of the force F1. In step 1212, the container handling arm in the first configuration is used to hold containers of the first type while filled with beverage product from a filling valve. In step 1213, the container handling arm is placed into a second configuration for filling a second type of container. In the second configuration, the force F2 is a second ratio of the force F1. The second ratio is different from the first ratio. In step 1214, the container handling arm in the second configuration is used to hold containers of the second type while filled with beverage product from a filling valve. In other embodiments, the method of FIG. 12B may include additional steps in which the container handling arm is placed into additional configurations for filling additional types of containers, with each of the additional configurations corresponding to a different F2:F1 ratio, and with the container handling arm used to hold additional those additional types of containers during filling with beverage product and while in those additional configurations. Although not shown in FIG. 12B, additional set-up, cleaning and/or sterilizing operations may be performed, e.g., between steps 1212 and 1213 or between steps 1213 and 1214.

Figure 12C:
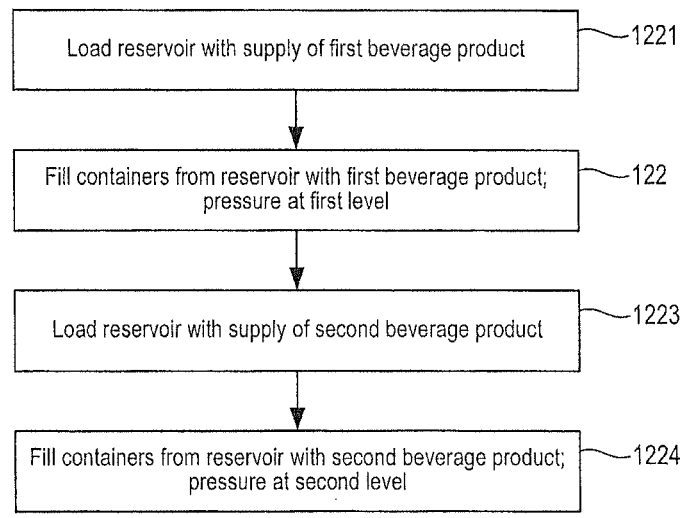

FIG. 12C is a block diagram showing steps in a further method according to some embodiments. In step 1221, a filling system reservoir is loaded with a supply of a first beverage product. That filling system may be a filling system such as described herein and may include a one or more filling valves 50 and/or other components such as are described herein. In step 1222, the filling system is used for filling of containers from the reservoir with the first beverage product. In particular, containers are placed into filling positions relative to the one or more filling valves and product is dispensed into those containers. In step 1222, a pressure at a location in the reservoir interior (or in a flow path from the reservoir interior) is maintained at a first level. In step 1223, the filling system reservoir is loaded with a supply of a second beverage product. In step 1224, the filling system is used for filling of containers from the reservoir with the second beverage product. In step 1224, a pressure at the same location is maintained at a second level different from the first level. At least one of the first and second levels is sub-atmospheric. Additional steps may be performed in which the filling system is used for filling containers from the reservoir with other beverage products and while maintaining a pressure at the location at one or more other levels. In some embodiments, a pressure is maintained at a desired level by maintaining that pressure within +/−0.1 psi of the desired level. That tolerance may have other values (e.g., +/−0.05 psi). In some embodiments, the first pressure level is sub-atmospheric and the second pressure level is atmospheric or higher and the first beverage is less viscous than the second beverage. In some embodiments, the first pressure level is atmospheric or higher and the second pressure level is sub-atmospheric and the first beverage is more viscous than the second beverage. Although not shown in FIG. 12C, additional set-up, cleaning and/or sterilizing operations may be performed, e.g., between steps 1222 and 1223. In some embodiments, the method of FIG. 12C may include additional steps of filling the reservoir with a supply of a third beverage product and then filling containers from the reservoir with that third beverage product while the reservoir is vented to atmosphere.

Figure 12D:
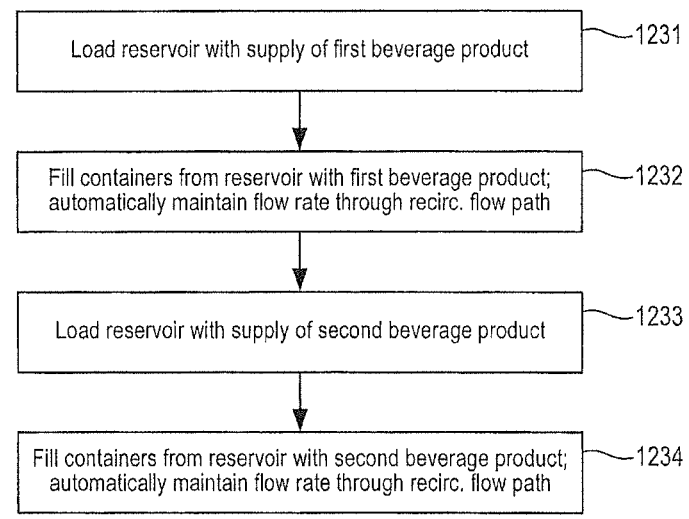

FIG. 12D is a block diagram showing steps in an additional method according to some embodiments. In a first step 1231, a filling system reservoir is loaded with a supply of a first beverage product. That filling system may be a filling system such as described herein and may include a one or more filling valves 50 and/or other components such as are described herein. At step 1232, and during a first time period, the filling system is used for hot filling of beverage containers from the reservoir with the first beverage product. In particular, containers are placed into filling positions relative to the one or more filling valves and product is dispensed into those containers. During the first time period, the filling system automatically maintains a flow rate through a product recirculation flow path (e.g., by adjusting a speed of a variable flow pump in that flow path in the embodiment of FIG. 9B, by adjusting a setting of a variable flow valve in the embodiment of FIG. 9C, by adjusting a pressure control valve in the embodiment of FIG. 9D). In step 1233, the filling system reservoir is loaded with a supply of a second beverage product. At step 1234, and during a second time period, the filling system is used for hot filling of beverage containers from the reservoir with the second beverage product. During the second time period, the filling system again automatically maintains a flow rate through that product recirculation flow path. Although not shown in FIG. 12D, additional set-up, cleaning and/or sterilizing operations may be performed, e.g., between filling containers with one product and then loading the reservoir with a different product.

One of the first and second beverage products has inclusions (of sizes within ranges discussed above and at concentrations within ranges discussed above) and the other of the first and second beverage products lacks inclusions. As but one example, one of the first and second beverage products may have inclusions at a volumetric percentage of at least 25%. Each of at least a portion of those inclusions may have individual volumes of at least 400 cubic millimeters. Additional or alternate steps may be performed in which the reservoir is filled with other products having inclusions of other sizes and/or at other concentrations (e.g., inclusions at a concentration of about 1% and sized to fit within a 1 mm cube), and the filling system is then used to perform heated filling of those other products into containers while also automatically maintaining a flow rate through a product recirculation flow path.

Systems according to various embodiments allow filling of containers with a much wider range of product types than would be feasible using conventional systems. Systems according to various embodiments also allow filling of containers at higher rates than is practical with conventional systems when the product has a viscosity more than about 20 cps or when the product has inclusions.

In addition to variations and embodiments described thus far, additional embodiments may include different features and/or different combinations of features. Examples include, but are not limited to, the following:

Other types, shapes and configurations of magnets may be used in a filling valve. A shuttle and/or a drive sleeve could have other configurations. A shuttle may lack flow straightening vanes such as vanes 208 and/or may have a different configuration of flow straightening vanes. Different types of end elements may be attached to a shuttle (e.g., for use with cups having different sized openings). In some embodiments a filling valve cup such as cup 53 could be replaced with another type of cup. As can be appreciated from FIGS. 1A, 1B and 3A-4B, cup 53 can be easily replaced by loosening clamp 56, removing cup 53, putting a new cup into position, and re-tightening clamp 56. In one scenario, the beverage product(s) with which containers are to be filled may lack inclusions or may have relatively small inclusions, and there may be no need for a cup with an outlet sized to permit passage of large inclusions. In such a scenario, the replacement cup might have a smaller opening so as to obtain more precision during filling and/or to fill containers that have smaller openings. In another scenario, there may be no need to perform hot filling, and product recirculation may therefore not be necessary. In that scenario, a replacement cup might not include a recirculation pipe such as recirculation pipe 13.

A container handling arm could include a lever, support beam and load cell arranged and/or coupled in alternate configurations.

A low flow setpoint system could include an alternate arrangement of control valves and/or an alternate positioning of various components.

Components of a reservoir pressure control system could be arranged in an alternate manner. Alternate types of fluid control valves, transducers and other components could be used.

Components of a product recirculation system could be arranged in an alternate manner. Alternate types of components could be used.

A filling valve having some or all of the features of filling valve 50 may be used in a filling system that does not include a container handling arm such as container handling arm 20, a low flow setpoint control system such as described in connection with FIGS. 8A-8H (or FIGS. 8I-8P), a pressure control system such as described in connection with FIG. 9A or a product recirculation system such as described in connection with FIGS. 9B-9D.

A container handling arm having some or all of the features of arm 20 may be used in a filling system that does not include a filling valve such as filling valve 50, a container handling arm such as container handling arm 20, a low flow setpoint control system such as described in connection with FIGS. 8A-8H (or FIGS. 8I-8P), a pressure control system such as described in connection with FIG. 9A or a product recirculation system such as described in connection with FIGS. 9B-9D.

A low flow set point system such as that described in connection with FIGS. 8A-8H (or FIGS. 8I-8P) may be used in connection with other types of filling valves and/or may be used in systems that do not include a container handling arm such as container handling arm 20, a pressure control system such as described in connection with FIG. 9A or a product recirculation system such as described in connection with FIGS. 9B-9D.

A pressure control system such as described in connection with FIG. 9A may be used in connection with other types of filling valves and/or may be used in systems that do not include a container handling arm such as arm 20, a low flow setpoint control system such as described in connection with FIGS. 8A-8H (or FIGS. 8I-8P) or a product recirculation system such as described in connection with FIGS. 9B-9D.

A product recirculation system such as described in connection with FIGS. 9B-9D may be used in connection with other types of filling valves and/or may be used in systems that do not include a container handling arm such as arm 20, a low flow setpoint control system such as described in connection with FIGS. 8A-8H (or FIGS. 8I-8P) or a pressure control system such as described in connection with FIG. 9A.

Systems such as those described herein can also be used to fill containers with other types of liquids. Those products may include, without limitation, other types of food products, paints, inks and other liquids. Such other products may also have viscosities and inclusions in the ranges indicated above for beverage products.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. Any and all combinations, subcombinations and permutations of features from above-described embodiments are the within the scope of the invention.

The invention claimed is:

1. A filling valve comprising:
   a housing defining a housing interior between a housing inlet and a housing outlet;
   a shuttle located in and movable along the housing interior, the shuttle including a stopper sized to close the housing outlet and plurality of shuttle magnets displaced from the stopper, wherein the shuttle magnets are arranged so that fluid can flow through the housing interior and between the shuttle magnets when the filling valve is open, and wherein the shuttle includes a stem extending along a longitudinal centerline of the housing interior, the shuttle magnets are radially displaced from the stem, and the stopper is coupled to a bottom of the stem; and a drive sleeve including sleeve magnets, wherein the drive sleeve is located outside the housing and is moveable along a portion of a length of the housing.

2. The filling valve of claim 1, wherein the sleeve magnets are staggered, relative to the shuttle magnets, along a length of the shuttle so as to form a magnetic spring.

3. The filling valve of claim 1 or claim 2, wherein the shuttle includes one or more drive rings and the shuttle magnets are located in the one or more shuttle drive rings.

4. The filling valve of any of claim 1 or 2, wherein the sleeve magnets are arranged in rings along a length of the sleeve.

5. The filling valve of any of claim 1 or 2, wherein the shuttle magnets are in repulsion to the sleeve magnets.

6. The filling valve of any of claim 1 or 2, wherein the housing outlet has a width of at least 0.625 inches.

7. The filling valve of any of claim 1 or 2, wherein a flow path through the housing interior is straight.

8. The filling valve of any of claim 1 or 2, further comprising a plurality of vanes positioned between the shuttle magnets and the stopper.

9. The filling valve of any of claim 1 or 2, wherein the filling valve is part of a container filling system that comprises a reservoir having an interior in fluid communication with the housing interior.

10. The filling valve of claim 9, wherein the filling system further comprises a pressure control system configured to maintain a pressure at a point in the reservoir or in a flow path from the reservoir at or near the target pressure value.

11. The filling valve of claim 9, wherein the filling system further comprises a product recirculation system connected to the filling valve.

12. The filling valve of claim 11, wherein the product recirculation system includes a variable flow pump and is configured to automatically adjust a flow of the pump.

13. The filling valve of any of claim 1 or 2, further comprising an adjustable low flow setpoint system.

14. The filling valve of any of claim 1 or 2, further comprising a container handling arm configured to hold a container in a filling position relative to the filling valve and to output signals indicative of weights of the container and its contents.

* * * * *